(12) United States Patent
Palmer

(10) Patent No.: US 11,940,248 B1
(45) Date of Patent: Mar. 26, 2024

(54) TARGET ENGAGEMENT DICTATION APPARATUS, SYSTEM AND ASSOCIATED METHODS

(71) Applicant: Andrew Palmer, Orlando, FL (US)

(72) Inventor: Andrew Palmer, Orlando, FL (US)

( * ) Notice: Subject to any disclaimer, the term of this patent is extended or adjusted under 35 U.S.C. 154(b) by 254 days.

(21) Appl. No.: 16/665,490

(22) Filed: Oct. 28, 2019

Related U.S. Application Data

(60) Provisional application No. 62/751,963, filed on Oct. 29, 2018.

(51) Int. Cl.
  *F41G 3/26* (2006.01)
  *F41G 1/46* (2006.01)
  *G02B 27/01* (2006.01)

(52) U.S. Cl.
  CPC ............. *F41G 3/2694* (2013.01); *F41G 1/46* (2013.01); *G02B 27/017* (2013.01); *G02B 2027/0178* (2013.01)

(58) Field of Classification Search
  CPC ....... F41G 3/2694; F41G 1/46; G02B 27/017; G02B 2027/0178
  USPC .......................................................... 434/19
  See application file for complete search history.

(56) References Cited

U.S. PATENT DOCUMENTS

| | | | |
|---|---|---|---|
| 3,970,310 A | 7/1976 | Gryschuk | |
| 4,203,232 A | 5/1980 | Knight et al. | |
| 4,266,776 A | 5/1981 | Goldfarb | |
| 4,427,199 A | 1/1984 | Faith | |
| 4,482,325 A | 11/1984 | Reimann | |
| 4,533,144 A | 8/1985 | Juarez et al. | |
| 4,659,088 A | 4/1987 | Lee et al. | |
| 7,175,181 B1* | 2/2007 | Bateman | F41J 7/04 273/392 |
| 9,355,572 B2 | 5/2016 | Stanley | |
| 9,638,495 B2 | 5/2017 | Stanley | |
| 9,952,018 B2 | 4/2018 | Bayer | |
| 10,030,931 B1 | 7/2018 | Black et al. | |
| 10,030,937 B2 | 7/2018 | Northrup et al. | |
| 2004/0008157 A1* | 1/2004 | Brubaker | G02B 27/017 345/8 |

(Continued)

*Primary Examiner* — Robert P Bullington
*Assistant Examiner* — Stephen Alvesteffer

(57) ABSTRACT

Target engagement training apparatus, devices, systems and methods that can include wearable training devices on eye glasses and the like as well as mountable to weapons, such as rifles, and pistols, that identifies targets for users to shoot at whether randomly or in a prescribed manner, varies the speed that target identifiers are provided, and varies the duration the target identifier is shown. The target engagement training device dictates to the user which target to engage. The targets can include but are not limited to: 2D (two dimensional) planar materials with various graphics, such as sheets of paper, wood, or metal with printed, painted, or projected images or video displayed; 3-dimensional simulated human or animal figures; or simulated or actual vehicles, buildings, or other structures or items intended for target engagement training. One or more targets can exist on a single item of the aforementioned target materials. Target engagement training, can be used in the firing of real or simulated firearms with live fire projectile ammunition, simulated ammunition, BB shot, pellets, and the like, or engaging in the same with no ammunition in dry fire practice or the engagement of targets by other means, weapons, or munitions.

14 Claims, 47 Drawing Sheets

(56) References Cited

U.S. PATENT DOCUMENTS

| | | | |
|---|---|---|---|
| 2009/0111073 A1* | 4/2009 | Stanley | F41G 3/2655 |
| | | | 434/21 |
| 2016/0069643 A1* | 3/2016 | Lyren | G02B 27/017 |
| | | | 345/589 |
| 2016/0298930 A1* | 10/2016 | Squire | F41G 3/26 |
| 2016/0377381 A1* | 12/2016 | Lyren | G02B 27/0172 |
| | | | 345/633 |
| 2017/0184861 A1* | 6/2017 | Lammers-Meis | F16M 13/04 |
| 2020/0077052 A1* | 3/2020 | Tran | G02B 27/017 |

* cited by examiner

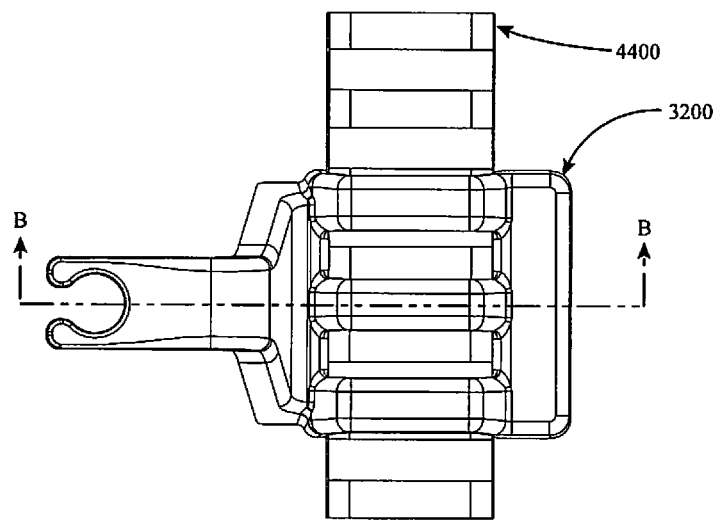
FIG. 7D
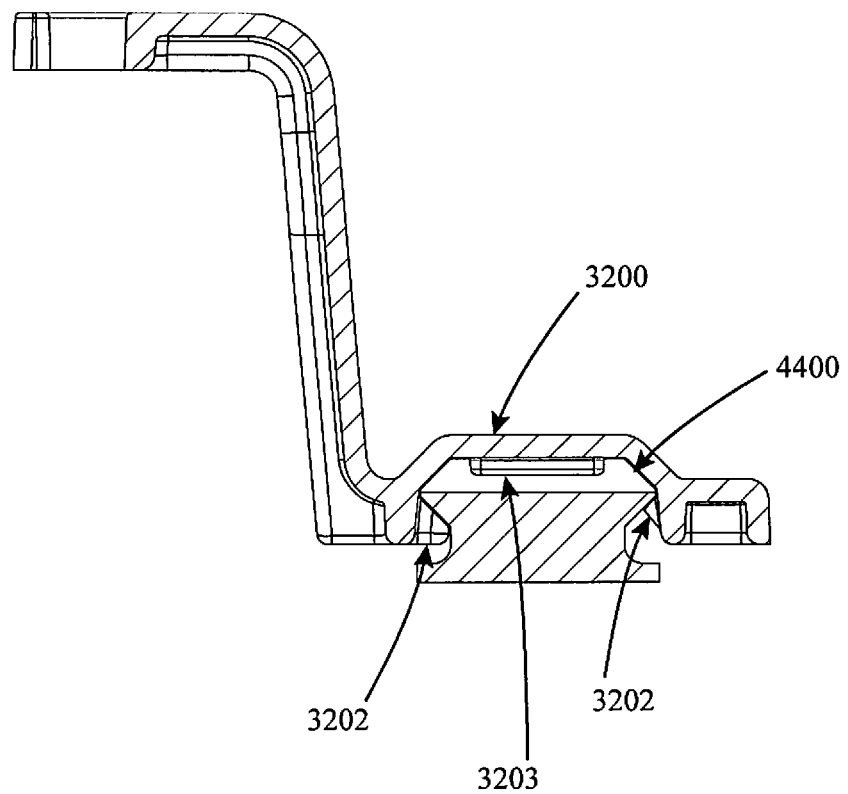
Section B-B
FIG. 7D.SECTIONAL

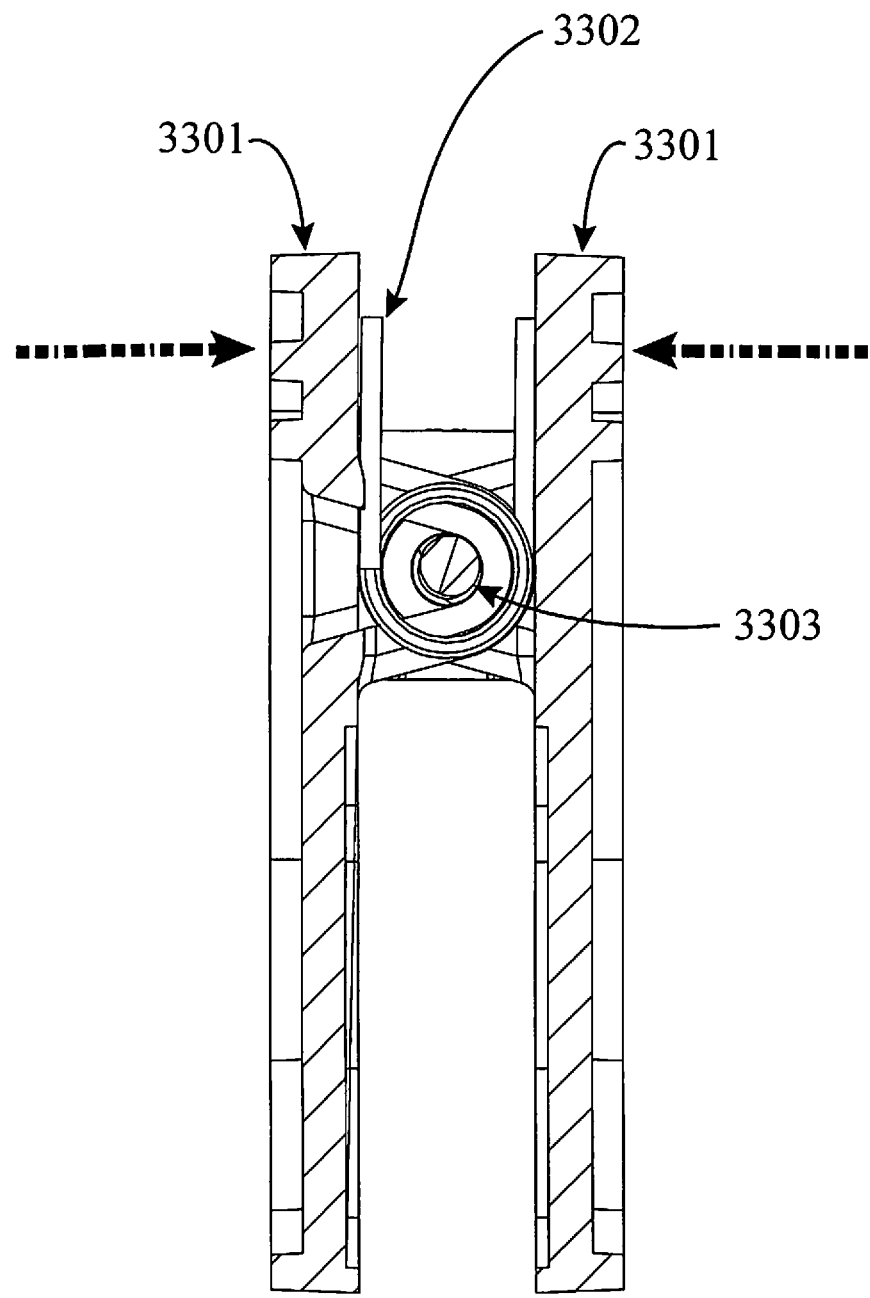
Section A-A
FIG. 8B.SECTIONAL

| Take Action Examples Table |
|---|
| Kneel |
| Stand-up |
| Lay Prone |
| Move to next/previous position |
| Move left/right/forward/backward/diagonal/etc. |
| Reload |
| Change weapon |
| Engage next/previous target |
| Switch weapon to other hand |
| Signal teammate |
| Representative sample, not all inclusive |

FIG. 11

TARGET ENGAGEMENT DICTATION APPARATUS, SYSTEM AND ASSOCIATED METHODS

RELATED APPLICATION

This application claims the benefit of priority to U.S. Provisional Patent Application Ser. No. 62/751,963 filed Oct. 29, 2019, which is incorporated by reference in its entirety.

FIELD OF INVENTION

This invention relates to those target engagement training, and in particular to apparatus, devices, systems and methods that use wearable training devices on eye glasses and the like as well as mountable to weapons, such as rifles and pistols, that identifies targets for users to shoot at whether randomly or in a prescribed manner, varies the speed that target identifiers are provided, and varies the duration the target identifier is shown. Training with firearms is conducted for numerous reasons, among which is to increase proficiency, accuracy, and the ability to react and engage multiple targets.

The target engagement training invention dictates to the user which target to engage, wherein the targets can include but are not limited to: 2D (two-dimensional) planar materials with various graphics, such as sheets of paper, wood, or metal with printed, painted, or projected images or video displayed; 3D (three-dimensional simulated human or animal figures; or simulated or actual vehicles, buildings, or other structures or items intended for target engagement training.

For the purposes of this invention, one or more targets can exist on a single item of the aforementioned target materials. Target engagement training, for the purposes of this invention, is to practice and engage in the physical acts and movements involved in the firing of real or simulated firearms with live fire projectile ammunition, simulated ammunition, BB shot, pellets, and the like, or engaging in the same with no ammunition in dry fire practice or the engagement of targets by other means, weapons, or munitions.

BACKGROUND AND PRIOR ART

U.S. Pat. No. 4,482,325 to Reimann includes lamps shinning onto targets in a range environment. The device shines light in a manual or adjustable manner to provide for intermittent periods of illumination. This type of device is not portable, wearable/mountable, sync-able to other devices, does not use corresponding target identifiers and targets, does not detect a shot fired or trigger some action or routine to provide direction, instruction, data, or feedback to the user, and requires facility development to conduct training.

Devices such as U.S. Pat. No. 4,533,144 to Juarez et al. and U.S. Pat. No. 4,659,088 to Lee et al., include lamps illuminating and acting as the target in a "laser tag" type game in an open environment as well as inside a dome. These devices provide for a plurality of targets with active and inactive states. These types of devices are not wearable/mountable, do not allow for portability, do not detect a shot fired or trigger some action or routine to provide direction, instruction, data, or feedback to the user, do not use corresponding target identifiers and targets, do not allow for randomization of the timing or sequencing of the target identifiers in either a virtual or live fire environment and require facility development to conduct training. One device includes lamps shinning onto targets downrange at night for night shooting practice and light emitting diodes (LEDs) illuminating targets downrange.

U.S. Pat. No. 4,203,232 to Knight et al. is a device that illuminates targets at least momentarily by light via silhouetting the target for a predetermined length of time and interval, and showing "hits" via illumination as well with the invention being preferred for use to train night shooting. This type of device is not wearable/mountable, does not allow for portability, does not allow the user to adjust timings, target identifiers or other aspects, does not detect a shot fired or trigger some action or routine to provide direction, instruction, data, or feedback to the user, does not use corresponding target identifiers and targets, nor does it allow for varying the difficulty or syncing with another device and requires facility development to conduct training.

U.S. Pat. No. 4,266,776 to Goldfarb is a device that illuminates targets, such as via light emitting diodes (LEDs), where a shooter can shoot the lit target and receive a score. The device can randomly alternate the active and inactive targets and keep score of the hits as well as adjust the speed and apparent randomization. This type of device is not wearable/mountable, does not allow for portability, does not allow the user to adjust target identifiers or other aspects, does not detect a shot fired or trigger some action or routine to provide direction, instruction, data, or feedback to the user, does not use corresponding target identifiers and targets, nor does it allow for varying the difficulty or syncing with another device and requires facility development to conduct training.

U.S. Pat. No. 3,970,310 to Gryschuk is a device provides for a plurality of targets illuminated for a predetermined time and records impacts on the illuminated targets. The illuminated targets interval is predetermined and an alarm sounds if a hit is identified. This type of device is not wearable/mountable, does not allow for portability, does not allow the user to adjust target identifiers or other aspects, does not detect a shot fired or trigger some action or routine to provide direction, instruction, data, or feedback to the user, does not use corresponding target identifiers and targets, nor does it allow for varying the difficulty or syncing with another device and requires facility development to conduct training.

U.S. Pat. No. 9,952,018 B2 to Bayer is a common shot timer device that is wearable or mountable that visually or acoustically transmits a shot firing cue as well as registers the resultant fired shot and the length of time between the shot firing indicator and the subsequent shot being fired. This type of shot timer device does not dictate the specific target for the shooter to shoot at and does not utilize multiple targets. This type of device does not allow the user to adjust timings of shooting cues, target identifiers, or sequencing/order of presentation of target indicators. This type of device does not use corresponding target identifiers and targets. This type of device does not make use of a secondary housing that can be used to register various aspects of the user's training. This type of device does not use sensors to trigger some action or routine to provide direction, instruction, data, or feedback to the user, nor does it allow for varying the difficulty or syncing with another device.

U.S. Pat. No. 10,030,931 B1 to Black et al, is a head mounted display (HMD) based device that requires computing and sensor components to project at least one virtual object in an augmented reality (AR) setting. The device can be synced with another device and the users shoot at randomized virtual targets in a training scene with or without live ammunition. The device can also identify and track shots. This type of device does not dictate the target for the shooter to shoot at or provide for a system of interchangeable mounting components to adapt to various mounting applications. This type of device does not allow the user to adjust timings, target identifiers, or sequencing/order of presentation of target identifiers. This type of device does not use corresponding target identifiers and targets. This type of device does not trigger some action or routine to provide direction, instruction, data, or feedback to the user.

U.S. Pat. No. 9,355,572 B2 to Stanley; 9,638,495 B2 to Stanley, and B2 to Northrup et al. each show systems requiring software and hardware to include image projectors, screens, computers, laser tracking cameras, and eye trackers, to provide target and non-target stimuli generated as stationary or moving in a blank, gridded, rendered scene, or other environment. The difficulty can be increased by increasing movement speeds, and/or increased interval time. The software portion can also track the users fired shots to measure, time, and store in a data file. These types of device are not wearable/mountable, do not allow for portability, do not trigger some action or routine to provide direction, instruction, data, or feedback to the user, do not use corresponding target identifiers and targets, nor do they allow for the syncing with another device, shooting in a live fire environment, and requires facility development to conduct training.

U.S. Pat. No. 4,427,199 to Faith is a system that allows for start and stop signals, tracks target hits, a plurality of targets, and the time duration between start and when a predetermined number of hit signals have been counted. This type of device does not dictate the target for the shooter to shoot at. This type of device does not allow the user to adjust timings, target identifiers, or sequencing/order of presentation of the target identifiers. This type of device does not use corresponding target identifiers and targets. This type of device does not trigger some action or routine to provide direction, instruction, data, or feedback to the user, nor does it allow for varying the difficulty or syncing with another device.

There are many training devices intended to meet the needs of shooter training however none provide a user-portable, wearable/mountable multi-target engagement dictation device that can be utilized at any enclosed or open shooting range or area that includes the ability to vary the level of difficulty or the ability to choose randomization or prescription of target identifier presentation required in an integrated device that allows users to adjust and tailor their training scenario to best fit their needs. Additionally, no existing devices provide the previous capabilities while also providing feedback to the user and allowing for the device to be synced with another device to further enhance the training environment with other users.

Thus, the need exists for solutions to the above problems with the prior art.

SUMMARY OF THE INVENTION

A primary objective of the present invention is to provide training apparatus, devices, systems and methods for head mounted display screens, displays on eye glasses, and the like that identifies targets for users to shoot at whether randomly or in a prescribed manner and varies, among others, aspects of the timings such as the speed that target identifiers are provided and the duration the target identifier is shown in order to increase proficiency, accuracy, and the ability to react and engage multiple targets, so that the display dictates to the user which target to engage, wherein the targets can include but are not limited to: 2D planar materials with various graphics, such as sheets of paper, wood, or metal with printed, painted, or projected images or video displayed; 3-dimensional simulated human or animal figures; or simulated or actual vehicles, buildings, or other structures or items intended for target engagement training.

A secondary objective of the present invention is to provide apparatus, devices, systems, and methods for display screens mounted on weapons, such as rifles, pistols, and the like, or other mounting surfaces, such as walls, stands, and the like, that identifies targets for users to shoot at whether randomly or in a prescribed manner and varies, among others, aspects of the timing such as the speed that target identifiers are provided and the duration the target identifier is shown in order to increase proficiency, accuracy, and the ability to react and engage multiple targets, so that the display dictates to the user which target to engage, wherein the targets can include but are not limited to: 2D planar materials with various graphics, such as sheets of paper, wood, or metal with printed, painted, or projected images or video displayed; 3-dimensional simulated human or animal figures; or simulated or actual vehicles, buildings, or other structures or items intended for target engagement training.

The current invention includes a device for the presentation of visual target identifiers that correspond to targets that a user then engages. In the preferred embodiment, the device can comprise a primary housing, electronics, one or more sensors, a target identifier display consisting of one or more target indication elements, user input components, user feedback components, positional adjustment mechanisms, and attachment mechanisms.

In another embodiment a secondary housing can comprise additional electronic components, one or more sensors, user input components, user feedback components, and attachment mechanisms.

Through a user interface, the user can adjust and set various timing values such as the delay until the initial target identifier's display after the training sequence is initiated by the user, the delays between each presentation of individual target identifier, the on-time that a set of target identifiers is shown for before being cleared, the delay time that no presentation of target identifiers is shown for between the presentation of sets of target identifiers, the sequencing of the presentation of the various target identifiers, and the number of, or maximum number of, target identifiers shown in any given presentation set of target identifiers. These variations can be each be set by the user as a single value or set into ranges of values.

Alternatively, the device can be provided with pre-established preset ranges of values where each preset range can define an increasing difficultly level associated with the speed of the training sequence and with preset ranges of values where each preset range define the number of, or maximum number of, target identifiers shown in any given presentation set of target identifiers.

In one embodiment, the device's presentations offer one or more visual indications (i.e., target identifiers) to the user in a random manner such that the training experience of the individual in the engaging of the targets is unpredictable and each session of training is unique and not pre-established which better simulates real world conditions. The randomization occurs through, among others, aspects such as the variation of the delay leading up to the initial target identifier's display after the training sequence is initiated by the user, the variation of the delays between the presentation of each individual target identifier, the variation of the on-time that a set of target identifiers is shown for before being cleared, the variation of the delay time that no presentation of target identifiers is shown for between sets of target identifiers, the variation in the sequencing of the various target identifiers, and the variation of the number of, or maximum number of, target identifiers shown in any given presentation set of target identifiers.

In another embodiment, the device's presentations offer one or more visual indications (i.e., target identifiers) to the user in a prescribed manner such that the training experience of the individual in the engaging of the targets is predictable and each session of training is consistent and pre-established which allows a user to practice specific actions and methodologies which align to their training goals. The predictability occurs through, among others, aspects such as the prescription of the delay until the initial target identifier's display after the training sequence is initiated by the user, the prescription of the delays between each individual target identifier, the prescription of the on-time that a set of target identifiers is shown for before being cleared, the prescription of the delay time that no presentation of target identifiers is shown for between sets of target identifiers, the prescription in the sequencing of the various target identifiers, and the prescription of the number of, or maximum number of, target identifiers shown in any given presentation set of target identifiers.

In a preferred embodiment, the device is compact and as such, in combination with an interchangeable mounting system of components, it becomes wearable and/or attachable to surrounding objects such as the user, the user's clothing, the user's articles, the user's weapon, and the like. The device being wearable and/or attachable allows the user to conduct training in large areas not confined by a training system's physical size limitations and train more dynamically with a greater range of movement and distance of travel possible during a training scenario.

In one embodiment the device can include a multi-angle, multi-jointed viewing angle adjustment mechanism that allows the user to position the target indication elements in a position that is suitable to their preference at the time and for their current training scenario and training conditions. The placement of the target indication elements can be adjacent to the user's line of sight or directly overlapping the user's line of sight thereby creating an overlay over the target area of the target indication elements and thereby the target identifiers presented thereon. Allowing the user to adjust the position of the target indication elements allows for a variety of weapons to be used such that the device does not interfere with the positioning of the weapon with respect to the user or with respect to the necessary field of view downrange or to the periphery and allows for at least two different methods of placement of the target indication elements relative to the user's line of sight.

A critical method within the scope of the invention is the use of target identifiers that correspond to the available targets to be engaged by the user. By presenting target identifiers that correspond to the available targets, the user is thereby instructed to engage a particular target, or set of targets, and depending on the training scenario this can include the order in which to engage the targets, thereby mimicking the establishment of target priority and/or order of threat realization.

Additionally, the targets themselves can vary in such ways as to further challenge the user, among other aspects, such as by varying the target size, the number of instances of an individual target per-page or per-target station that correspond to a given target identifier, partial obscuring of a target, and the like.

In another embodiment the device can include a setting to allow for two or more devices to be in wireless communication such that the presentations of the target identifiers of a master device are simultaneously replicated on one or more subsequent passive devices. This creates a side-by-side equivalent user experience with respect to all of the various settings of the device between one or more users such that the users' target engagement results can be compared to one another in a competition format.

In another embodiment the device can include a setting to allow for two or more devices to be in wireless communication such that the presentations of the target identifiers of a first device are actively in use for a period and then conclude, upon which the presentations of the target identifiers of a second device are then actively in use for a period and then conclude, upon which the presentations of the target identifiers of the first or alternatively a third device continue the sequence, and so on. This method that creates a cooperative user experience with respect to all of the various settings of the device between one or more users such that the users' target engagement results can be compared to one another in a cooperative format.

In another embodiment the device can include sensors in the primary and/or secondary housings which can sense and collect data on the firing of one or more shots or other movement of the user. The device can analyze this data to provide instruction or feedback to the user on various aspects of their performance to improve or alter their abilities.

In the preferred embodiment the user can interact with the device in the following sequence, and as shown in FIGS. 10A through 10D, outlined here for example purposes:

Upon turning the device on the user can be presented with a set of options on an LCD screen. The options allow for the user to choose, see FIG. 10A, between customized user-prescribed settings or pre-loaded settings whereby, among other settings, the target identifier display sequence, presentation delay, variation of the on-time target identifiers are shown, and variation of the delay time where no target identifiers are presented is randomized. In the event the user selects (by utilizing the user interface), see FIGS. 10B and 10C, the pre-loaded settings, the user can be presented with an option to select a particular per-loaded variation of the training sequence. In the event the user selects (by utilizing the user interface), see FIG. 10D, the customized user-specified settings, the user can then be able to select and adjust the various timing settings and other variable options of the training sequence.

One preferred embodiment of the variation of the training sequence is defined by varying the maximum number of target identifiers presented in a given presentation set of target identifiers.

Another preferred embodiment of the variation of the training sequence is defined by varying the ranges of timing delays throughout the training sequence such that the training sequence is faster or slower thereby more or less challenging to the user. These two preferred embodiments of the variation of the training sequence can be utilized simultaneously such that the affects to the difficultly of the training sequence are compounded by factors of speed and additional target identifiers being presented.

The user is then able to select whether they preferred the target identifiers to be presented in a randomized sequence or whether they like to establish and enter their own sequence. Upon the user making their selection, the effects of which can be incorporated into the training sequence.

After all of the available options have been made (not all of which are discussed here in this example), the user is presented with a screen directing the user to take an action, such as pressing a particular button, to initiate the training sequence. Once the user has initiated the training sequence, a countdown can begin to allow the user to prepare themselves to engage the targets as dictated by the device. If not already done prior, the user can at this time fix the device to their desired location and positioning relative to their person, articles, weapon, and the like, and/or field of view. This can be accomplished by one of several interchangeable mounting components that accommodate a variety of attachment locations.

In the case of selecting the randomization setting, at the end of the countdown a random delay can be initiated before the first target identifier is presented. The randomization processes of the device can determine the number of target identifiers presented with each presentation set of target identifiers presented, up to the maximum number of target identifiers chosen by the user. The randomization processes of the device can also determine, among others, the delays between the presentations of individual target identifiers in a presentation set of target identifiers, the duration any given presentation set of target identifiers is presented for, and determine the delays between presentation sets of target identifiers. Presentation sets of target identifiers can continue to be displayed in this manner, continuously, until the user chooses to exit the training sequence.

In the case of selecting the prescribed setting, at the end of the countdown a prescribed delay can be initiated before the first target identifier is presented. The entries of the user can determine the number of target identifiers presented with each presentation set of target identifiers presented. The entries of the user can also determine, among others, the delays between the presentations of individual target identifiers in a presentation set of target identifiers, the duration any given presentation set of target identifiers is presented for, and determine the delays between presentation sets of target identifiers. Presentation sets of target identifiers can continue to be displayed in this manner, continuously, until the user chooses to exit the training sequence or until an optionally pre-established total duration of the training sequence has been completed.

In other embodiments, combinations of the above mentioned prescribed and randomized settings are possible to allow for greater control over the user's training experience.

During each presentation set of target identifiers, the user engages each individual target that corresponds to a target identifier in that presentation set of target identifiers. Randomly throughout the series of presentation sets of target identifiers or at prescribed points in the series of presentation sets of target identifiers, or based on the sensed movements of the user or the user's weapon, the user can be instructed to take a particular action such as reload their weapon or move to the next set of targets. Since the device is compact and wearable, the user can easily move unaffected by the device throughout a large course of fire.

Another selectable option within the preferred embodiment allows two or more users to wirelessly link their devices such that one master device dictates all the aspects of the training sequence to the other passive devices. The selections of the user, such as those described above, within the master device can govern all the aspects of the training sequences of the passive devices. For example, when the user takes an action to initiate the training sequence, all of the passive devices also are simultaneously initiated as well. Each passive device simultaneously duplicates all of the presentation sets of target identifiers and timings of the master device during the training sequence. This duplication allows the users to compete against one another having experienced the same randomized presentations of target identifiers.

The apparatus can include a primary housing that encases and/or mounts various electronic power and controlling elements, sensors, user input mechanisms, user feedback mechanisms, and the target identification element(s) that display the target identifiers.

The primary housing can take on many physical forms to encase and/or mount the various components of the device such as geometric shapes such as a box-like, rectangular, circular, and the like, or organic shapes such as curvilinear fluid shapes, but one unique form of the primary housing is that of a ring or the profile of a capsule (a rectangle with the two opposing shorter ends having full round ends) or other geometry that can surround the eyes individually or as a pair such that the user can look directly through a clear or open central area with one or both eyes and where the target indication elements are arranged around the perimeter areas.

A preferred embodiment of the primary housing is such that it can be highly compact, portable, and lightweight allowing the user to be very mobile in order to train in large scale training environments, to be able to maneuver in tight quarters of training environments, to be able to move rapidly, and all while keeping the device on or about them and thereby keeping the target indication elements visible as needed for a given training scenario.

The apparatus can include a secondary housing that encloses and/or mounts additional electronic elements that can communicate with the electronics of the primary housing, whether through a wired connection or wireless transmission, in order to transmit information gathered by various sensors, where such sensors and electronic elements are contained within or upon the secondary housing.

The secondary housing can additionally enclose and/or mount user input mechanisms, user feedback mechanisms, and sensors. Using straps, hook and loop fasteners, clips, or other attachment mechanisms, the secondary housing can be attached to the user's body; the user's clothing or wearable accessories, such as a hat, helmet, or glasses; a wall, table, chair, or other surface; or to the user's weapon or accessories attached to the weapon.

The preferred embodiment of the secondary housing is such that it can be highly compact, portable, and lightweight allowing the user to be very mobile in order to train in large scale training environments, to be able to maneuver in tight quarters of training environments, to be able to move rapidly, and all while keeping the device on or about them and thereby accessible as needed for a given training scenario.

Below outlines additional summaries of the various features and aspects of the invention:

The apparatus can include sensors and communication capabilities such as but not limited to one or more accelerometers, speakers, pressure sensors, global positioning system sensors, cellular communications, wireless fidelity (Wi-Fi), Bluetooth®, radio, or other such sensors or electronics used to gather data or transmit information.

The apparatus can include a multi-angle, multi-jointed viewing angle adjustment mechanism that is attached to the primary and/or secondary housing to provide customization for the user in the positioning of the housing as positioned from the primary or secondary housing's interchangeable mounting mechanism attachment feature.

The apparatus can include a system of interchangeable mounting mechanisms which can be utilized to attach the apparatus to such things as, but not limited to: the user's body; the user's clothing or wearable accessories, such as a hat, helmet, or glasses; a wall, table, chair, or other surface; or can be attached to the user's weapon or accessories attached to the weapon.

The interchangeable mounting mechanism can be comprised of, but not limited to, spring loaded compression clip(s), wedging clip(s), threaded fastener(s), weapon rail attachment mechanism(s), adhesive(s), adhesive tape(s), a weapon scope attachment mechanism, suction cup mechanisms, and the like or combinations thereof. Each variation of the interchangeable mounting mechanisms can be attached and detached to the primary housing, the secondary housing, and/or the multi-angle, multi-jointed viewing angle adjustment mechanism as needed for the particular mounting needs of the user and training scenario.

A target indication element a take-action indication element can take the form of: light emitting target indication elements such as but not limited to a set of light emitting diodes (LEDs), set of light bulbs, one or more liquid crystal displays (LCDs) or similar display screen (and the graphics, text, and the like, displayed thereon), or any other similarly energized illuminating element; or mechanical target, or take-action indication elements that physically present target or take-action identifiers to the user such as, but not limited to, an image on a card, rotating drum, and the like; or whatever such form the physical target or take-action indication element can take. Target or take-action indication elements are the means by which the target or take-action identifiers are displayed, respectively.

A target identifier and/or take-action identifier can be defined by, but not limited to, a recognizable and distinguishable shape, color, number, symbol, letter, code character, image, phrase or combination of words, illumination of one or more LEDs (light emitting diodes) or LCDs (liquid crystal displays) or similar display screen (or a portion or portions thereof), series of flashes or particular pattern of flashes of one or more LEDs or LCDs or similar display screen (or a portion or portions thereof), illumination of a particular color or pattern of colors of one or more LEDs or LCDs or similar display screen (or a portion or portions thereof), sound or series of sounds, imparted force or series/pattern of imparted forces upon the user, weapon, or other mounted item, vibration or series/pattern of vibrations, or other such distinguishable identifying visualization, audible sound, or tactile feedback or combinations thereof.

The apparatus can include a target indication method which is defined by the use of one or more target indication elements to present one or more target identifiers to indicate and thereby dictate to the user to engage one or more particular targets that correspond to the target identifiers being presented. The apparatus can include a take-action indication method which is defined by the use of one or more take-action indication elements to present one or more take-action identifiers to indicate and thereby dictate to the user or users to proceed with some specified physical or mental action or series of actions or halt an occurring action or series of actions. The action can be specified by the user in the training sequence settings or be established by the authors of the rules of a particular training sequence. Some examples of actions to be dictated can be, but are not limited to, physical directional movement (forward, backward, diagonal), switch weapons, switch weapon to other hand, reload weapon, start/stop running, kneel, lay down, holster weapon, engage/disengage weapon safety, etc. with further examples shown in FIG. 11.

The apparatus can activate target indication elements, which are the means by which target identifiers are displayed/presented, in a random or prescribed order such that when presented, a user can engage the target(s) that correspond to the target identifier(s) being presented by the target indication element(s). The apparatus activates target indication elements in a prescribed number of, or continuous series of, presentation sets of target identifiers, where each presentation set of target identifiers presents one or more target identifiers via the activation of the target indication elements.

The apparatus can activate take-action indication elements, which are the means by which take-action identifiers are displayed/presented, respectively, in a random or prescribed manner such that when presented, a user can take an action that corresponds to the take-action identifier(s) being presented by the take-action indication element(s). The apparatus activates take-action indication elements by inserting a take-action identifier into a series of presentation sets of target identifiers in a prescribed or randomized manner.

A presentation set of target identifiers can be defined by the series of steps conducted to present one or more individual target identifiers via the target indication elements, hold the presented state for a duration, and then remove the one or more individual target identifiers from presentation.

The number of individual target identifiers presented and their order can vary, whether by pre-determined prescription or by randomization, with each instance of a presentation set of target identifiers. Within a presentation set of target identifiers, where instances of multiple individual target identifiers are being presented, those individual target identifiers can be presented simultaneously with no delay between the presentation of each individual target identifier or in a sequence, such that a first presentation of one or more individual target identifiers are presented, then held presented for a duration, then a second presentation of one or more individual target identifiers are presented, at which point the first and second presentations of one or more individual target identifiers are held presented for a duration, and so on until all of the presentations of one or more individual target identifiers in the set that can be presented based on the settings established by the user have been presented and held for a duration.

The conclusion of a presentation set of target identifiers can occur upon the removal of all of the individual target identifiers from presentation to the user. The conclusion of a presentation set is followed by an idle (no presentation of target identifiers) period that occurs prior to the next presentation set of target identifiers being presented in a series of presentation sets of target identifiers.

The duration of an individual presentation set of target identifiers can be defined by the total duration from the presentation of the first individual target identifier within the presentation set of target identifiers to the removal from presentation of all of the individual target identifiers in an individual presentation set of target identifiers.

The idle (no presentation of target identifiers) period between presentation sets of target identifiers in a series of presentation sets of target identifiers can be defined by the total absence of target identifiers being presented to the user at the conclusion of a presentation set of target identifiers and prior to the subsequent presentation set of target identifiers in a series of presentation sets of target identifiers being presented.

A series of presentation sets of target identifiers can be defined by a sequence that consists of at least an initial presentation set of target identifiers being presented, an idle (no presentation of target identifiers) period, followed by a presentation set of target identifiers and the conclusion of that presentation set of target identifiers. The sequence of a presentation set of target identifiers being presented, followed by an idle (no presentation of target identifiers) period, followed by a presentation set of target identifiers, followed by an idle (no presentation of target identifiers) period, and so forth, can continue indefinitely or have an established number count to conclude the series of presentation sets of target identifiers that is established by the user's settings.

A training sequence can be defined by a series of presentation sets of target identifiers, whether randomized or prescribed, which can include various take-action indications presented between presentation sets of target identifiers.

A training scenario can be defined by the simulation of a situation one might encounter in daily life or while performing their duties that can involve a variety of variables such as time of day, number of targets, positioning of targets, indoors versus outdoors, involvement of vehicles, etc.

The apparatus can include user input mechanisms, such as but not limited to buttons, dials, thumb wheels, touch screens, etc., for the user to interface with the device to select, adjust, and enter the various settings and controls of the device.

The apparatus can allow for a user interface to allow for the selection, adjustment, and entering of various settings into the user menus in order to, among others: alter the number of presentation sets of target identifiers to present in a series of presentation sets of target identifiers; determine whether the number of presentation sets of target identifiers should be set to a fixed count or continuous with no set ending count for the series of presentation sets of target identifiers; alter the number of target identifiers presented per presentation set of target identifiers or the maximum number of possible target identifiers presented per presentation set of target identifiers; alter the order, duration, and sequence of the target identifiers presented per presentation set of target identifiers; alter the duration of the idle (no presentation of target identifiers) period between presentation sets of target identifiers; alter the settings of the presentation of a take-action identifier; and alter other settings of the device.

The apparatus can make use of target indication elements by the use of a microprocessor combined with light emitting target indication elements such as but not limited to a set of LEDs, set of light bulbs, one or more LCDs or similar display screens (and the graphics displayed thereon), or any other similarly energized illuminating element, or with physical mechanical means such as a rotating drum or an image on a card, that presents target identifiers to the user.

The target indication elements can be activated to present target identifiers to the user singularly or multiple at a time and, in either case, are held activated for a duration that can vary depending on the settings established by the user's selections and entries to the device's settings. The period that the target indication elements and their target identifiers are held idle (no presentation of target identifiers) can also vary depending on the setting(s) established by the user's selection(s) and entry(s) in the device's settings. When activating multiple target indication elements to present multiple target identifiers in a presentation set of target identifiers, the target identifiers can be presented simultaneously, or presented in a sequence with some delay between the presenting of one or more individual target identifier in the sequence. Presenting multiple target identifiers in a sequence with some delay between the presentations of one or more individual target identifier allows the user to more easily take mental note of each individual target identifier presented in that presentation set of target identifiers.

The apparatus can use randomizing processes (by the use of randomizing computer code and/or other electronic methods) for, but not limited to and allowing for combinations of, the following:

to randomize the number of target indication elements activated in a given presentation set of target identifiers to present any number of target identifiers within a presentation set of target identifiers up to the total number of available target indication elements on the device or up to the maximum number of target identifiers per presentation set of target identifiers established by the user's settings (while there are many examples of this method, one example, for illustrative purposes, can be if a user were to select, change, and/or enter the option to have any number up to, but in this example not more than, 4 target indication elements activated during any given presentation set of target identifiers in a series of presentation sets of target identifiers, then during use, for each presentation set of target identifiers within a series of presentation sets of target identifiers, at random, one, two, three, or four target identifiers can be presented);

to randomize the duration of presentation of each individual target identifier in a presentation set of target identifiers;

to randomize the order, and re-ordering, of the presentation of individual target identifiers in a presentation set of target identifiers;

to randomize the timing of the presentations of the individual target identifiers in a presentation set of target identifiers;

to randomize the duration of the idle (no presentation of target identifiers) period between presentation sets of target identifiers;

to randomize the number of presentation sets of target identifiers in a series of presentation sets of target identifiers;

to randomize the insertion point of a presentation of a take-action identifier into a series of presentation sets of target identifiers;

to randomize the duration of a presentation of a take-action identifier in a series of presentation sets of target identifiers;

to randomize the duration of the idle (no presentation of target identifiers) period following the presentation of a take-action identifier;

to randomize the duration of the beginning idle (no presentation of target identifiers) period prior to the initial presentation set of target identifiers starting.

User selections and entries in the user interface menus can alter the variability of the randomness and durations of these settings individually, or in groups by way of a single scalar value that alters several settings simultaneously.

This method of allowing for the use of randomizing processes thereby creates a more randomized experience for the user which is intended to prevent the potential for the user to memorize the timing, order, sequencing, etc. of the presentation of target indication elements and/or presentation sets of target identifiers within any series of presentation sets of target identifiers.

The apparatus can use prescriptive processes (by user selections and entries into the user interface menus) for, but not limited to and allowing for combinations of, the following:

to prescribe the number of target indication elements activated in a given presentation set of target identifiers;

to present any number of target identifiers within a presentation set of target identifiers up to the total number of available target indication elements on the device or up to the number of target identifiers per presentation set of target identifiers limit established by the user's settings;

to prescribe the duration of presentation of each individual target identifier in a presentation set of target identifiers;

to prescribe the order and re-ordering of the presentation of individual target identifiers in a presentation set of target identifiers; to prescribe the timing of the presentations of the individual target identifiers in a presentation set of target identifiers;

to prescribe the duration of the idle (no presentation of target identifiers) period between presentation sets of target identifiers;

to prescribe the number of presentation sets of target identifiers in a series of presentation sets of target identifiers;

to prescribe the insertion point of the presentation of a take-action identifier into a series of presentation sets of target identifiers;

to prescribe the duration of a presentation of a take-action identifier in a series of presentation sets of target identifiers;

to prescribe the duration of the idle (no presentation of target identifiers) period following the presentation of a take-action identifier;

to prescribe the duration of the beginning idle (no presentation of target identifiers) period prior to the initial presentation set of target identifiers starting.

This method of allowing for the user to prescribe the settings for the timing, order, sequencing, etc. of the presentation allows for a more customized experience for the user which is intended to allow for repetitive and rehearsed practice.

In other embodiments, combinations of the above mentioned prescribed and randomized settings are possible to allow for greater control over the user's training experience.

The apparatus can indicate to the user to proceed with some specified physical or mental action or series of actions or halt an occurring action or series of actions by presenting a special take action identifier such as, but not limited to, a special character, number, symbol, shape, image, series of flashes of LEDs or LCDs or similar display screen, illumination of a particular color or pattern of LED(s) or LCDs or similar display screen, etc. The presentation of a take action identifier can be inserted into a series of presentation sets of target identifiers at a pre-defined point within the series of presentation sets of target identifiers or randomly occur within a series of presentation sets of target identifiers depending on the selections and entries made by the user in the user menus. The user can also determine the specific pre-defined point where the presentation of a take action identifier can be inserted into a series of presentation sets of target identifiers via selections and entries made in the user menus. In either case, the presentation of a take action identifier can occur following the conclusion of a given presentation set of target identifiers and hold for a duration determined by the user's selections and entries into the user menus.

The apparatus can provide a sequenced countdown indication prior to beginning a presentation set of target identifiers or series of presentation sets of target identifiers by the use of: a series of LEDs being turned on sequentially or turned off sequentially; a numeric countdown on one or more LCDs or similar display screen; a numeric countdown on a segmented LED display; the changing of colors of one or more LEDs or images, graphics, or symbols on an LCD or similar display screen; the changing, altering, or cycling of any other graphics or symbols; the displaying of any textual message or series of textual messages; or any other method of providing for an indication of a countdown.

The apparatus can provide user interface menu(s) on one or more LCD screens or similar display screen by displaying graphical images or textual messages from which settings can be selected, altered, and entered.

The apparatus can provide a user interface menu(s) through one or more LEDs by providing specific textual or graphical images on the primary or secondary housing alongside corresponding LEDs so that once an LED is illuminated, the user can take note that that particular textual or graphical image is applicable.

The apparatus can provide a user interface menu(s) through one or more segmented LEDs by providing an incrementing number count on the segmented LED(s) for the various settings that can require or be represented by a number value adjustment. In this manner, the various settings can, one-by-one, be adjusted and/or entered until all or any of the desired settings have been entered.

The apparatus can provide a user interface menu(s) through one or more LEDs by illuminating one or more LEDs alone, or in combination, or by way of flashing LEDs, or by way of the rate of flashing, or a coded pattern of flashing so that once one or more LEDs is illuminated or flashing, the user can take note that the particular message that corresponds to the illumination of, or flashing of, or pattern of flashing of LEDs that is applicable to the settings they are intending on adjusting and entering.

The apparatus can detect shots being fired by one or more or combinations of any of the following but not limited to: microphone sensors that detect the audible noise of the shot; by accelerometer sensors that detect the forces of and movement associated with the recoil on the weapon or the forces of recoil thereafter imparted to the user or other surface or object the primary or secondary housing can be mounted to; and/or by air pressure sensors that detect the change in ambient air pressure caused by the expansion of gases of the shot being fired.

The apparatus can detect movements of the user or the user's weapon through one or more sensors, such as an accelerometer, of the primary and/or secondary housings. The sensed movements of the user can be used to trigger some action or routine within the device's computer program code, which then can analyze the sensed movements in order to provide direction, instruction, data, or feedback to the user to improve or alter their abilities.

The apparatus can provide feedback to the user through user feedback mechanisms by means of but not limited to: motors and weight systems that can generate vibration; actuators that can generate a physical applied force; speakers that provide audible tones or messages or vibration; visual graphics or messages displayed on a LCD or similar display screen whether a part of the apparatus or a separate device such as a mobile phone; or illuminating LEDs or other similar light emitting elements.

The apparatus can include an on/off power switch which allows the user to power off or to power on the device.

The apparatus can include a power charging port in order to recharge a battery used in powering the device's electronics and powered mechanisms. In some embodiments, this can also be simultaneously used as the communications port, an example being a USB (Universal Serial Bus) port.

The apparatus can include a communications port which allows for data transfer between the apparatus and another instance of the apparatus; between the primary housing and the secondary housing; or between the apparatus and another device such as a computer or mobile phone. In some embodiments, this can also be simultaneously used as the power charging port, an example being a USB (Universal Serial Bus) port.

The apparatus can include wireless communication capabilities via a radio transmission device such as Bluetooth®, Wi-Fi, or other wireless communication methods.

The apparatus can communicate between one or more additional instances of the apparatus to allow for "side-by-side" simultaneous competition between multiple users of two or more of the apparatus where each user has their own instance of the apparatus and can be accomplished by wired communication via a communication port or wireless communication via radio or other types of wireless communications between the various instances of the apparatus.

One instance of the apparatus can be selected as the master device providing information and instructions to the other instances of the apparatus selected to be passive instances of the apparatus. The instructions and information provided to the passive instances of the apparatus can be inclusive of all that is necessary to mimic the presentation sets, target identifiers, and take-action identifiers being presented, timings, etc. of the master device during use such that each instance of the apparatus and their users experience the same presentations of the various identifiers simultaneously. This "side-by-side" simultaneous competition can also be accomplished by the simultaneous use/sharing of one or more instances of the apparatus between multiple users.

The apparatus can communicate between one or more additional instances of the apparatus to allow for "cooperative" simultaneous training between multiple users of two or more of the apparatus where each user has their own instance of the apparatus and can be accomplished by wired communication via a communication port or wireless communication via radio or other types of wireless communications between the various instances of the apparatus. One instance of the apparatus can be selected as the master device that initiates the sequence for the other instances of the apparatus selected to be passive instances of the apparatus. The instructions and information provided to the passive instances of the apparatus can be inclusive of all that is necessary to transition the role of shooter of the targets from one user's device to another such that each user is engaging the targets for a period as dictated by the device. This "cooperative" simultaneous training can also be accomplished by the simultaneous use/sharing of one or more instances of the apparatus between multiple users.

The apparatus can include a method of using corresponding targets that involves the use of targets that a user can correlate to the target identifiers of the target indication elements of the device such that when a particular target identifier is presented to the user by the device, the user can thereby be directed to engage those targets of that same target identifier. If multiple target identifiers are presented together, the user can thereby be directed to engage each of those various targets corresponding to those target identifiers.

The apparatus can include a method of using targets which vary in, but not limited to, size, form, degrees of being obscured, number of individual targets present per target sheet, etc. to provide a varying level of difficulty to the user during use.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 7D is a top view of the component shown in FIG. 7C mounted to an accessory attachment rail.

FIG. 7D.SECTIONAL is a cross-sectional view of FIG. 7D along arrow B that shows an elevation partial section view of the interchangeable mounting mechanism rail mounting embodiment sectioned from a top down view of the same. The section view demonstrates the snap-on features engaging the over-hangs of the accessory attachment rail as well as the interchangeable mounting mechanism rail mounting embodiment's rail mounting point keying feature.

FIG. 8B.SECTIONAL is a cross-sectional view of FIG. 8B along arrow A that shows an elevation cross section of the interchangeable mounting mechanism glasses mounting embodiment that is sectioned from a top down view of the assembly of the multi-angle, multi-jointed viewing angle adjustment mechanism and the interchangeable mounting mechanism glasses mounting embodiment. The section view depicts opposing pressure applied via opposing dotted arrows directed at each of the glasses mounting clips which compresses the glasses mounting spring (torsion spring).

FIG. 11 is a table listing a representative sample of possible take action steps that a user/shooter can utilize in their training scenario.

DESCRIPTION OF THE PREFERRED EMBODIMENTS

Figure 1A:
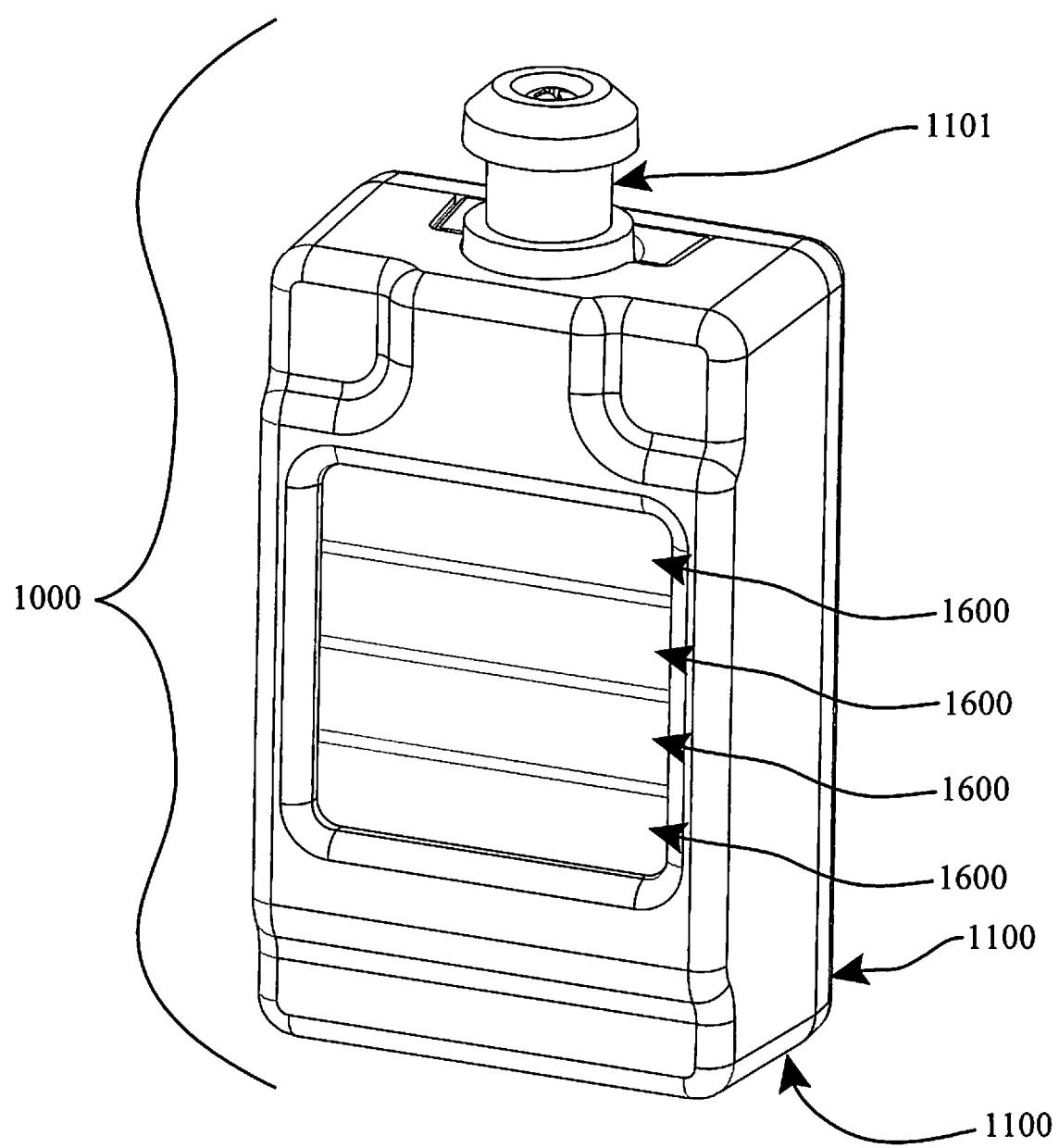
FIG. 1A is a perspective front view outline of the preferred embodiment of the primary housing assembly of a target dictation apparatus according to the invention that exemplifies a set of target indication elements as well as the primary housing interchangeable mounting mechanism male attachment feature.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Below is a list of all of the components and features discussed that are associated with the preferred embodiment of the primary housing assembly:

- 1000 is a Primary Housing Assembly (which includes all of the sub-components listed from item number 1100 to 1714)
- 1100 is a Primary Housing Enclosure Element
- 1101 is a Primary Housing Interchangeable Mounting Mechanism Male Attachment Feature
- 1200 is a Primary Housing Fasteners
- 1300 is a Primary Housing Exterior Push Button User Input Mechanism
- 1400 is a Primary Housing Exterior On/Off Power Switch
- 1500 is a Primary Housing Battery & Male Battery Connector
- 1600 is a Primary Housing LCD Target Indication Element, or Target Identifier Display
- 1700 is a Primary Housing Electronics
- 1701 is a Primary Housing PCB
- 1702 is a Primary Housing Microprocessor
- 1703 is a Primary Housing Wireless Communication Antennae
- 1704 is a Primary Housing USB Power & Wired Communication Port
- 1705 is a Primary Housing Female Battery Connector
- 1706 is a Primary Housing Electronic On/Off Power Switch
- 1707 is a Primary Housing Voltage Regulator
- 1708 is a Primary Housing Accelerometer Sensor 1709 is a Primary Housing Microphone Sensor
1710 is a Primary Housing Speaker User Feedback Mechanism
1711 is a Primary Housing Vibratory User Feedback Mechanism
1712 is a Primary Housing Electronic Push Button User Input Mechanism
1713 is a Primary Housing Target Indication Element Connection Port
1714 is a Primary Housing LED User Feedback Mechanism Below is a list of all of the components and features discussed that are associated with the preferred embodiment of the secondary housing assembly:
2000 is a Secondary Housing Assembly (which includes all of the sub-components listed from item number 2100 to 2614):
2100 is a Secondary Housing Enclosure Element
2101 is a Secondary Housing Interchangeable Mounting Mechanism Rail Attachment Feature
2200 is a Secondary Housing Exterior Push Buttons User Input Mechanism
2300 is a Secondary Housing Exterior On/Off Power Switch
2400 is a Secondary Housing Battery & Male Battery Connector
2500 is a Secondary Housing LCD User Feedback Mechanism
2600 is a Secondary Housing Electronics
2601 is a Secondary Housing PCB
2602 is a Secondary Housing Microprocessor
2603 is a Secondary Housing Wireless Communication Antennae
2604 is a Secondary Housing USB Power & Wired Communication Port
2605 is a Secondary Housing Female Battery Connector
2606 is a Secondary Housing Electronic On/Off Power Switch
2607 is a Secondary Housing Voltage Regulator
2608 is a Secondary Housing Accelerometer Sensor
2609 is a Secondary Housing Microphone Sensor
2610 is a Secondary Housing Speaker User Feedback Mechanism
2611 is a Secondary Housing Vibratory User Feedback Mechanism
2612 is a Secondary Housing Electronic Push Button User Input Mechanisms and PCB
2613 is a Secondary Housing LCD User Feedback Connection Port
2614 is a Secondary Housing LED User Feedback Mechanism Embodiments of the interchangeable mounting mechanism components/assemblies are listed below and include components/sub-assemblies 3100, 3200, 3300, 3400, and 3500.

Below is a list of all of the components and features discussed that are associated with the scope profile matching embodiment of the interchangeable mounting mechanism assembly:
3100 is an Interchangeable Mounting Mechanism Scope Profile Matching Embodiment (which includes all of the sub-components listed from item number 3101 to 3102)
3101 is an Interchangeable Mounting Mechanism Scope Profile Matching Embodiment Scope Attachment Profile
3102 is an Interchangeable Mounting Mechanism Scope Profile Matching Embodiment Fastener Attachment Feature Below is a list of all of the components and features discussed that are associated with the rail mounting embodiment of interchangeable mounting mechanism assembly:
3200 is an Interchangeable Mounting Mechanism Rail Mounting Embodiment (which includes all of the sub-components listed from item number 3201 to 3203).
3201 is an Interchangeable Mounting Mechanism Rail Mounting Embodiment Female Mounting Point Snap-on Features
3202 is an Interchangeable Mounting Mechanism Rail Mounting Embodiment Rail Mounting Point Snap-on Features
3203 is a Rail Mounting Embodiment of the Interchangeable Mounting Mechanism's Rail Mounting Point Keying Feature Below is a list of all of the components and features discussed that are associated with the glasses mounting embodiment of interchangeable mounting mechanism assembly:
3300 is an Interchangeable Mounting Mechanism Glasses Mounting Embodiment (which includes all of the sub-components listed from item number 3301 to 3303)
3301 is a Glasses Mounting Clip
3302 is a Glasses Mounting Spring
3303 is a Glasses Mounting Fastener Below is a list of all of the components and features discussed that are associated with the multi-angle, multi-jointed viewing angle adjustment mechanism embodiment of the interchangeable mounting mechanism assembly:
3400 is a Multi-angle, Multi-jointed Viewing Angle Adjustment Mechanism (which includes all of the sub-components listed from item number 3401 to 3404)
3401 is an Angle Adjustment Arm
3402 is an Angle Adjustment Arm's Female Mounting Point Snap-on Features
3403 is an Angle Adjustment Rotation Swivel
3404 is an Angle Adjustment Rotation Swivel Fastener Below is a list of all of the components and features discussed that are associated with the interchangeable mounting mechanism wrist strap rail embodiment of the interchangeable mounting mechanism assembly:
3500 is an Interchangeable Mounting Mechanism Wrist Strap Rail Embodiment Below is a list of all of the components and features discussed that are associated with the user/shooter, the targets, example weapons, and their features used:
4000 is a User/Shooter
4001 is a pair of Glasses
4100 is a Target sheet, or Target Materials that contains multiple Target Identifiers
4101 is an individual Target that corresponds to a Target Identifier
4102 is a Target or Take Action Identifier displayed on a Target Indication Element
4200 is a Rifle
4201 is a Rifle Accessory Attachment Rail
4202 is a Rifle Scope
4300 is a Pistol
4301 is a Pistol Accessory Attachment Rail
4400 is an Accessory Attachment Rail Below is a list of all of the components and features discussed that are associated with the look-through embodiment of the primary housing assembly:

7000 is a Primary Housing Look-through Ring Embodiment (which includes all of the sub-components listed from item number 7100 to 7715)

7100 is a Primary Housing Look-through Ring Embodiment Housing Element

7101 is a Primary Housing Look-through Ring Embodiment Interchangeable Mounting Mechanism Male Attachment Feature

7200 is a Primary Housing Look-through Ring Embodiment Exterior Push Button User Input Mechanism

7300 is a Primary Housing Look-Through Ring Embodiment Exterior On/Off Power Switch

7400 is a Primary Housing Look-through Ring Embodiment Battery & Male Battery Connector

7500 is a Primary Housing Look-through Ring Embodiment LCD Target Indication Element

7600 is a Primary Housing Look-through Ring Embodiment LCD User Feedback Mechanism

7700 is a Primary Housing Look-through Ring Embodiment Electronics

7701 is a Primary Housing Look-through Ring Embodiment PCB

7702 is a Primary Housing Look-through Ring Embodiment Microprocessor

7703 is a Primary Housing Look-through Ring Embodiment Wireless Communication Antennae

7704 is a Primary Housing Look-through Ring Embodiment USB Power & Wired Communication Port

7705 is a Primary Housing Look-through Ring Embodiment Female Battery Connector

7706 is a Primary Housing Look-through Ring Embodiment Electronic On/Off Power Switch

7707 is a Primary Housing Look-through Ring Embodiment Voltage Regulator

7708 is a Primary Housing Look-through Ring Embodiment Accelerometer Sensor

7709 is a Primary Housing Look-through Ring Embodiment Microphone Sensor

7710 is a Primary Housing Look-through Ring Embodiment Speaker User Feedback Mechanism

7711 is a Primary Housing Look-through Ring Embodiment Vibratory User Feedback Mechanism

7712 is a Primary Housing Look-through Ring Embodiment Electronic Push button User Input Mechanisms & PCB

7713 is a Primary Housing Look-through Ring Embodiment Target Indication Element Connection Port

7714 is a Primary Housing Look-through Ring Embodiment LCD User Feedback Connection Port

7715 is a Primary Housing Look-through Ring Embodiment LED User Feedback Mechanism Examples of possible configurations of the apparatus and associated methods will now be discussed in more detail. The examples depicted in the drawings and described below are provided for the purpose of illustration and are not intended to disclose all possible configurations or examples or limit the scope of possible configurations or examples.

Apparatus for the dictation of the selection of target engagements by a user by methods of activating target indication elements to present target identifiers that correspond to the available targets' shape, color, number, symbol, letter, code, character, image, or other such identifier or combinations thereof in prescribed sequences or at random.

The following section describes some of the possible embodiments of the primary housing assembly:

While several embodiments are described further herein, an example embodiment of the apparatus includes: a primary housing assembly FIG. 1A, for the purpose of storing and/or mounting the primary housing electronics, primary housing battery and male battery connector, user input mechanisms, user feedback mechanisms, target indication elements, power ports, communication ports, and an on/off power switch; interchangeable mounting mechanism male attachment features for the purpose of attaching or mounting the device to the user, to the user's clothing, hat, helmet, glasses, weapon, weapon accessory, etc., or another adjacent surface or structure for various applications and for allowing variability of alignment of the target indication elements to a desired position by the user.

In the preferred embodiment, the primary housing assembly 1000 can take the form of an enclosure that contains some or all of the electronic components and is formatted to include an LCD or the like which are presented to the user as target identifiers. The preferred embodiment of the primary housings 1000 is such that it is highly compact and portable allowing the user to be very mobile in order to train in large scale training environments while keeping the device on or about them and thereby visible and accessible as needed for a given training scenario.

FIG. 1A is a perspective front view outline of an embodiment of the primary housing assembly of a target dictation apparatus according to the invention. FIG. 1A shows the primary housing assembly to include component 1100 which is a primary housing enclosure element, component 1101 which is a interchangeable mounting mechanism attachment feature, and component 1600 which is a target indication element in the form of an LCD (liquid crystal display). Component 1101 is a mounting mechanism to allow the user to attach and detach the various mounting devices discussed herein to facilitate the various applications involved in various training scenarios.

In the preferred embodiment of the primary housing assembly FIG. 1A, the several components 1600 are the target indication elements and are the main information relay device from the apparatus to the user and is where target identifiers are displayed to the user.

Figure 2A:
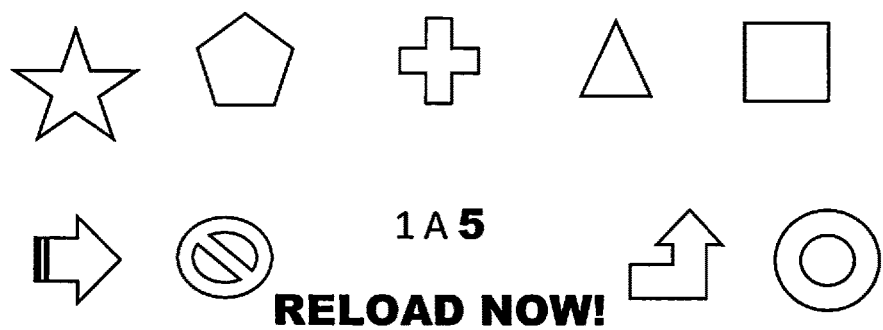
FIG. 2A is a representative, but not all inclusive, set of example target and take action identifiers. Bracketed text descriptors are used to represent the use of color as a target and/or take action identifier.
Figure 2B:
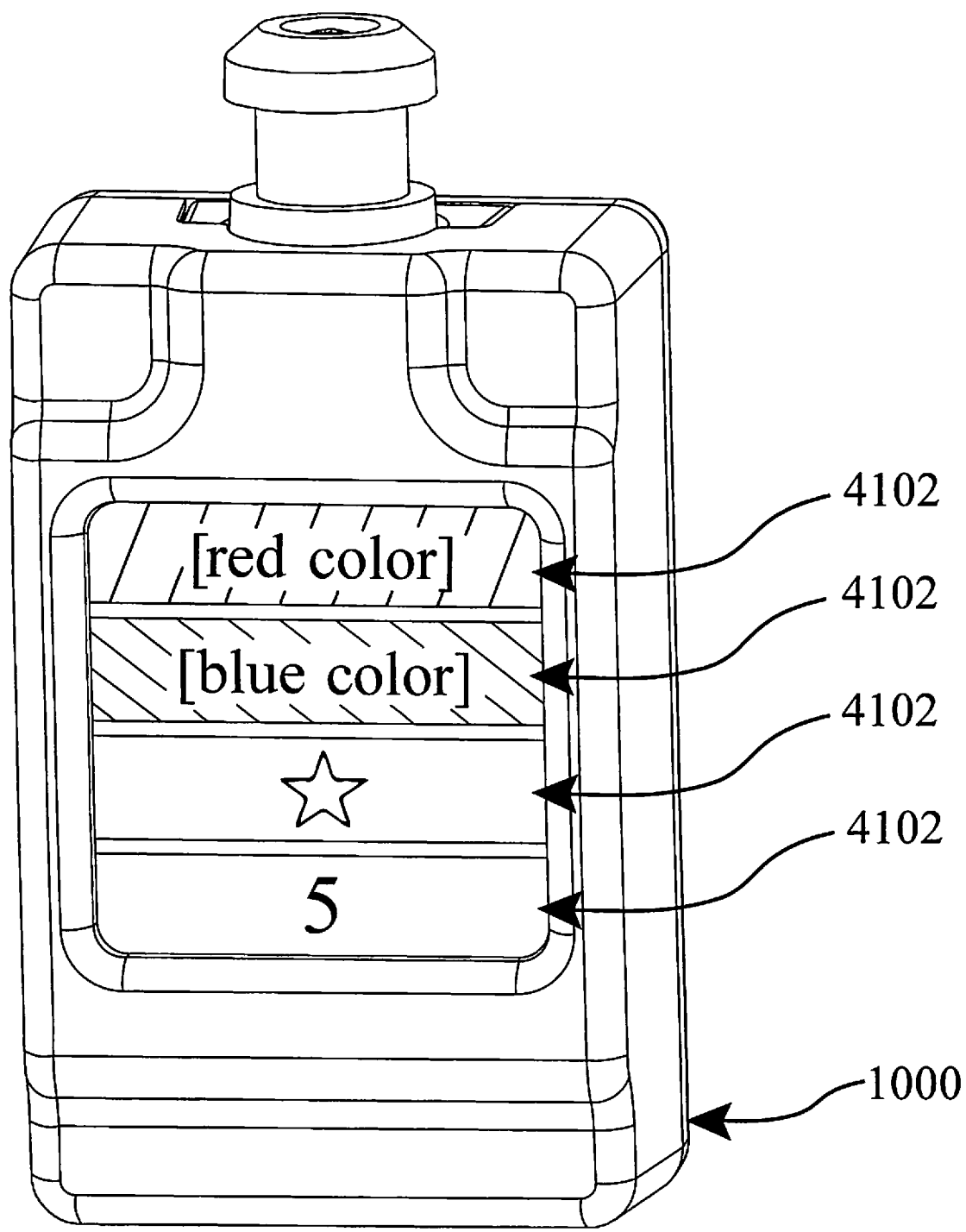
FIG. 2B shows a perspective front view outline of the embodiment shown in FIG. 1A with random target and take action identifiers shown for the sake of example.

In another embodiment, the primary housing assembly can take the form of an enclosure that contains some or all of the electronic components and is formatted to include one or more LCD screens 1600 in FIG. 2B or the like which are presented to the user as primary housing target indication elements 1600. The use of an LCD screen can offer a broad capability with respect to the variety of target identifiers that can be presented. Additionally, the use of an LCD screen allows for additional information, feedback, demonstration, and instruction to be offered on the device.

Figure 1B:
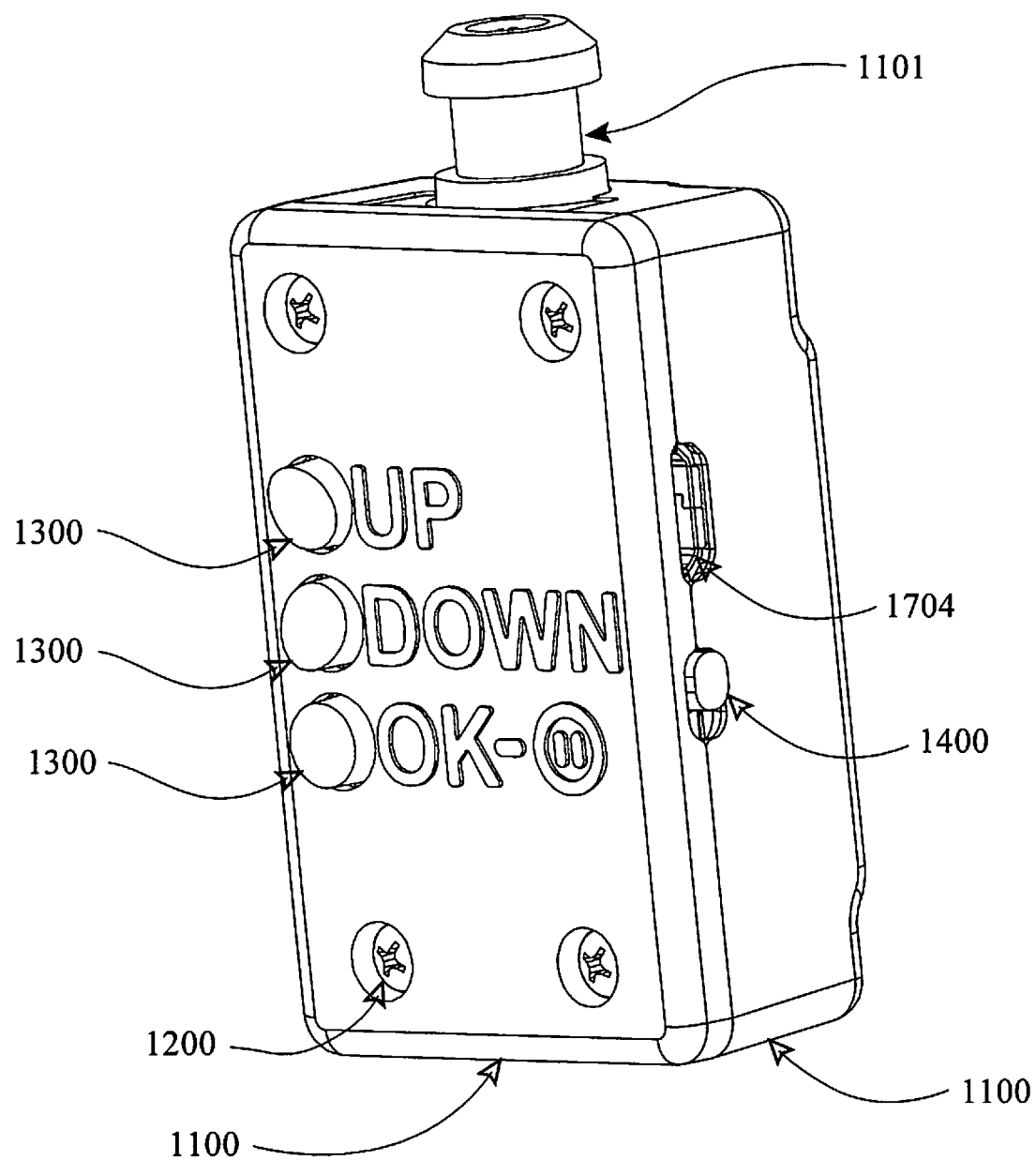
FIG. 1B is a perspective rear view outline of the embodiment shown in FIG. 1A showing the primary housing interchangeable mounting mechanism male attachment feature and the primary housing exterior push button user input mechanism of the target dictation apparatus.

FIG. 1B is a rear view outline of the embodiment of FIG. 1A of a target dictation apparatus according to the invention. FIG. 1B shows the primary housing assembly to include components 1100 which are primary housing enclosure elements, components 1200 which are primary housing fasteners, components 1300 which is a primary housing exterior push button user input mechanism, component 1101 which is a primary housing interchangeable mounting mechanism male attachment feature, component 1704 which is a primary housing USB power & wired communication port, and component 1400 which is a primary housing exterior on/off power switch. Components 1300 are the primary housing exterior push button user input devices whereby the user interfaces with the devices menus and enters the various selections and options of the device. Component 1704 is where the user plugs a charging cable to recharge the primary housing battery or alternatively can connect the device to a secondary housing assembly or another tertiary device such as a computer or mobile phone for data communication between the various devices. Component 1400 is a primary housing exterior on/off switch used to engage the internally located primary housing on/off switch in order to turn the device on or off.

Figure 1C:
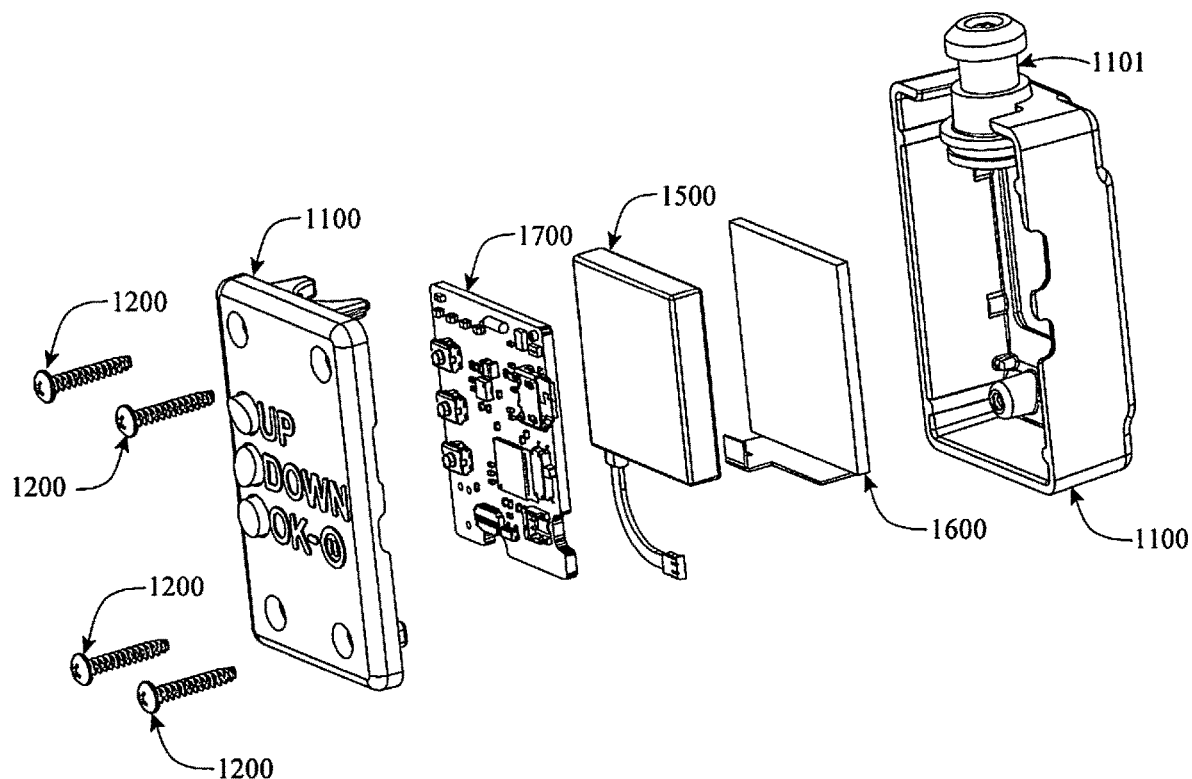
FIG. 1C shows an exploded view of the embodiment shown in FIG. 1A that includes the primary housing battery & male battery connector, an LCD configuration of target indication element, and the primary housing electronics.

FIG. 1C is an exploded view of the preferred embodiment of the primary housing assembly of a target dictation apparatus according to the invention and shows the alignment of the internal components within the primary housing assembly. The internal components of the preferred embodiment can include a printed circuit board assembly (PCBA) 1700, a low profile compact battery 1500 that attaches to the PCBA, an LCD screen used to present the target identifiers as well as other information and feedback such as the option menus discussed in FIG. 10A through 10D. The primary housing enclosure elements and the components contained within of the preferred embodiment are assembled together via a set of primary housing fasteners 1200, such as but not limited to screws, bolts and the like.

In another embodiment, the primary housing assembly can be powered by the use of one or more batteries mounted upon or contained within the device.

In another embodiment, the primary housing assembly can be powered by the use of one or more wired powered sources from an off-board power source(s) to the device, such as a wall plug outlet, and the like.

Figure 1D:
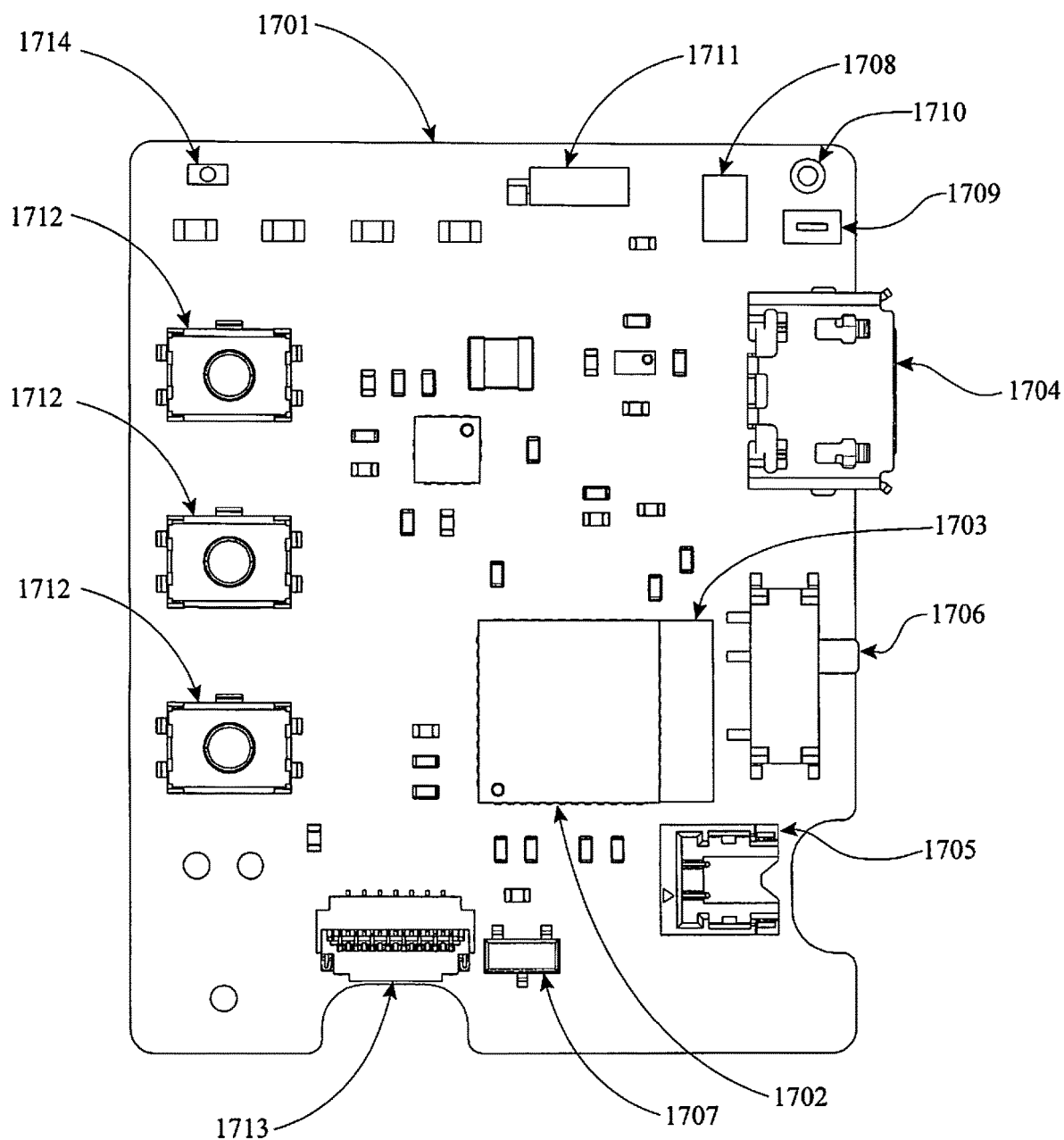
FIG. 1D shows a front view of the primary housing electronics of the embodiment shown in FIG. 1A that include the primary housing PCB (printed circuit board), primary housing microprocessor, primary housing wireless communication antennae, and the primary housing electronic on/off power switch, as well as other key components discussed herein.

FIG. 1D shows the preferred embodiment of the primary housing electronics of a target dictation apparatus according to the invention. FIG. 1D shows key components of the primary housing electronics and includes component 1701 which is the primary housing PCB (printed circuit board), component 1702 which is the primary housing microprocessor, component 1703 which is the primary housing wireless communication antennae, component 1704 which is the primary housing USB power and wired communication port, and component 1705 which is the primary housing female battery connector, component 1706 which is the primary housing electronic on/off power switch, component 1707 which is the primary housing voltage regulator, component 1708 which is the primary housing accelerometer sensor, component 1709 which is the primary housing microphone, component 1710 which is the primary housing speaker user feedback mechanism, component 1711 which is the primary housing vibratory user feedback mechanism, component 1712 which is the primary housing electronic push button user input mechanism, component 1713 which is the primary housing target indication element connection port, and component 1714 which is the primary housing LED user feedback mechanism. Several of the above components and their advantages will be described in further detail below.

The following section describes some of the possible embodiments of the use of target identifiers:

In the preferred embodiment, the target or take action identifiers 4102 (shown in FIG. 26) can take the form of electrically energizing colorized illuminating target indication elements, such as but not limited to LEDs (light emitting diodes), LCDs (liquid crystal displays), or light bulbs, where the color serves as the target identifier and corresponds to the color of the target downrange.

In another embodiment, the target identifiers can be presented by target indication elements that use mechanical mechanisms such that a physical movement(s) and/or actuation(s) occurs in order to present, or remove from presentation, the target identifiers.

In other embodiments, the target identifiers can be oriented in a column vertically, in a row horizontally, aligned diagonally, in a grid pattern, in an annular concentric pattern, in a segmented annular concentric pattern, randomly patterned, or other orientations and patterns, or combinations thereof.

In another embodiment, the user feedback mechanisms can be accomplished by the target indication elements. While there are many examples of this embodiment, one example can be the illumination of a set of target identifiers, in the form of LEDs, to indicate a particular selection that is made by the user. In another example the target indication elements can be used to provide visually displayed feedback to the user by the use of an LCD screen and the graphics and text that can be displayed thereon.

The preferred embodiment uses a method of using targets that correspond to the target identifiers such that when a particular target identifier is presented, the user will thereby be dictated to engage that particular target(s) that corresponds to the target identifier being presented. A series of target identifiers can be presented individually or sets of target identifiers can be presented simultaneously to the user to vary the training sequence to better align with a given training scenario.

FIG. 2A illustrates examples of a variety of possible target identifiers 4102 (FIG. 2B) or take action identifiers 4102 (FIG. 2B) such as but not limited to colors, stars, polygons, crosses, triangles, squares, other geometrical shapes, and the like, arrows, symbols, numbers and letters, and any other shapes and designs. In FIG. 2A, bracketed text is used to depict the use of colors as target identifiers or take action identifiers where a few examples of individual colors are mentioned by name in the text. The examples provided are not meant to be limiting in scope or to exclude other possible examples. These target and take action identifiers are presented to the user by way of the target indication elements 1600 shown FIG. 1A. In the preferred embodiment FIG. 1A, the target indication elements take the form of a segmented LCD screen. The various target identifiers correspond to the targets that the user/shooter would then engage with their weapon.

FIG. 2B shows the preferred embodiment of a target dictation apparatus according to the invention. FIG. 2B shows a selection of target and take action identifiers as an example of what a user can encounter during use of the device.

Figure 2C:
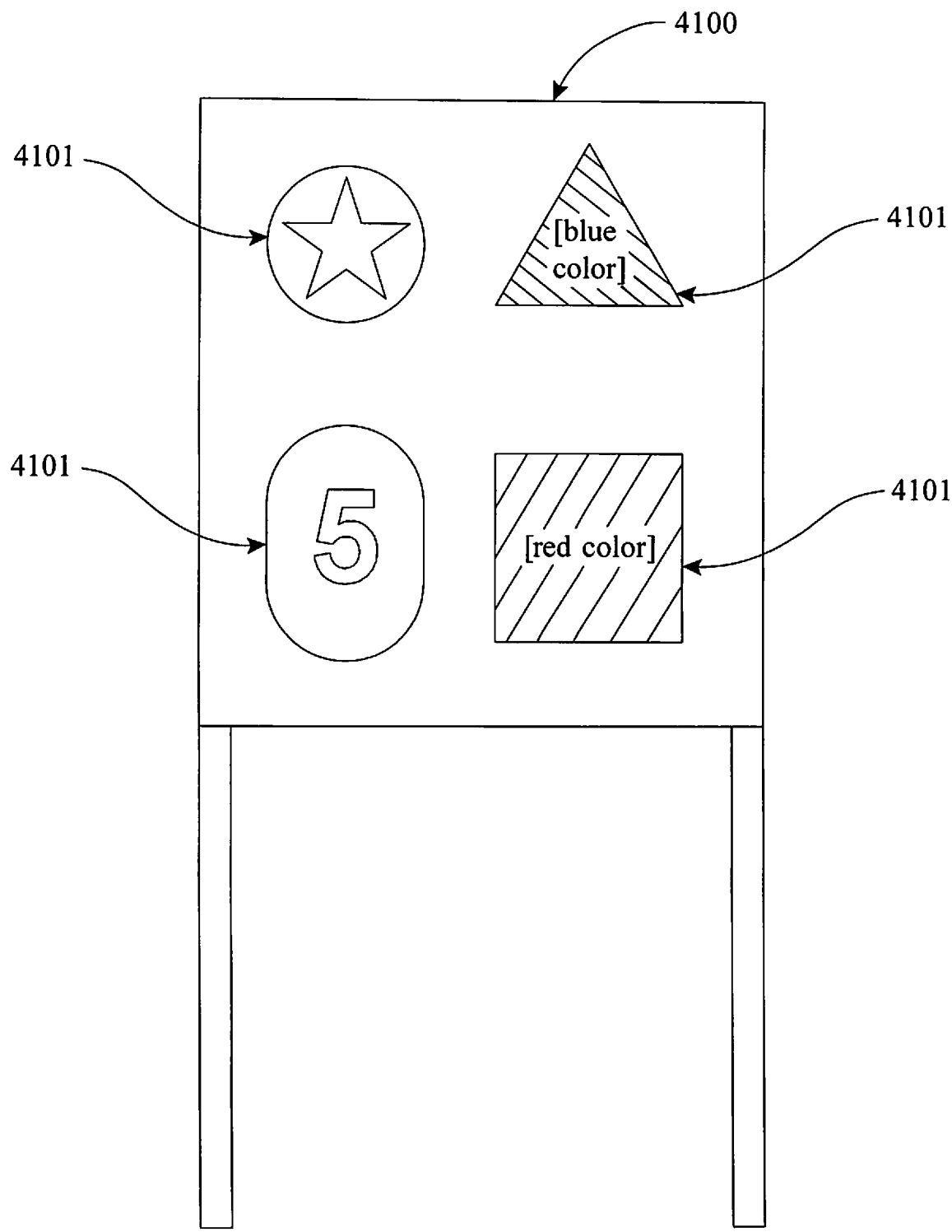
FIG. 2C shows a front view of target sheet that contains multiple target identifiers. The target identifiers shown are for the sake of example and not all inclusive and correspond to those target identifiers shown in FIG. 2B.

FIG. 2C shows a target stand with a target sheet 4100 that contains multiple targets 4101 that correspond to the target identifiers 4102 of a target dictation apparatus according to the invention. Components 4101 will correspond to the respective target identifier presented on the user's device as seen in the example of FIG. 2B and is what the user will engage as dictated by the device.

The following section describes some of the possible embodiments of the secondary housing:

The preferred embodiment of the secondary housings 2000 can take the form of an enclosure that contains electronic components and is such that it is highly compact and portable allowing the user to be very mobile in order to train in large scale training environments while keeping the device on or about them and thereby accessible as needed for a given training scenario.

In another embodiment, a secondary housing 2000 is included that also stores and/or mounts additional electronics, batteries, user input mechanisms, user feedback mechanisms, power ports, communication ports, and on/off power switches. In this embodiment, the secondary housing 2000 is in communication with the primary housing 1000 through wired or wireless communication mediums in order to bi-directionally exchange information between the primary and secondary housings' electronics regarding the input/data from sensors or user input mechanisms as well as provide feedback via user feedback mechanisms. A secondary housing 2000 can allow for the primary housing 1000 to be even more compact by off-loading some of the electronic hardware to the secondary housing 2000.

Additionally, including sensors in the secondary housing 2000 can allow for additional functionality such as recoil detection and/or detection of the movements of the shooter or the weapon.

Figure 3A:
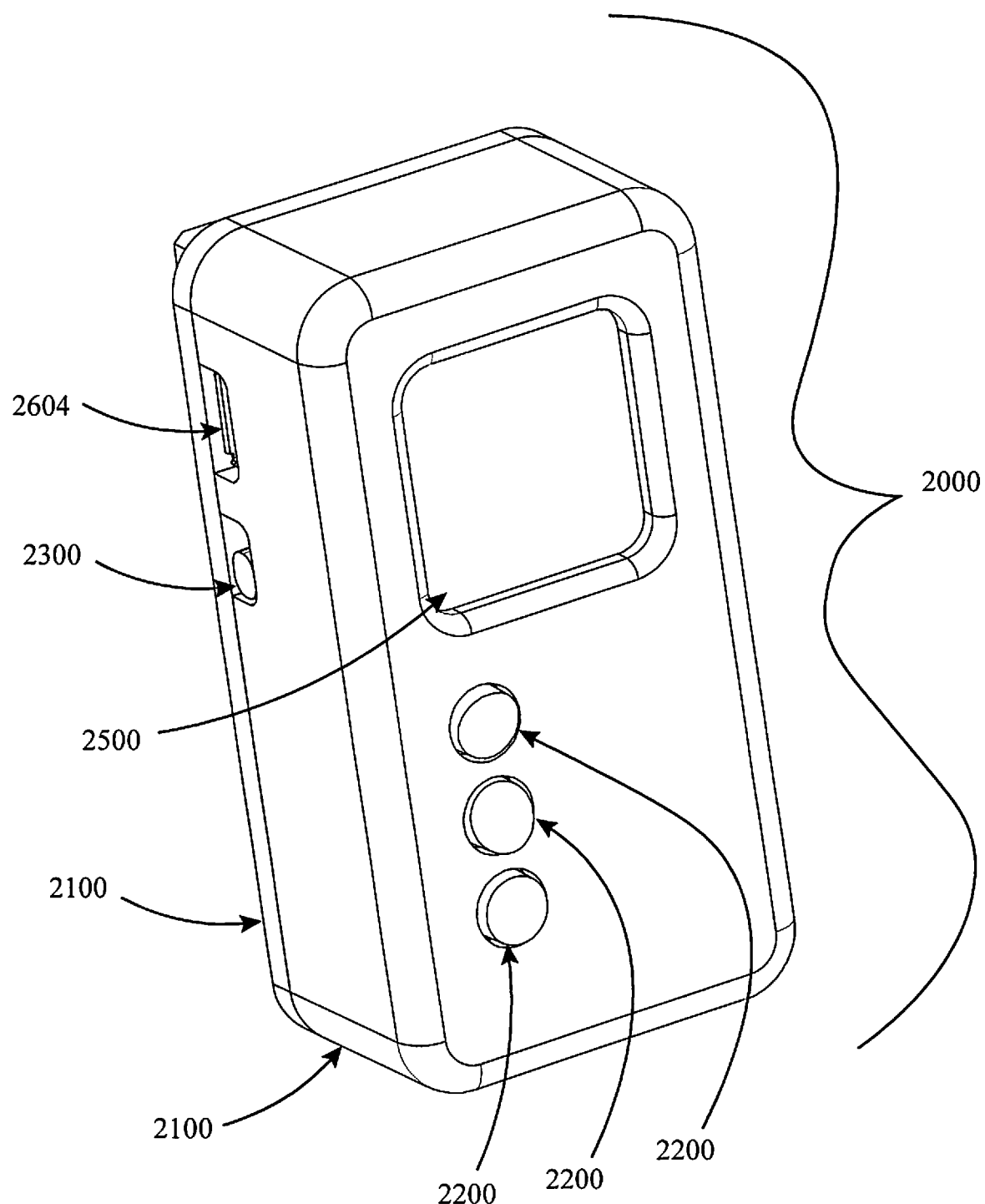
FIG. 3A shows a perspective front view of the preferred embodiment of the secondary housing assembly of a target dictation apparatus according to the invention that exemplifies the secondary housing exterior push buttons user input mechanism, the secondary housing LCD user feedback mechanism, as well as elements used in powering the device as labeled in the figure.

FIG. 3A is a perspective front view outline of an embodiment of a secondary housing 2000 of a target dictation apparatus according to the invention. FIG. 3A shows the secondary housing assembly to include component 2100 which is a secondary housing enclosure element, component 2500 which is a secondary housing LCD user feedback mechanism, components 2200 which are secondary housing exterior push button user input mechanisms, component 2604 which is a secondary housing USB power and wired communication port, and component 2300 which is an secondary housing exterior on/off power switch.

The secondary housing LCD user feedback mechanism 2500 can be used to provide information and feedback to the user as well as be used for interfacing with the option menus and settings of the device. The secondary housing exterior push button user input mechanisms 2200 can be used to interface with the options menus and settings of the device. Component 2604 is where the user plugs a charging cable to recharge the secondary housing battery or alternatively can connect the device to a primary or secondary housing assembly or another tertiary device such as a computer or mobile phone for data communication between the various devices. Component 2300 is the secondary housing exterior on/off switch used to engage the internally located secondary housing electronic on/off switch in order to turn the device on or off.

Figure 3B:
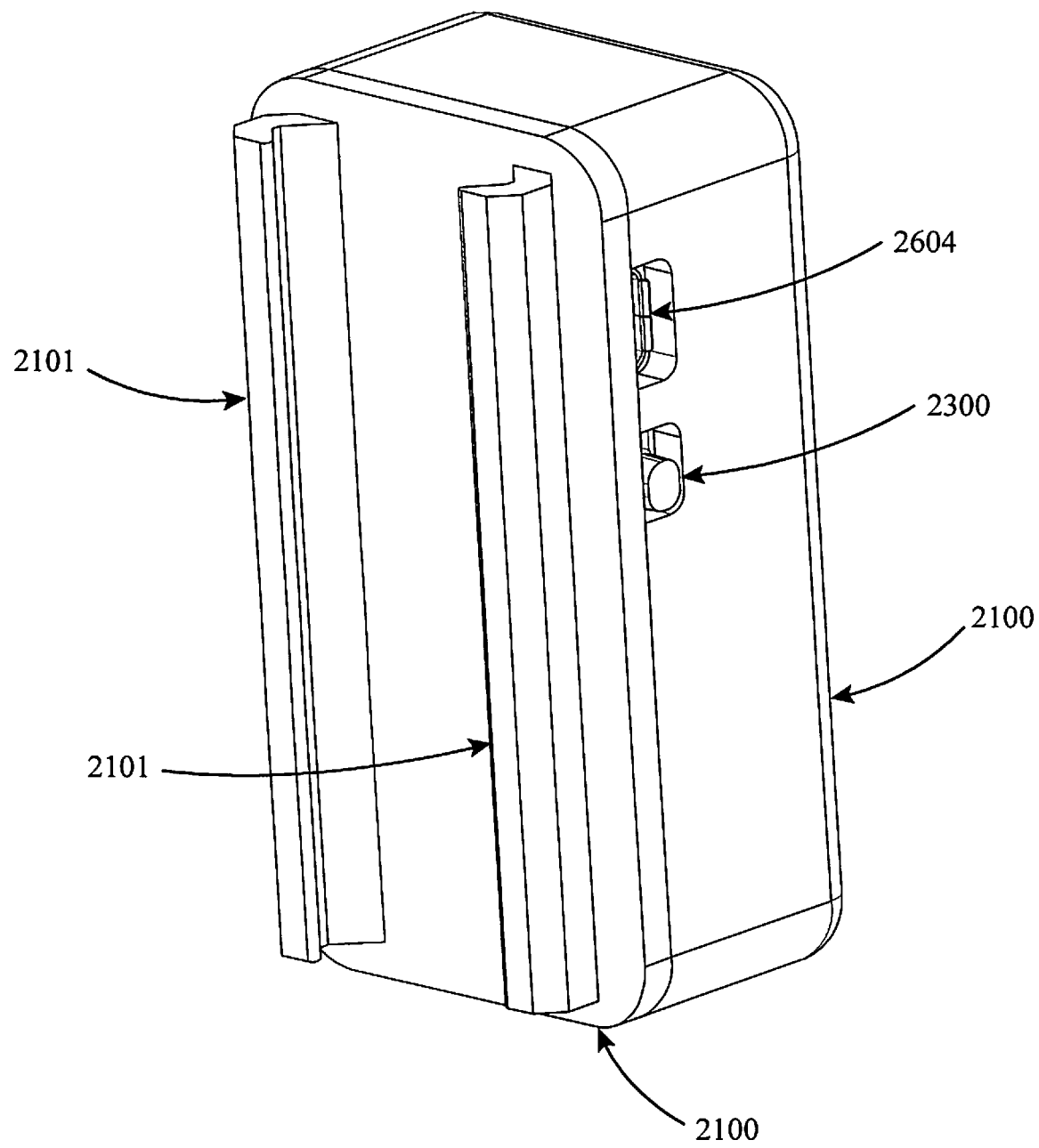
FIG. 3B shows a perspective rear view of the embodiment shown in FIG. 3A that exemplifies the secondary housing interchangeable mounting mechanism rail attachment features as well as provides additional view of the elements used in powering the device as labeled in the figure.

FIG. 3B shows perspective rear view of the secondary housing assembly 2000. FIG. 3B shows component 2101 which is a secondary housing interchangeable mounting mechanism rail attachment feature to allow the user to attach and detach the various mounting devices discussed herein to facilitate the various applications involved in various training scenarios. In the embodiment of FIG. 3B the interchangeable mounting mechanism rail attachment feature attaches to the accessory attachment rail of the interchangeable mounting mechanism wrist strap rail embodiment FIG. 4B, FIG. 4C, FIG. 9 and FIG. 13 or the accessory attachment rail of a weapon such as a rifle or pistol as exemplified in FIG. 4C, FIG. 5A, FIG. 9, and FIG. 13.

Figure 3C:
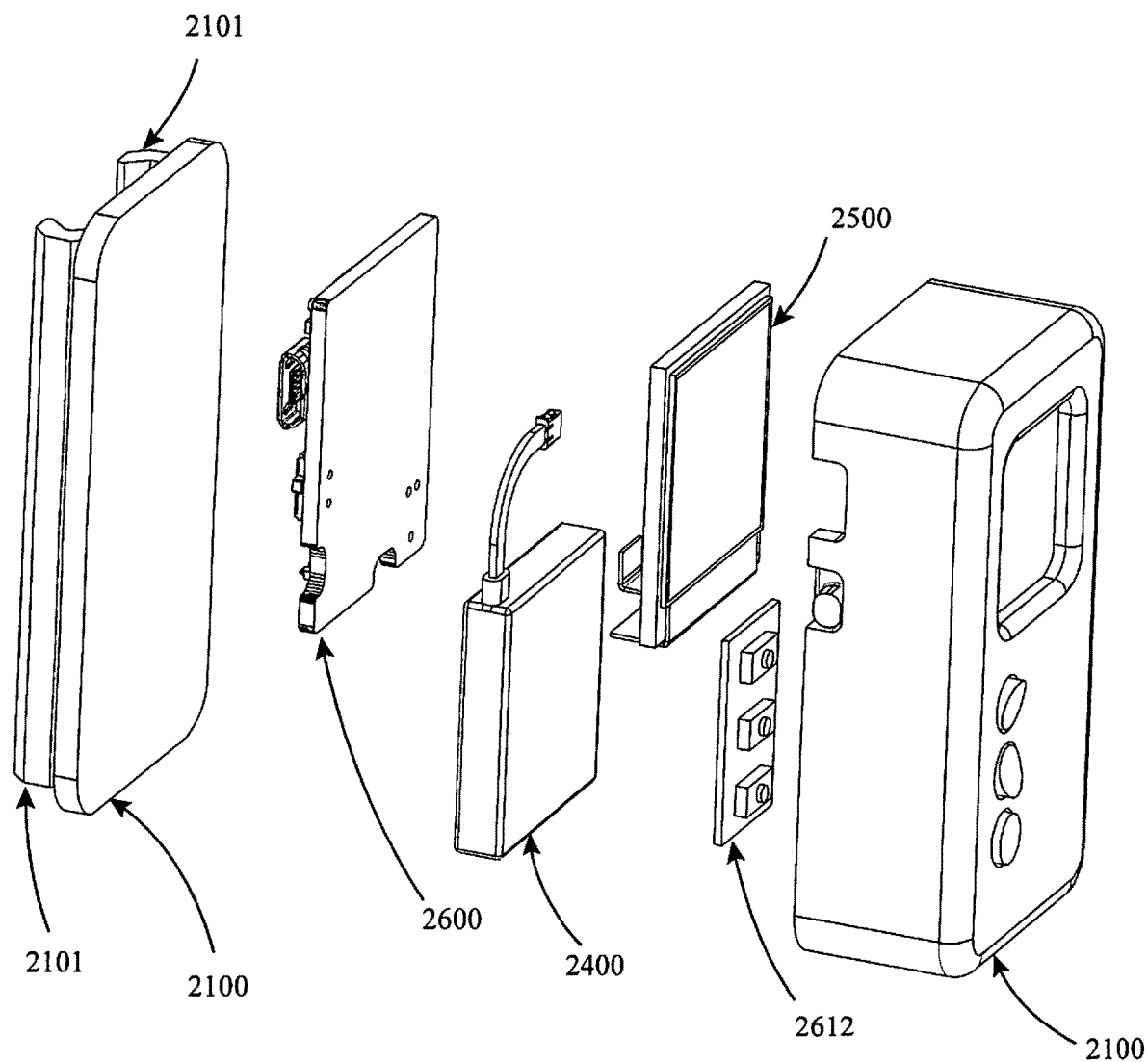
FIG. 3C shows a perspective exploded view of the embodiment shown in FIG. 3A which includes views of the secondary housing PCB (printed circuit board), secondary housing LCD user feedback mechanism, secondary housing battery & male battery connector, as well as other electronic elements labeled in the figure.

FIG. 3C shows an exploded view of an embodiment of the secondary housing assembly 2000 of a target dictation apparatus according to the invention and shows the alignment of the internal components within the secondary housing assembly. The internal components of the embodiment can include a printed circuit board assembly (PCBA) 2600, a low profile compact battery 2400 that attaches to the PCBA, an LCD (liquid crystal display) screen 2500 used to present information and feedback such as the option menus discussed in FIG. through 10D. The secondary housing enclosure elements and the components contained within of the embodiment can be assembled together via a press-fit connection, adhesives, ultra-sonic welding, or other fastening/assembly techniques, such as but not limited to using fasteners, such as screws and bolts, and the like.

In another embodiment, the secondary housing assembly can be powered by the use of one or more batteries mounted upon or contained within the device.

In another embodiment, the secondary housing assembly can be powered by the use of one or more wired powered sources from an off-board power source(s) to the device, such as but not limited to wall plug sources and the like.

Figure 3D:
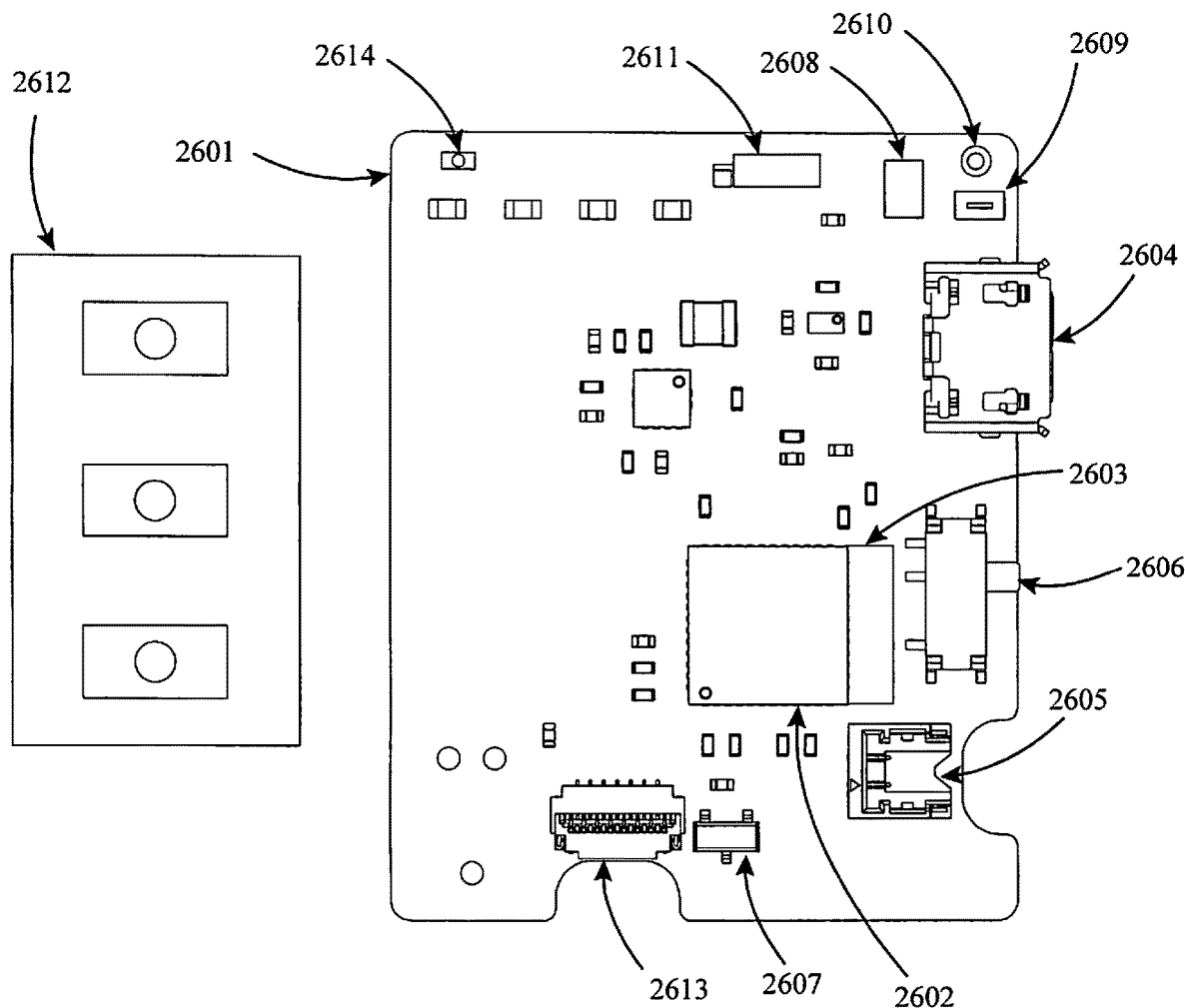
FIG. 3D shows a front view of the secondary housing electronics assembly and labels key components discussed herein.

FIG. 3D shows the preferred embodiment of the secondary housing electronics of a target dictation apparatus according to the invention. FIG. 3D shows key components of the secondary housing electronics and includes component 2601 which is the secondary housing PCB (printed circuit board), component 2602 which is the secondary housing microprocessor, component 2603 which is the secondary housing wireless communication antennae, component 2604 which is the secondary housing USB power and wired communication port, and component 2605 which is the secondary housing female battery connector, component 2606 which is the secondary housing electronic on/off power switch, component 2607 which is the secondary housing voltage regulator, component 2608 which is the secondary housing accelerometer sensor, component 2609 which is the secondary housing microphone, component 2610 which is the secondary housing speaker user feedback mechanism, component 2611 which is the secondary housing vibratory user feedback mechanism, component 2612 which is the secondary housing electronic push button user input mechanism & PCB, component 2613 which is the secondary housing LCD user feedback connection port, and component 1714 which is the secondary housing LED user feedback mechanism. Several of the above components and their advantages will be described in further detail below.

Figure 4A:
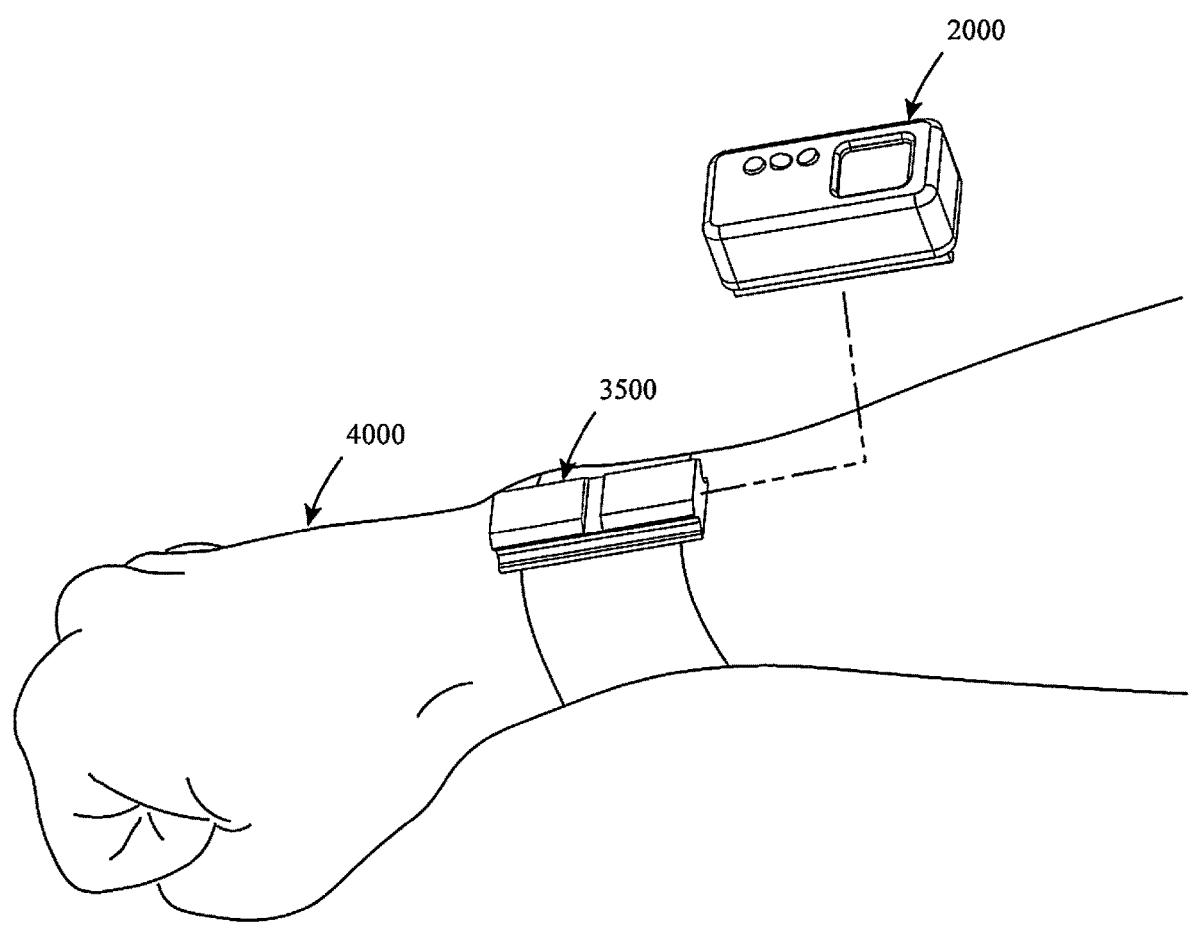
FIG. 4A shows a perspective top view of the secondary housing assembly attaching to the interchangeable mounting mechanism wrist strap rail embodiment via a dotted line path.

FIG. 4A is an image of an embodiment of the secondary housing assembly 2000 of a target dictation apparatus shown in FIGS. 3A and 3B according to the invention that is attaching to the interchangeable mounting mechanism wrist strap rail attachment embodiment 3500 depicted by a dotted line path which in turn is attached to a user/shooter 4000 wrist.

Figure 4B:
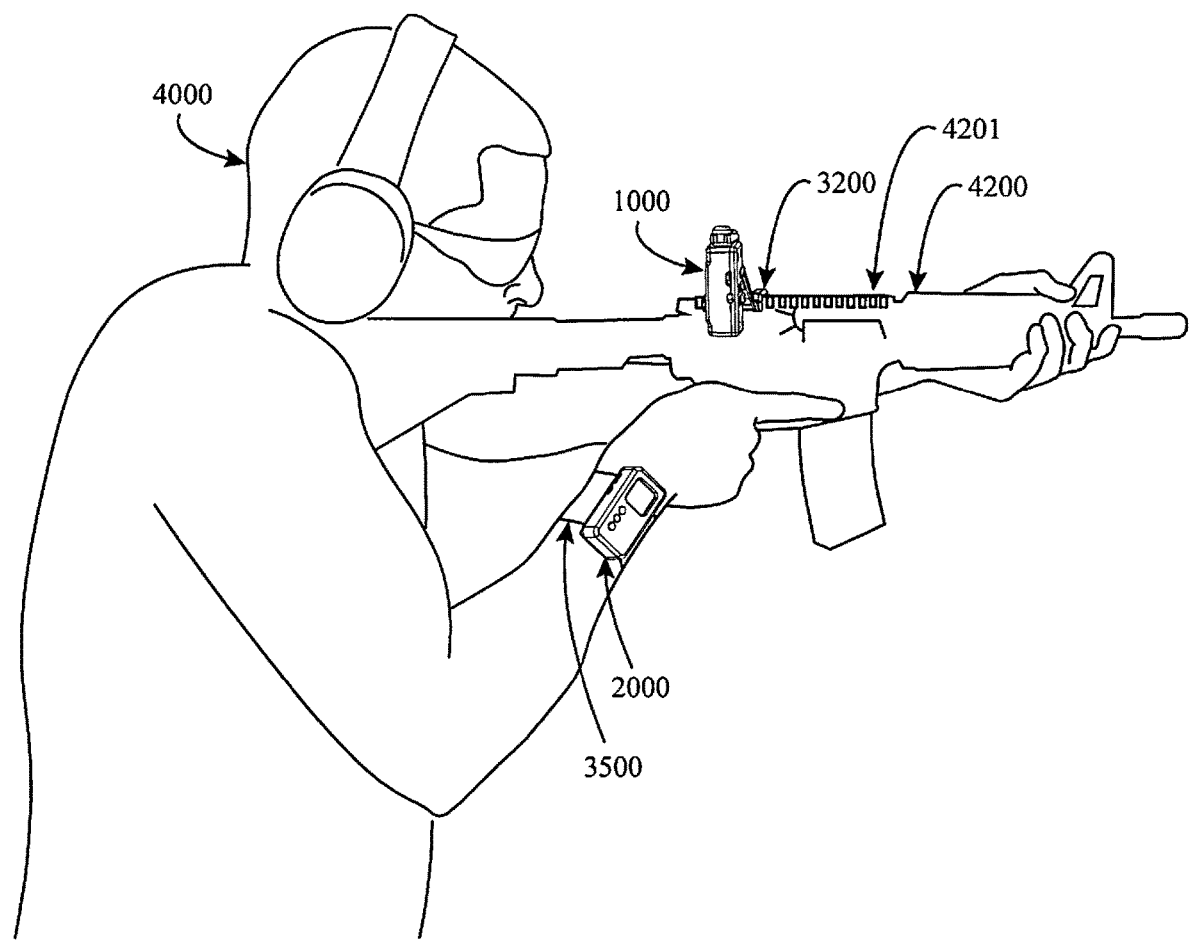
FIG. 4B shows an elevation view of a user/shooter wearing the secondary housing attached via the interchangeable mounting mechanism wrist strap rail embodiment and also utilizing the primary housing assembly attached to the rifle accessory attachment rail via the interchangeable mounting mechanism rail mounting embodiment.

FIG. 4B shows a user/shooter 4000 wearing an embodiment of the secondary housing 2000 attached to their wrist strap rail mount 3500 as shown in FIG. 4A. This attachment position embodiment allows for the sensors of the secondary housing electronics in secondary housing 2000 to detect movements of the user/shooter and detect shots fired and then analyze the data in order to provide feedback and/or instruction to the user or alter the training sequence based on those detected movements and/or shots fired. In FIG. 4B, the primary housing assembly 1000 is attached to the interchangeable mounting mechanism rail mounting embodiment 3200 which is then in turn attached to the accessory attachment rail 4201 of the user's rifle 4200. The primary and secondary housing 1000, 2000 together use wireless communication via a Bluetooth® radio to share data collected from their respective sensors in order to trigger changes to the training sequence being presented to the user/shooter 4000. Additionally, the primary and secondary housing 1000, 2000 share data collected from their respective sensors in order to analyze the data and provide feedback and/or instruction to the user regarding their training in order to alter the user's target engagement abilities.

Figure 4C:
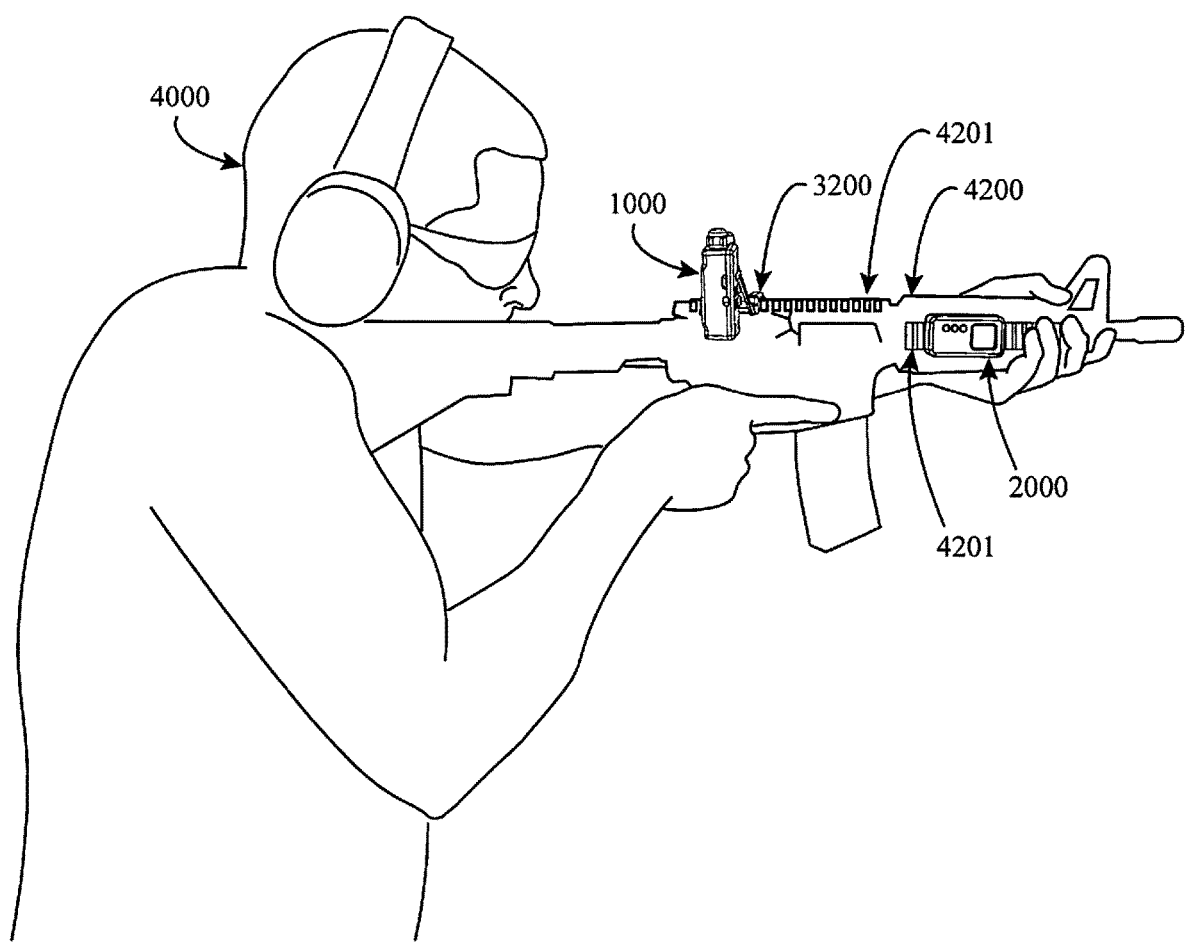
FIG. 4C shows an elevation view of a user/shooter utilizing the primary housing assembly attached to the rifle accessory attachment rail via the interchangeable mounting mechanism rail mounting embodiment as well as the secondary housing assembly attached to the other rifle accessory attachment rail via the secondary housing interchangeable mounting mechanism rail attachment feature.

FIG. 4C shows a user/shooter utilizing a rifle 4200 with an embodiment of the secondary housing 2000 attached to the rifle accessory attachment rail 4201. This attachment position embodiment allows for the sensors of the secondary housing electronics to detect movements of the user/shooter, movements of the weapon, and detect shots fired and then analyze the movements in order to provide feedback and/or instruction to the user or alter the training sequence based on those detected movements and/or shots fired. In FIG. 4C, the primary housing assembly 1000 is attached to the interchangeable mounting mechanism rail mounting embodiment 3200 which is then in turn attached to the accessory attachment rail 4201 of the user's rifle 4200. The primary and secondary housing 1000, 2000 together use wireless communication via a Bluetooth® radio to share data collected from their respective sensors in order to trigger changes to the training sequence being presented to the user/shooter 4000. Additionally, the primary and secondary housing 1000, 2000 share data collected from their respective sensors in order to analyze the data and provide feedback and/or instruction to the user regarding their training in order to alter the user's target engagement abilities.

Figure 5A:
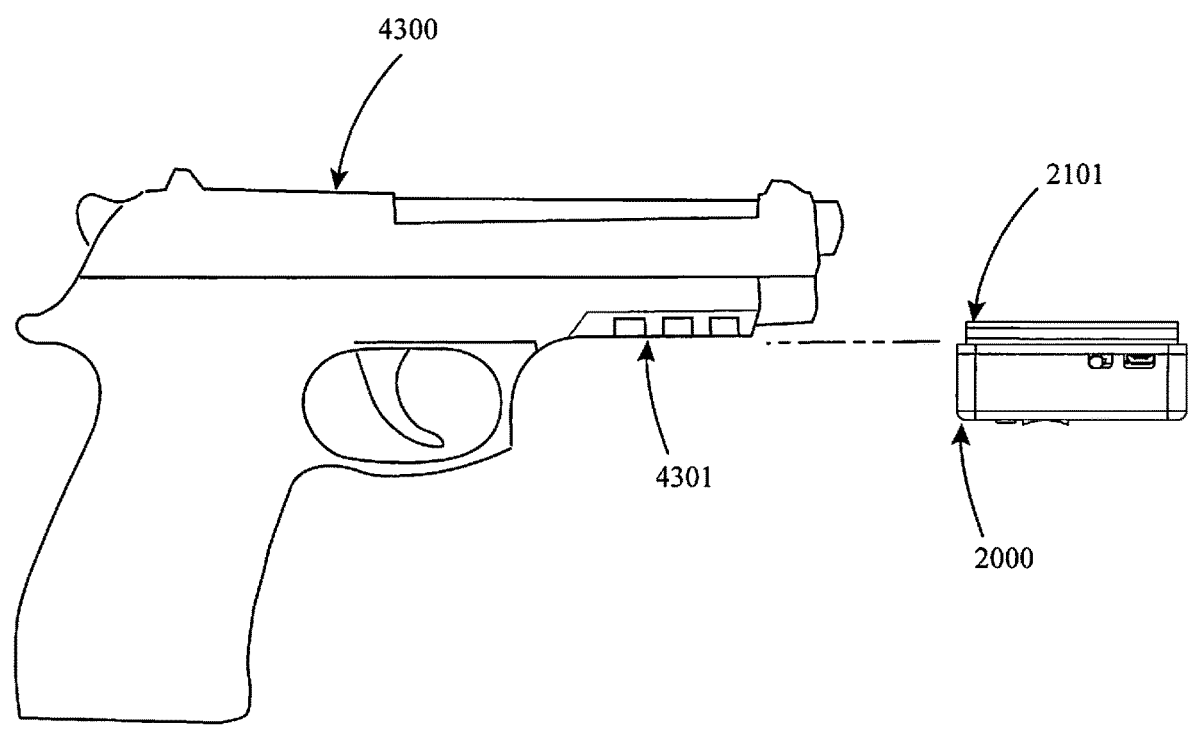
FIG. 5A shows an elevation view of the secondary housing assembly attaching to a pistol accessory attachment rail via the secondary housing interchangeable mounting mechanism rail attachment feature along a dotted line path.

FIG. 5A shows an image of an embodiment of the secondary housing assembly 2000 of a target dictation apparatus according to the invention with female rail attachment features 2101 that is attaching to a pistol accessory attachment rail 4301 depicted by a dotted line path.

Figure 5B:
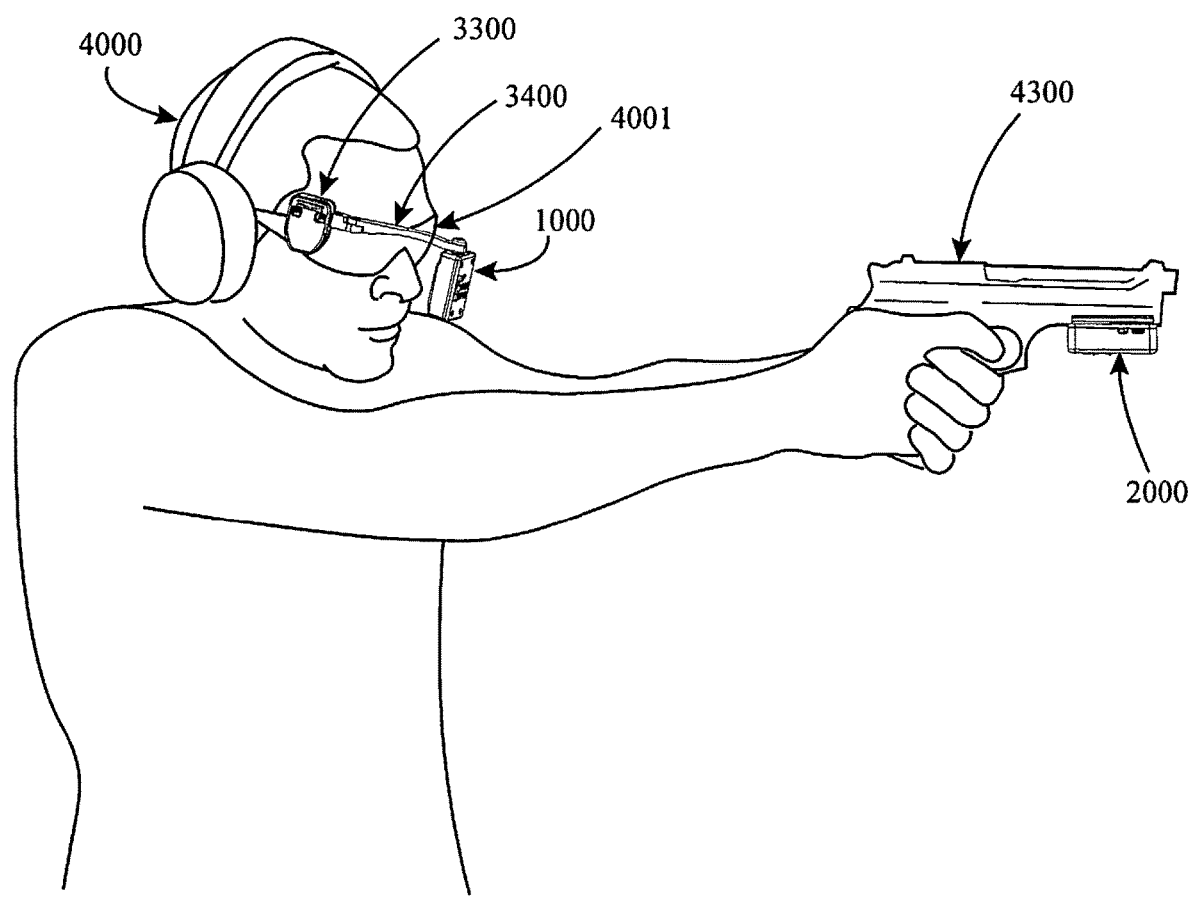
FIG. 5B shows an elevation view of a user/shooter utilizing the primary housing assembly attached to their glasses via the interchangeable mounting mechanism glasses mounting embodiment and allowing for positional adjustments of the primary housing via the multi-angle, multi-jointed viewing angle adjustment mechanism. Additionally, the pistol has a secondary housing attached to its pistol accessory attachment rail.

FIG. 56 shows an image of a user/shooter 4000 utilizing the secondary housing 2000 attached to a pistol accessory attachment rail 4300 on a pistol 4300. This attachment position embodiment allows for the sensors of the secondary housing electronics in secondary housing 2000 to detect movements of the user/shooter by way of the movements of the weapon, to detect the direct movements of the weapon itself, and detect shots fired and then analyze those movements in order to provide feedback and/or instruction to the user or alter the training sequence based on those detected movements and/or shots fired. In FIG. 5B, the primary housing assembly 1000 is attached to the multi-angle, multi-jointed viewing angle adjustment mechanism 3400 which is then attached to the interchangeable mounting mechanism glasses mounting embodiment 3300 which is then in turn attached to a pair of glasses 4001 wore by the user/shooter 4000. The available adjustments of the multi-angle, multi-jointed viewing angle adjustment mechanism 3400 allow for a variety of placements and angulations of the target indication elements 1600 of the primary housing 1000 relative to the user/shooter's 4000 line of sight. The primary and secondary housing 1000, 2000 together use wireless communication via a Bluetooth® radio to share data collected from their respective sensors in order to trigger changes to the training sequence being presented to the user/shooter 4000. Additionally, the primary and secondary housing 1000, 2000 share data collected from their respective sensors in order to analyze the data and provide feedback and/or instruction to the user regarding their training in order to alter the user's target engagement abilities.

The following section describes some of the possible embodiments of the functionality of the primary and secondary housing assemblies:

In several embodiments the functionalities of the primary housing assembly 1000 and the secondary housing assembly 2000, with respect to the sensors, feedback, and instructions, can occur in either housing assembly or both depending on the particular embodiment and the needs of the particular training sequence or training scenario. Several of those functionalities are discussed below.

In some embodiments of the primary and secondary housing assemblies, they can make use of a speaker to provide audio feedback or instruction to the user to improve or alter their abilities.

In other embodiments of the primary housing assembly 1000 and secondary housing assembly 2000, they can make use of forces physically imparted to the user from a motor or actuator to provide feedback to the user.

In other embodiments of the primary housing assembly 1000 and secondary housing assembly 2000, the user input mechanisms and user feedback mechanisms can be integrated with the electronics of the primary or secondary housings, or integrated with the electronics of a separate computer or mobile device, or combinations thereof. Various training sequences and/or various training scenarios can require substantially more compact housings so the ability to off-load some of the electronics, user interface, and user menus to a secondary housing or to a tertiary device such as a computer or mobile device can be advantageous.

In other embodiments of the primary housing assembly 1000 and secondary housing assembly 2000, the user input mechanisms can be components or mechanisms such as pushbuttons, thumbwheels, touchscreens, and the like, that when combined with other electronics allow for selections and entries of user inputs into the user interface menus.

In other embodiments of the primary housing assembly 1000 and secondary housing assembly 2000, they can use one or more accelerometer sensors of the primary and/or secondary housings' electronics or other computing device(s) such as a mobile phone on or about the user or on or about the weapon to detect recoil or other such identifiable motion to indicate a shot has been fired.

In other embodiments of the primary housing assembly 1000 and secondary housing assembly 2000, they can make use of one or more accelerometer sensors of the primary housing 1000 and/or secondary housing 2000 electronics or other computing device(s) such as a mobile phone on or about the target to detect an impact to the target to indicate a shot has been fired.

In other embodiments of the primary housing assembly 1000 and secondary housing assembly 2000, they can make use of pressure sensors of the primary and/or secondary housings' electronics or other computing device(s) such as a mobile phone to detect a shot has been fired.

In other embodiments of the primary housing assembly 1000 and secondary housing assembly 2000 they can make use of microphone sensors of the primary and/or secondary housings' electronics or other computing device(s) such as a mobile phone to detect a shot has been fired.

In another embodiment of the primary housing assembly 1000 and secondary housing assembly 2000, they can provide a method of using the indication of one or more shots fired provided by various sensors to trigger a next action(s) during or after a presentation set of target identifiers or in a series of presentation sets of target identifiers, whether by keeping count of the shots fired and then taking an action after a particular number of shots has been detected and/or by taking an action after each or any particular individual shot is detected and/or by using the timings of any one or more shots fired to determine when to initiate a next action(s). A next action can be altering the various timings of the prescribed or randomized presentations of presentation sets of target identifiers, inducing a presentation of a take-action identifier, or other change to the training sequence that can affect the training.

In other embodiments of the primary and secondary housing assemblies, they can make use of one or more accelerometer sensors of the primary and/or secondary housings' electronics or other computing device(s) such as a mobile phone on or about user or on or about the weapon to detect a particular motion of the user or weapon to detect a particular physical motion has taken place to trigger a next action(s) as discussed above.

In other embodiments of the primary housing assembly 1000 and secondary housing assembly 2000, they can provide a method of using the indication of a shot fired provided by various sensors to record the time between each shot fired and/or the time between the presentation of a target identifier and the firing of a shot. The time recorded can then be used to dictate a subsequent action the device's program can engage in. The time recorded can additionally or alternatively be used to provide reports back to the user on the time to the first, second, third, and the like, shot and/or time between shots and/or time between presentation of a target identifier and the firing of any given shot.

The following section describes some of the possible embodiments of methods of varying the level of difficulty of the target engagement training:

Another embodiment of the invention can provide a method(s) of varying the difficulty of the engagement of targets by the user by, but not limited to and allowing for combinations of, the following: varying the number of instances of a particular target on a given target item; providing a variety of targets on a given item, varying the number of targets provided to engage; varying the size of the individual targets; the inclusion of a partially obscured view of a target; varying the duration of the presentation of a target identifier; varying the duration of the idle (no presentation of target identifiers) period; varying the number of target identifiers presented in a presentation set of target identifiers; randomizing the order in which the target identifiers are presented in any presentation set of target identifiers; randomizing the durations of the presentation of a target identifier; randomizing the duration of the idle (no presentation of target identifiers) period; randomizing the number of target identifiers presented in a presentation set of target identifiers. By varying the settings of the device, the user can be taken through various levels of difficulty specific to their training needs that can allow for focusing their training on speed, accuracy, fluidity of transitions between multiple targets, and the like.

In another embodiment of the invention, the device can provide a method of prescribing the sequencing and timing of the various steps involved in a presentation set of target identifiers or a series of presentation sets of target identifiers.

In another embodiment of the invention, the device can provide a method of randomizing the sequencing and timing of the various steps involved in a presentation set of target identifiers or a series of presentation sets of target identifiers.

In another embodiment of the invention, the device can provide a method of prescribing the sequencing and timing of the various steps involved in the presentation of a target identifier or a take-action identifier, or combinations thereof.

In another embodiment of the invention, the device can provide a method of randomizing the sequencing and timing of the various steps involved in the presentation of a target identifier or a take-action identifier, or combinations thereof.

In another embodiment, the device can provide a method of communication between two or more instances of the apparatus for simultaneous "side-by-side" competition or comparison of the performance(s) of one or more users.

In another embodiment, the device can provide a method of communication between two or more instances of the apparatus for simultaneous "cooperative" training with one or more users.

In another embodiment, the device can provide a method of varying the level of difficulty of the targets themselves by varying attributes of the target.

In another embodiment, the shooter targets can be fixed (stationary), or moving, or a combination of moving and fixed, as needed.

The following section describes some of the possible embodiments of the interchangeable mounting mechanisms:

In another embodiment of the invention, the interchangeable mounting mechanisms can take the form of a spring loaded attachment clip, a wedging clip (such as being similar to a wooden clothespin), adhesives, adhesive tapes, a wrist band, a mounting stand, a weapon rail accessory attachment mechanism, a clamping mechanism, a threaded fastener attachment, a penetrating spike or nail, a weapon scope attachment mechanism, or any other mechanism or method of attaching one item to another for the purpose of affixing, whether permanently or temporarily, the apparatus to the user, the user's clothes, hat, helmet, glasses, visor, weapon, or other surface or structure. Having interchangeable mounting mechanisms provides versatility in the use and placement of the device to accommodate the needs of different users, different training environments, different training sequences, and different training scenarios.

Additionally, by utilizing a variety of mounting mechanisms and the interchangeability between them, the user can leave in place several types of mounts in a variety of placements such that the user can quickly and easily relocate the device from one mount to the next based on the needs of the training sequence and training scenario.

Figure 6A:
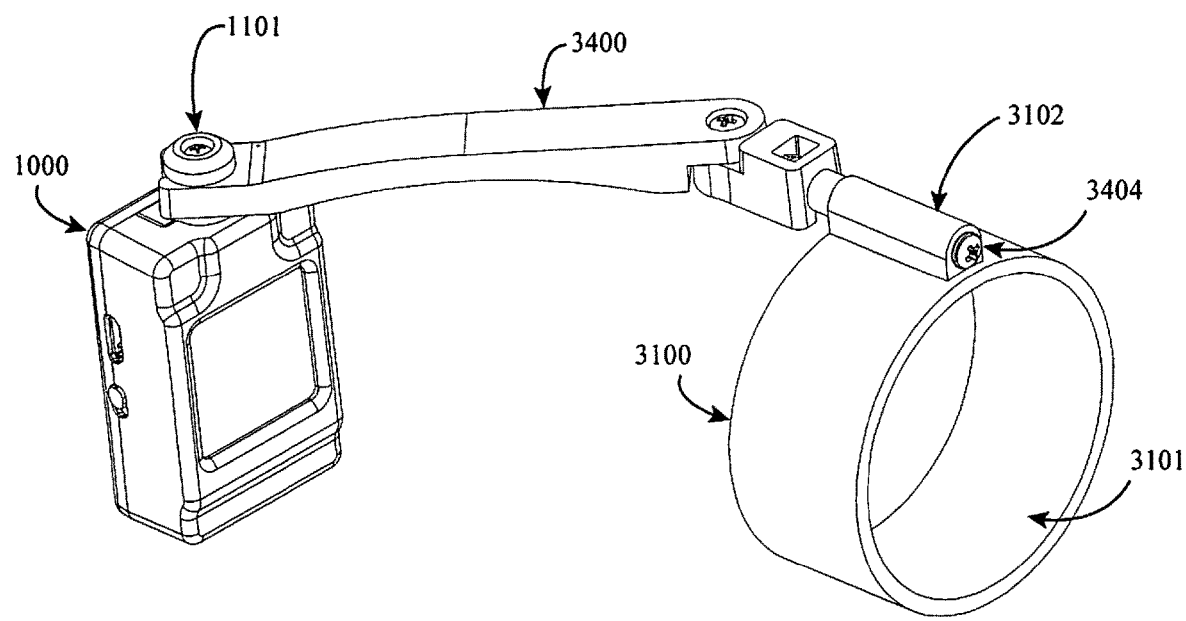
FIG. 6A shows a perspective top view of the preferred embodiment of the interchangeable mounting mechanism scope profile matching embodiment that is attached to the angle adjustment rotation swivel of the multi-angle, multi-jointed viewing angle adjustment mechanism which allows for positioning of the shown primary housing assembly.

The following section describes some of the possible embodiments of the interchangeable mounting mechanism scope profile matching embodiment:

FIG. 6A shows a perspective front view of the preferred embodiment of the primary housing assembly 1000 from FIG. 1A that is attached to the multi-angle, multi-jointed viewing angle adjustment mechanism 3400 which is in turn attached to the interchangeable mounting mechanism scope profile matching embodiment fastener attachment feature 3102 via the angle adjustment rotation swivel fastener 3404.

Figure 6B:
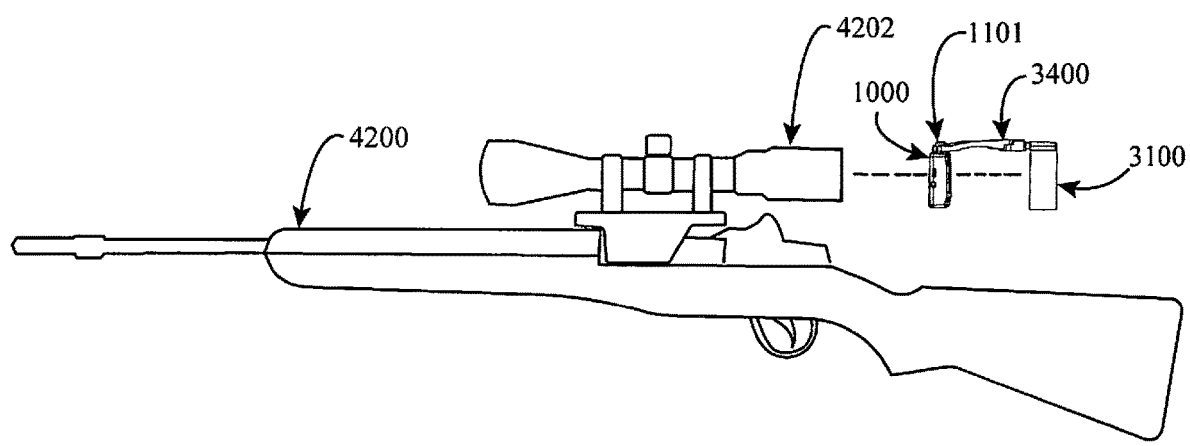
FIG. 6B shows an elevation view of the embodiment shown in FIG. 6A attaching to the rifle scope's rear ocular lens area via the interchangeable mounting mechanism scope profile matching embodiment scope attachment profile.

In the preferred embodiment, the interchangeable mounting mechanism scope profile embodiment 3100 attaches to a rifle 4200 FIG. 6B via the rifle scope 4202 by matching the contour of the rifle scope's ocular or objective lenses such that a press-fit assembly can be accomplished as seen in FIG. 6B showing the assembly of the interchangeable mounting mechanism scope profile matching scope attachment profile 3101 assembling to the rifle scope 4202 ocular lens via a dotted line path. This type of mounting embodiment offers another option for the mounting of the primary or secondary housing assemblies of the invention to better conform to particular training scenarios.

Figure 6C:
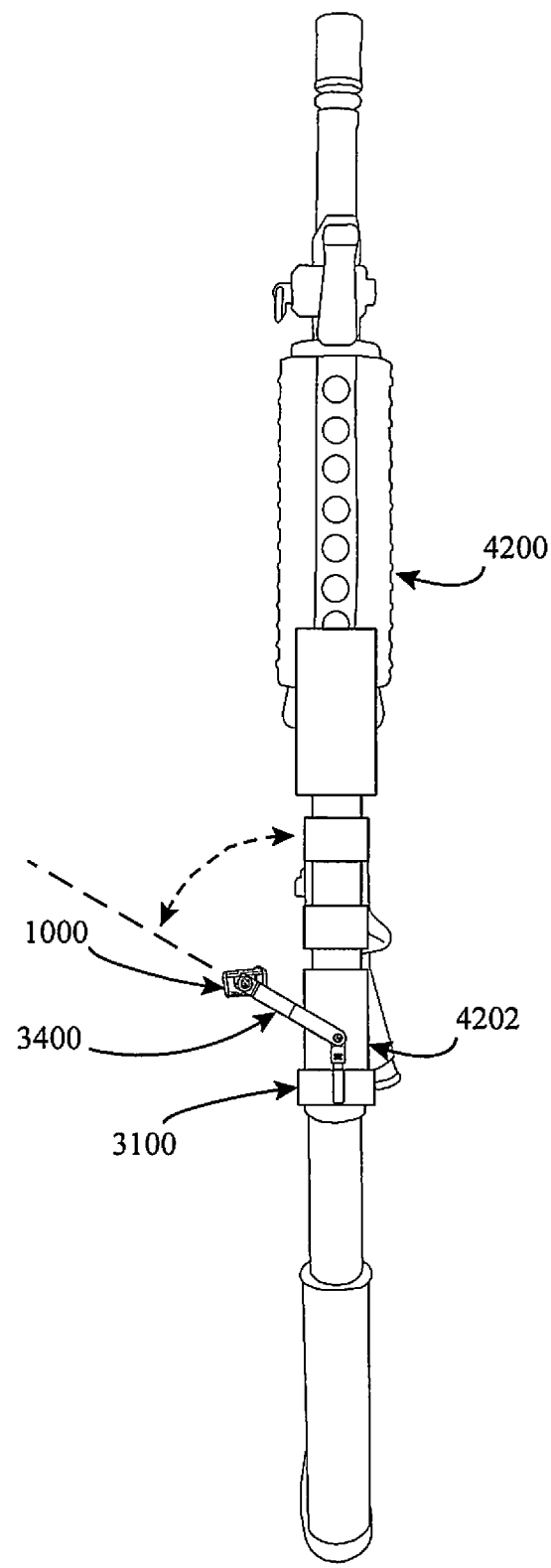
FIG. 6C shows a top down view of the embodiment shown in FIG. 6A attached to the rifle scope's rear ocular lens area and presents one of many possible initial positions prior to refinement of the position by the user/shooter.
Figure 6D:
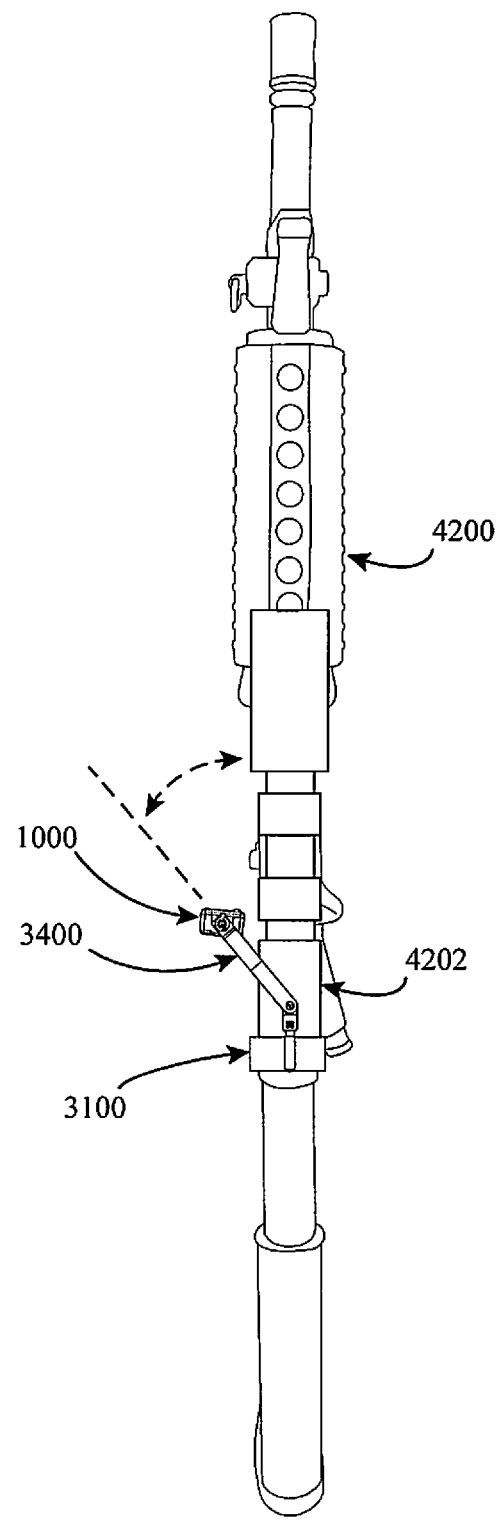
FIG. 6D show a top down view of the embodiment shown in FIG. 6A attached to the rifle scope's rear ocular lens area and presents one of many possible final positions after refinement of the position by the user/shooter

The embodiment shown in FIG. 6A, FIG. 6B, FIG. 6C, FIG. 6D and FIG. 6E makes use of the inclusion of the multi-angle, multi-jointed viewing angle adjustment mechanism 3400 which allows for a variety of positional and angular relationships to be had between the target indication elements of the primary housing assembly 1000 and the user/shooter. Although many positions and angles can be accomplished, an example initial and final position and angle are shown in FIG. 6C and FIG. 6D, respectively, with one of the degrees of freedom depicted by a dotted arced line with arrows at each end.

Figure 6E:
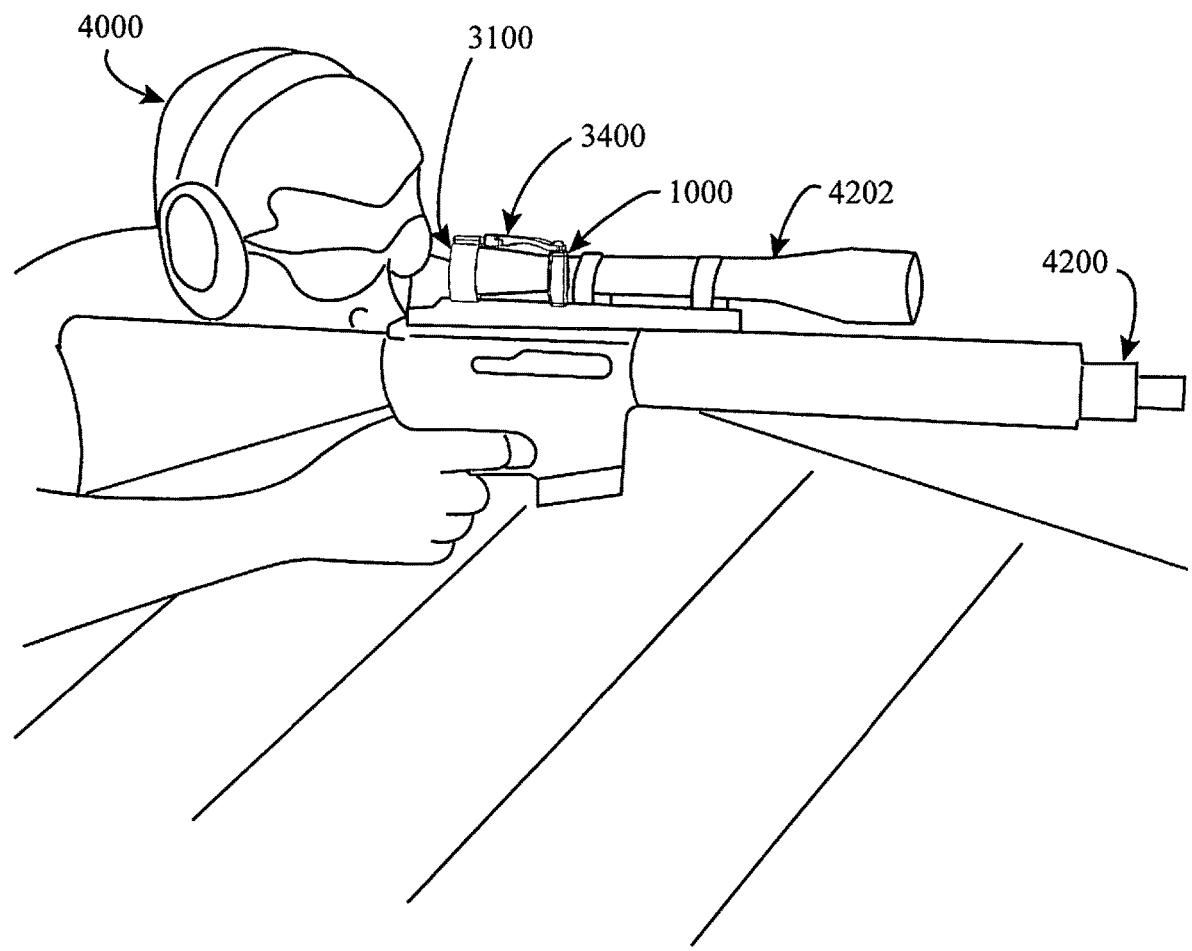
FIG. 6E shows a perspective top view of a user/shooter utilizing the embodiment shown in FIG. 6A attached to the rifle scope's rear ocular lens area while viewing the target indication elements of the primary housing assembly (obscured from view in this figure).

FIG. 6E shows a user/shooter 4000 utilizing the embodiment of FIG. 6A through 6D on a rifle scope 4202 of a rifle 4200 with the primary housing assembly 1000 positioned and angled to the user/shooter preference for a particular training scenario.

Figure 7A:
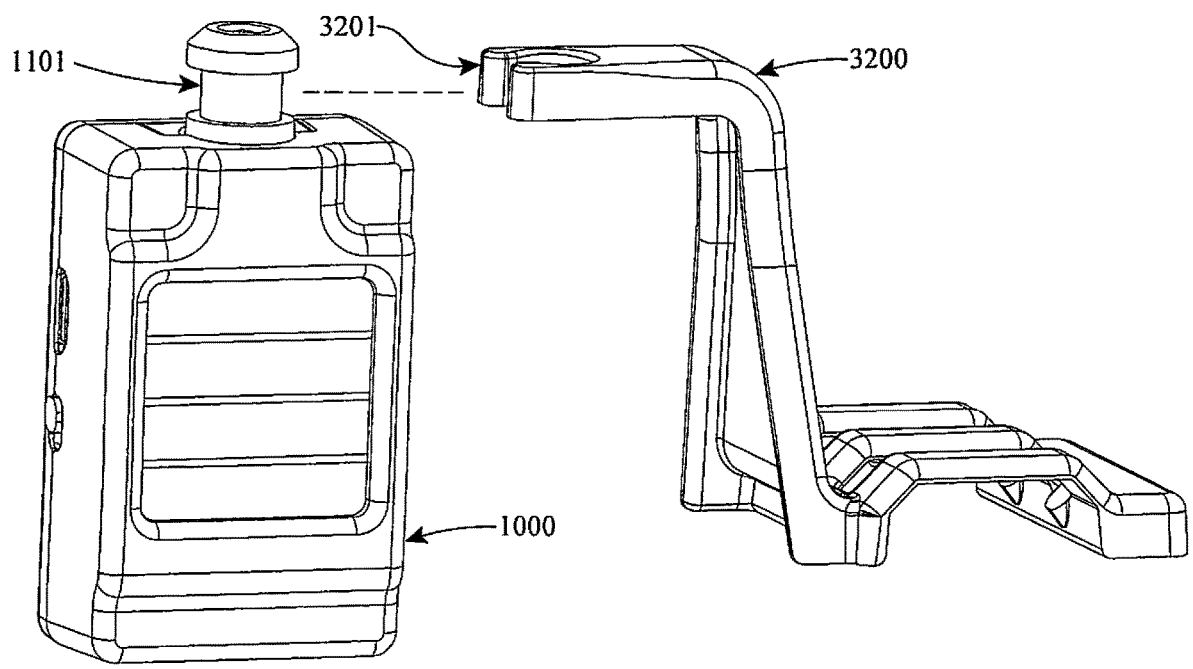
FIG. 7A shows a perspective front view of the primary housing interchangeable mounting mechanism male attachment feature of the embodiment shown in FIG. 1A attaching to the interchangeable mounting mechanism rail mounting embodiment's female mounting point snap-on features via a dotted line path.

The following section describes some of the possible embodiments of the interchangeable mounting mechanism rail mounting embodiment:

FIG. 7A shows a perspective font view of another preferred embodiment of the primary housing assembly 1000 from FIG. 1A that is attaching to the interchangeable mounting mechanism rail mounting embodiment 3200 via a dotted line path. The interchangeable mounting mechanism rail mounting embodiment's female mounting point snap-on features 3201 can temporarily flex to wrap around the primary housing interchangeable mounting mechanism male attachment feature 1101 and still allows for a degree of rotational freedom between the two components for further adjustment of positional and angular relationship between the target indication elements of the primary housing 1000 and the user/shooter.

Figure 7B:
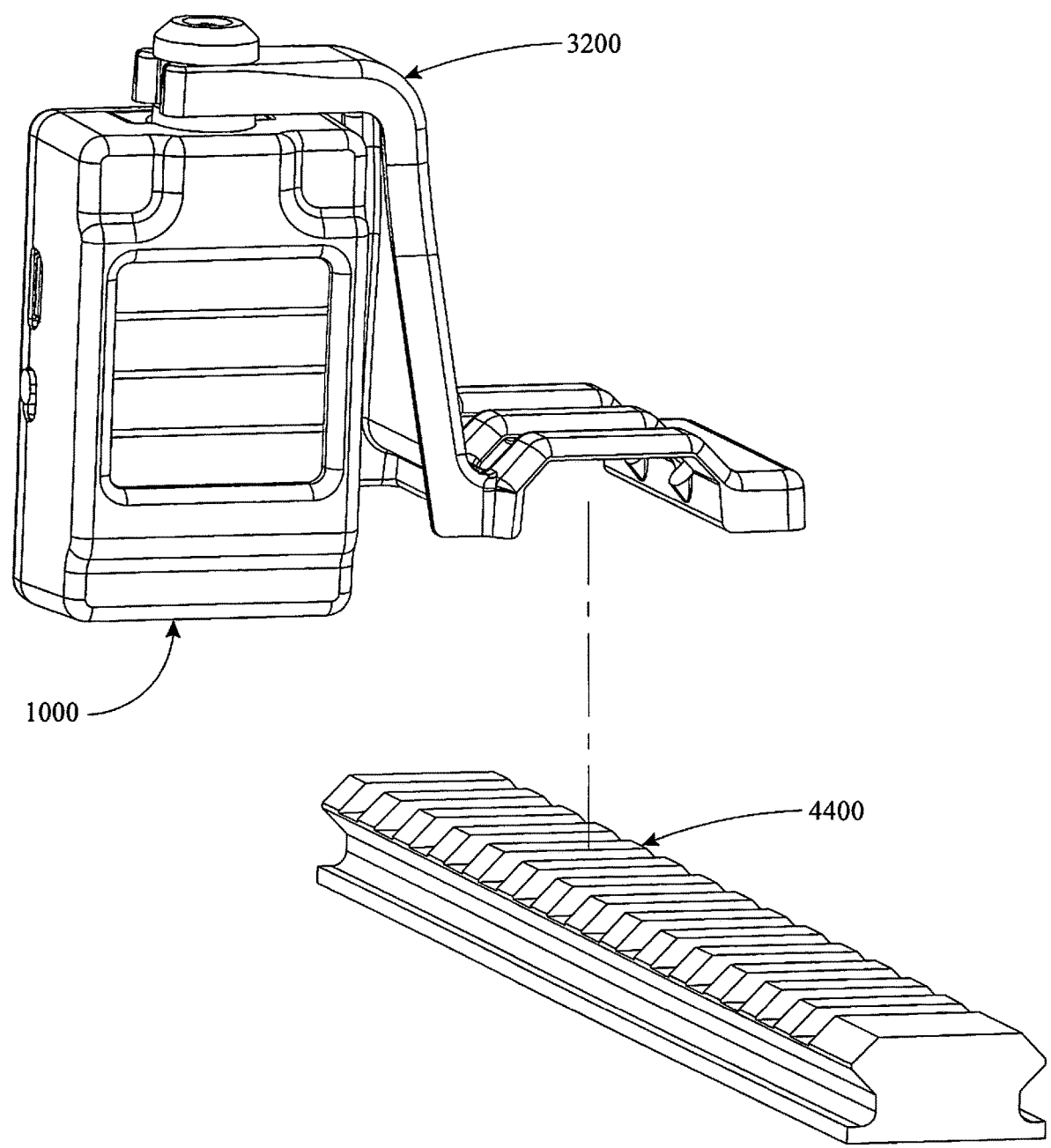
FIG. 7B shows a perspective front view of the interchangeable mounting mechanism rail mounting embodiment attaching to an accessory attachment rail via a dotted line path.

FIG. 7B shows the assembled primary housing assembly 1000 and interchangeable mounting mechanism rail mounting embodiment 3200 of FIG. 7A attaching to an accessory attachment rail 4400 via a dotted line path. Accessory attachment rails are widely used in firearms, such as but not limited to rifles and pistols, and therefore offer a commonly available place to attach the invention to the firearm.

Figure 7C:
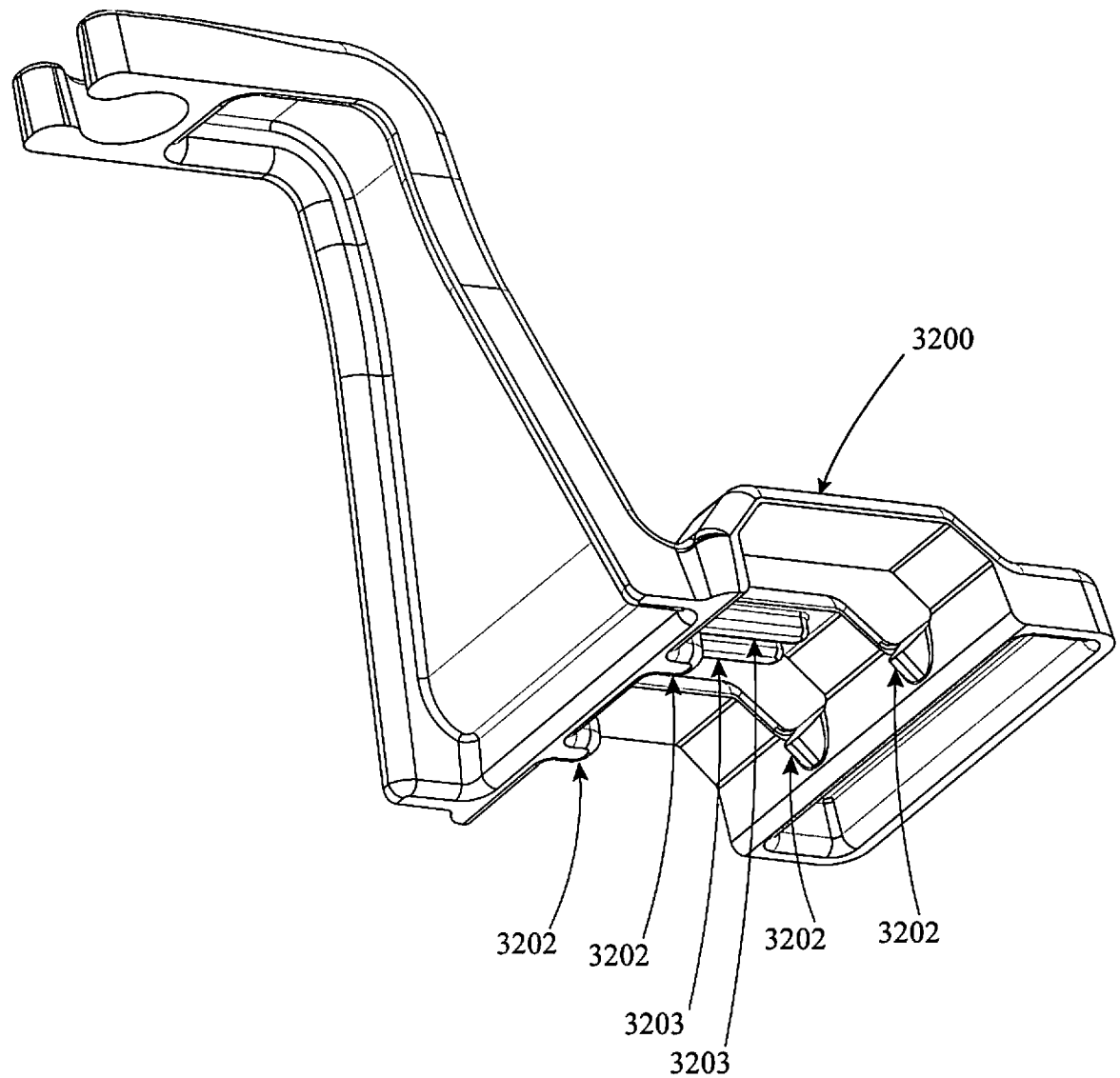
FIG. 7C shows a perspective bottom view of the interchangeable mounting mechanism rail mounting embodiment's rail mounting point snap-on features of the interchangeable mounting mechanism rail mounting embodiment

FIG. 7C shows a perspective view of the details of the attachment features of the interchangeable mounting mechanism rail mounting embodiment 3200 which include the interchangeable mounting mechanism rail mounting embodiment's rail mounting point snap-on features 3202 and the interchangeable mounting mechanism rail mounting embodiment rail mounting point keying feature 3203.

In FIG. 7D a top down view identifies the location of a cross-section displayed in FIG. 7D of the interchangeable mounting mechanism rail mounting embodiment 3200 while attached to the accessory attachment rail 4400.

In FIG. 7D the interchangeable mounting mechanism rail mounting embodiment rail mounting point snap-on features 3202 can be seen engaging the overhangs of the accessory attachment rail 4400 as well as the interchangeable mounting mechanism rail mounting embodiment rail mounting point keying feature 3203 residing in the negative space between instances of the rail pattern. The interchangeable mounting mechanism rail mounting embodiment rail mounting point keying feature 3203 prevents movement along the length of the accessory attachment rail 4400.

The interchangeable mounting mechanism rail mounting embodiment rail mounting point snap-on features 3202 prevent the lifting off of the interchangeable mounting mechanism rail mounting embodiment 3200 from the accessory attachment rail 4400 by grasping the accessory attachment rail 4400 on opposing sides as well as from below the overhangs of the accessory attachment rail 4400.

Figure 7E:
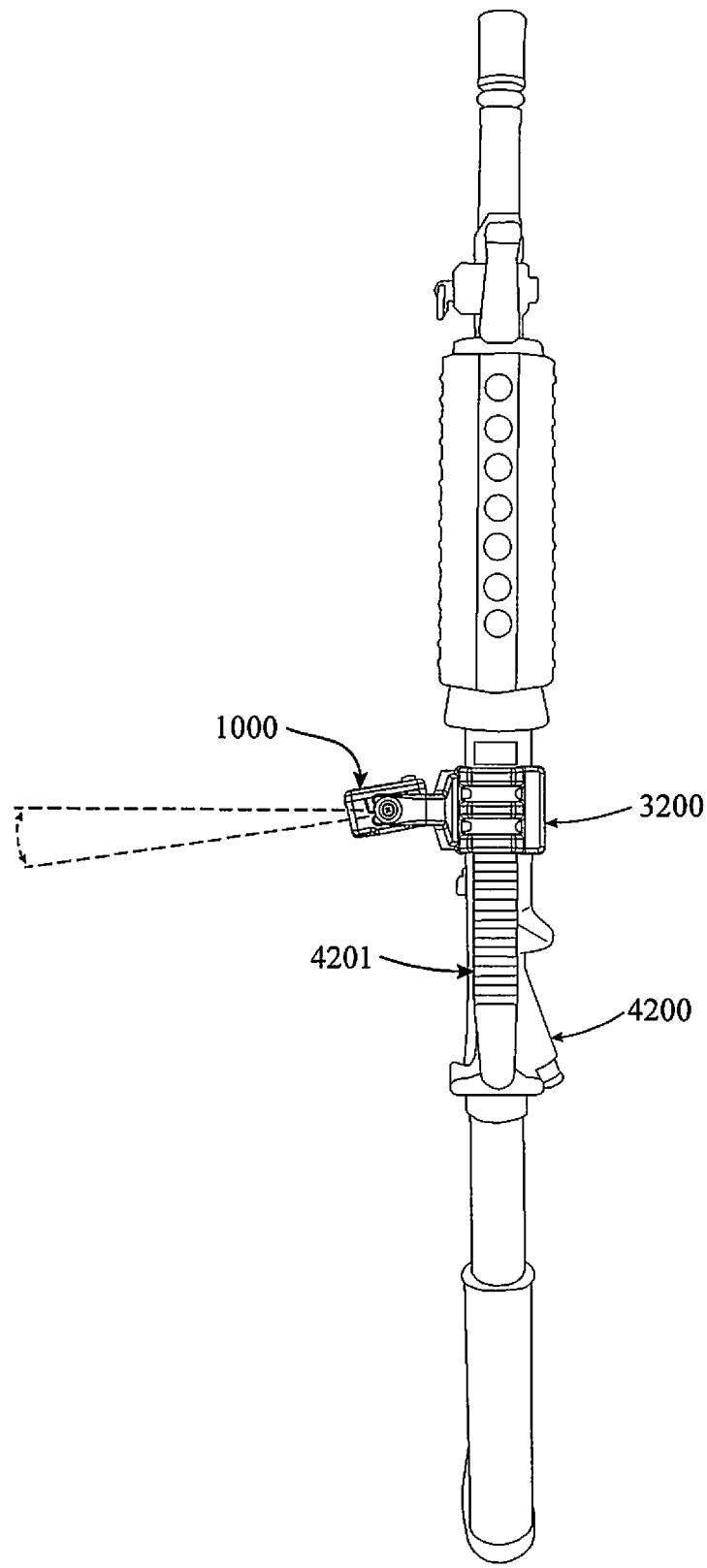
FIG. 7E shows a top down view of the embodiment shown in FIG. 7A and presents one of many possible initial positions prior to refinement of the position by the user/shooter
Figure 7F:
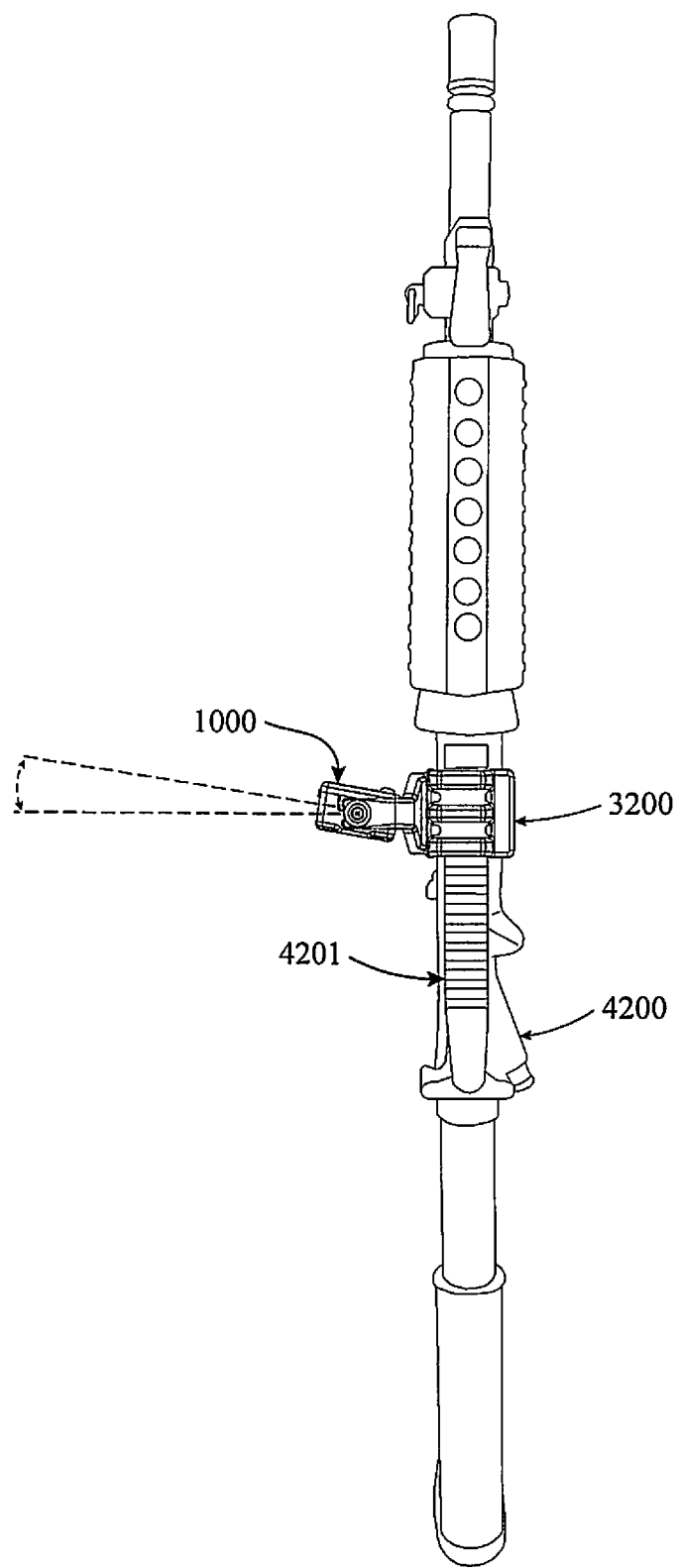
FIG. 7F shows a top down view of the embodiment shown in FIG. 7A and presents one of many possible final positions after refinement of the position by the user/shooter.

The embodiment shown in FIGS. 7A, 7B, 7C, 7D, 7E, 7F and 7G makes use of the interchangeable mounting mechanism rail mounting embodiment 3200 which allows for a variety of positional and angular relationships to be had between the target indication elements of the primary housing assembly 1000 and the user/shooter. Although many positions and angles can be accomplished, an example initial and final position and angle are shown in FIG. 7E and FIG. 7F, respectively, with one of the degrees of freedom depicted by a dotted arced line with arrows at each end.

Figure 7G:
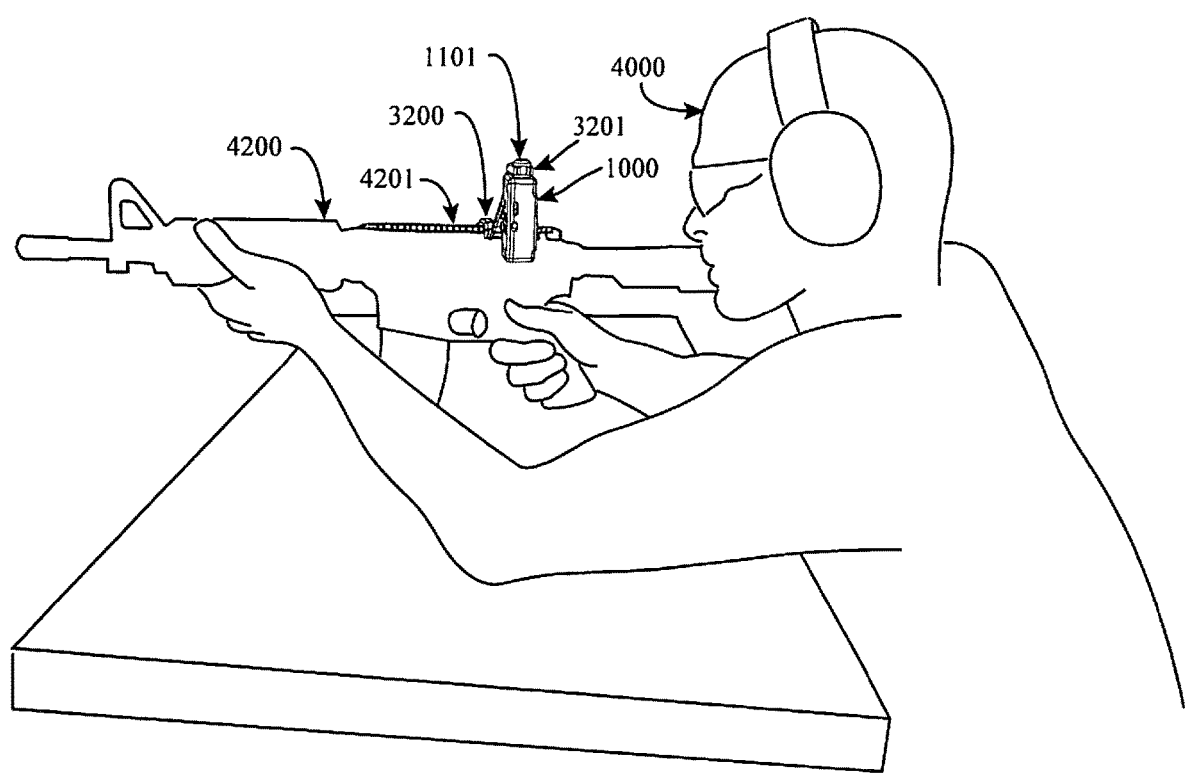
FIG. 7G shows a perspective top view of a user/shooter utilizing the embodiment of FIG. 7A mounted to a rifle accessory attachment rail.

FIG. 7G shows a user/shooter 4000 utilizing the assembled primary housing assembly 1000 and interchangeable mounting mechanism rail mounting embodiment 3200 of FIGS. 7A, FIG. 7B, FIG. 7C, FIG. 7D, FIG. 7E and FIG. 7F attached to a rifle accessory attachment rail 4201 of a rifle 4200 with the primary housing assembly 1000 positioned and angled to the user/shooter preference for a particular training scenario.

Figure 8A:
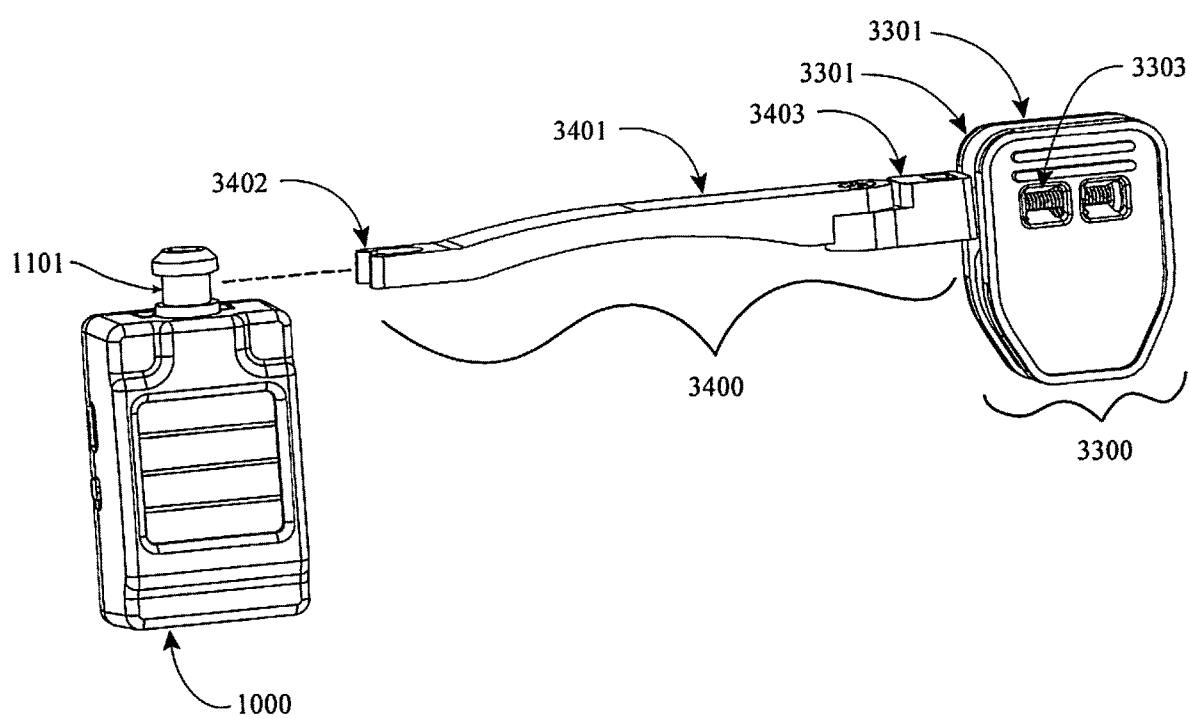
FIG. 8A shows a perspective front view of the embodiment of FIG. 1A attaching to the multi-angle, multi-jointed viewing angle adjustment mechanism which is in turn attached to the interchangeable mounting mechanism glasses mounting embodiment.

The following section describes some of the possible embodiments of the interchangeable mounting mechanism glasses mounting embodiment:

FIG. 8A is a perspective front view outline of an embodiment of a target dictation apparatus according to the invention that shows the assembled multi-angle, multi-jointed viewing angle adjustment mechanism 3400 and interchangeable mounting mechanism glasses mounting embodiment 3300 attaching to the primary housing 1000 via a dotted line path.

In FIG. 8A, the multi-angle, multi-jointed viewing angle adjustment mechanism 3400 is shown attached to the interchangeable mounting mechanism glasses mounting embodiment 3300. The multi-angle, multi-jointed viewing angle adjustment mechanism 3400 is comprised of the angle adjustment arm 3401, which has angle adjustment arm's female mounting point snap-on features 3402 that are used to temporarily flex and wrap around the primary housing interchangeable mounting mechanism male attachment feature 1101, and a pivoting joint connection to the angle adjustment rotation swivel 3403. The multi-angle, multi-jointed viewing angle adjustment mechanism 3400 is attached to the interchangeable mounting mechanism glasses mounting embodiment 3300 via the glasses mounting fastener 3303 that is partially obscured in FIG. 8A by the glasses mounting clip 3301.

The attachment of the multi-angle, multi-jointed viewing angle adjustment mechanism 3400 and the interchangeable mounting mechanism glasses mounting embodiment 3300 via the glasses mounting fastener 3303 allows for the angle adjustment rotation swivel 3403 to rotate about the axis of the glasses mounting fastener allowing for 360 degrees of rotational freedom between the two sub-assemblies 3400, 3300 which allows for a variety of possible positioning and angling adjustments between the target indication elements of the primary housing 1000 and the user/shooter 4000.

Figure 8B:
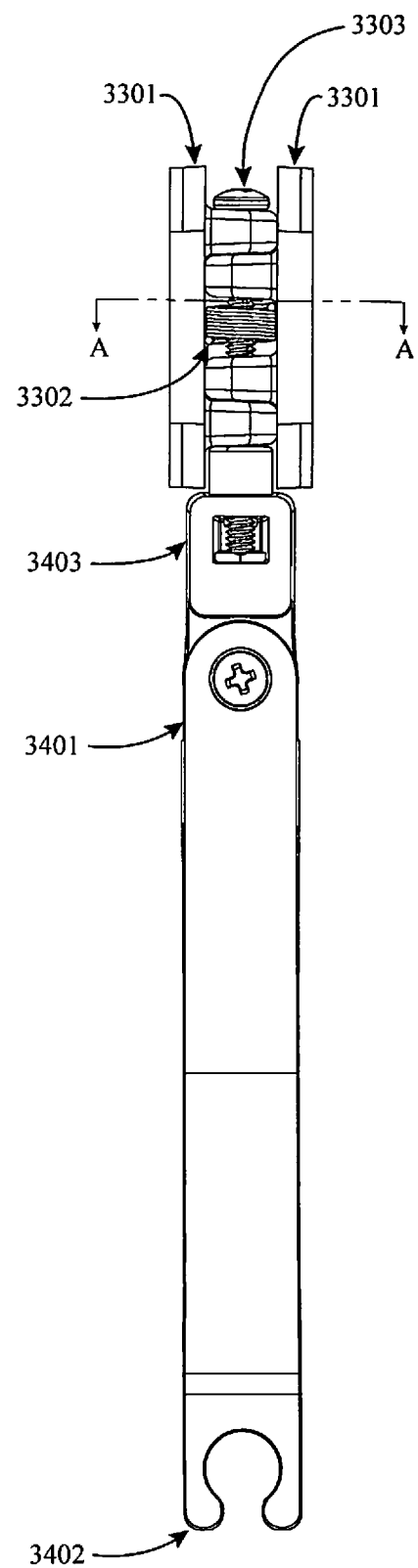
FIG. 8B is a top view of FIG. 8A of the assembled multi-angle, multi-jointed viewing angle adjustment mechanism 3400 and interchangeable mounting mechanism glasses mounting embodiment 3300.

FIG. 8B is a top view of FIG. 8A of the assembled multi-angle, multi-jointed viewing angle adjustment mechanism 3400 and interchangeable mounting mechanism glasses mounting embodiment 3300. FIG. 8B.SECTIONAL is a cross-sectional view of FIG. 8B along arrow A. In FIG. 8B.SECTIONAL, the glasses mounting clips 3101 of the interchangeable mounting mechanism glasses mounting embodiment 3300 are shown with the glasses mounting fastener 3303 centered between them acting as a free rotation axis. The glasses mounting clips 3301 are shown with opposing dotted line arrows representing the necessary force vectors that a user/shooter 4000 would need to apply in order to compress the glasses mounting spring 3202, which is depicted as a torsion spring in the preferred embodiment shown.

Figure 8C:
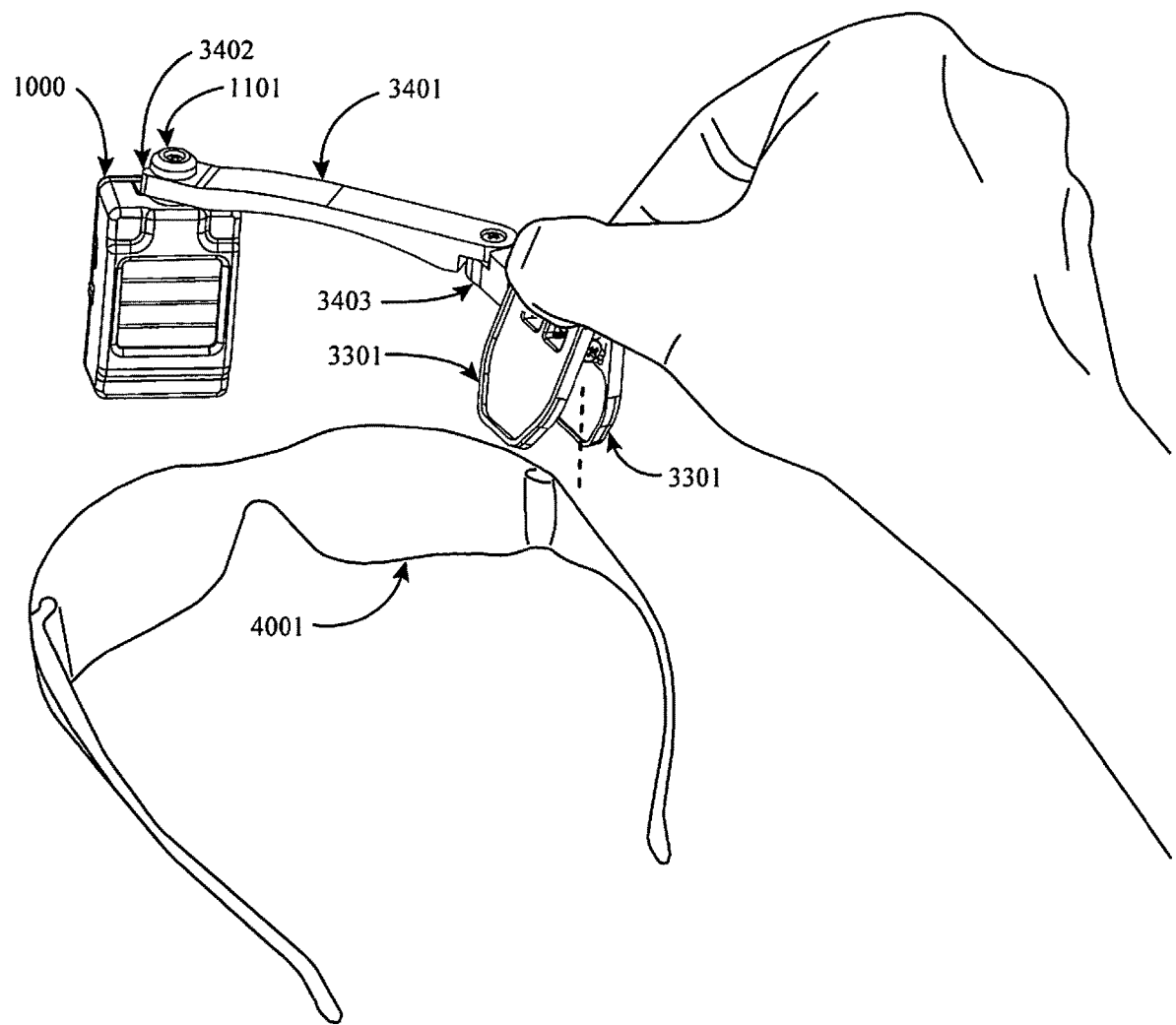
FIG. 8C and FIG. 8D shows a perspective top views of the user/shooter attaching the assembly of the multi-angle, multi-jointed viewing angle adjustment mechanism, the interchangeable mounting mechanism glasses mounting embodiment, and the embodiment of FIG. 1A by compressing the glasses mounting clips as depicted in FIG. 8B and releasing the compression (FIG. 8D) once the assembly is in place.
Figure 8D:
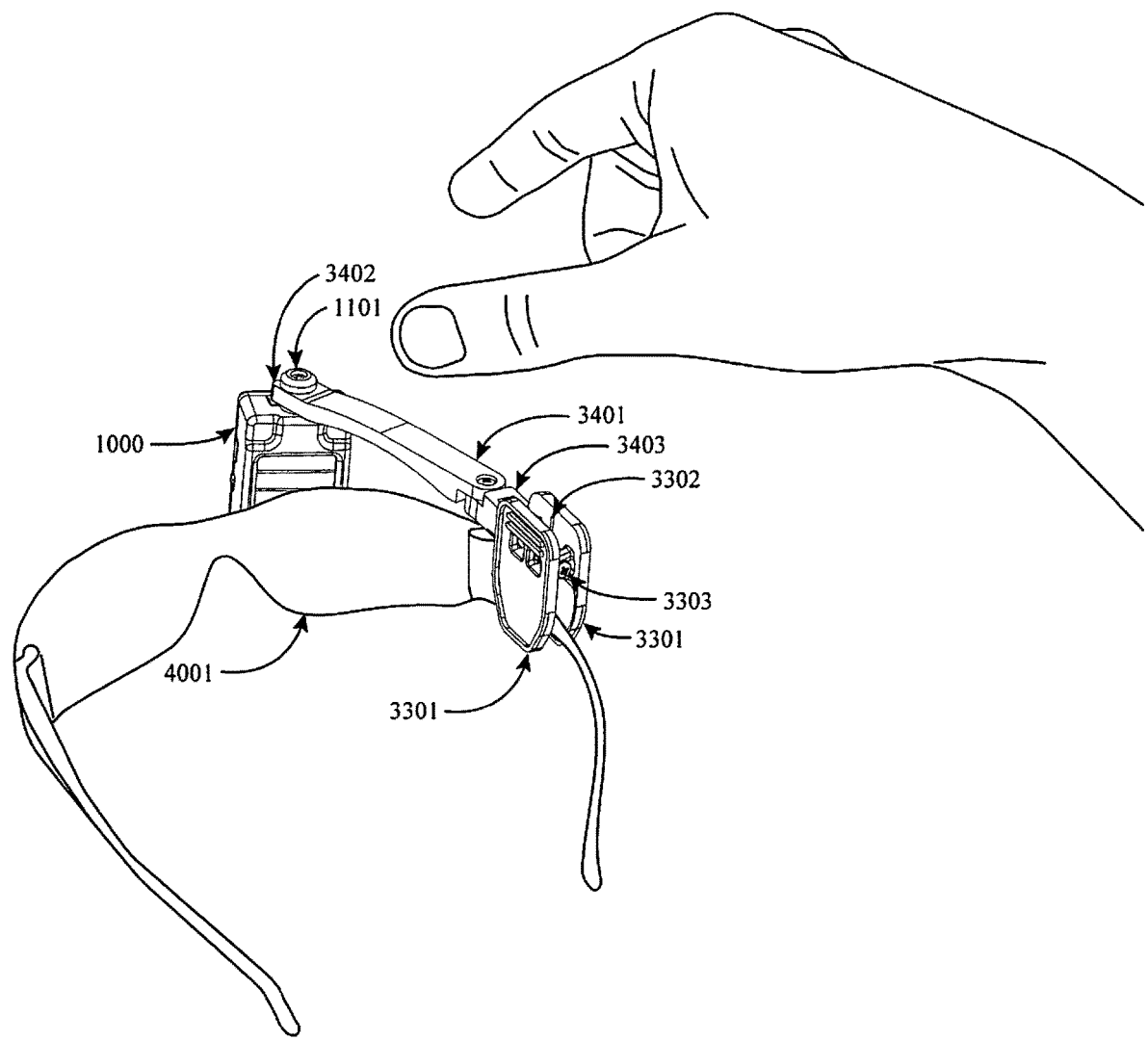

FIG. 8C show a user/shooter applying a squeezing force on components 3301 as shown in FIG. 8B.Sectional in order to attach the assembled embodiment of FIG. 8A to a pair of glasses 4001 via a dotted line path. In FIG. 8D the attached assembled embodiment of FIG. 8A is shown attached to the pair of glasses 4001 of FIG. 8C.

Figure 8E:
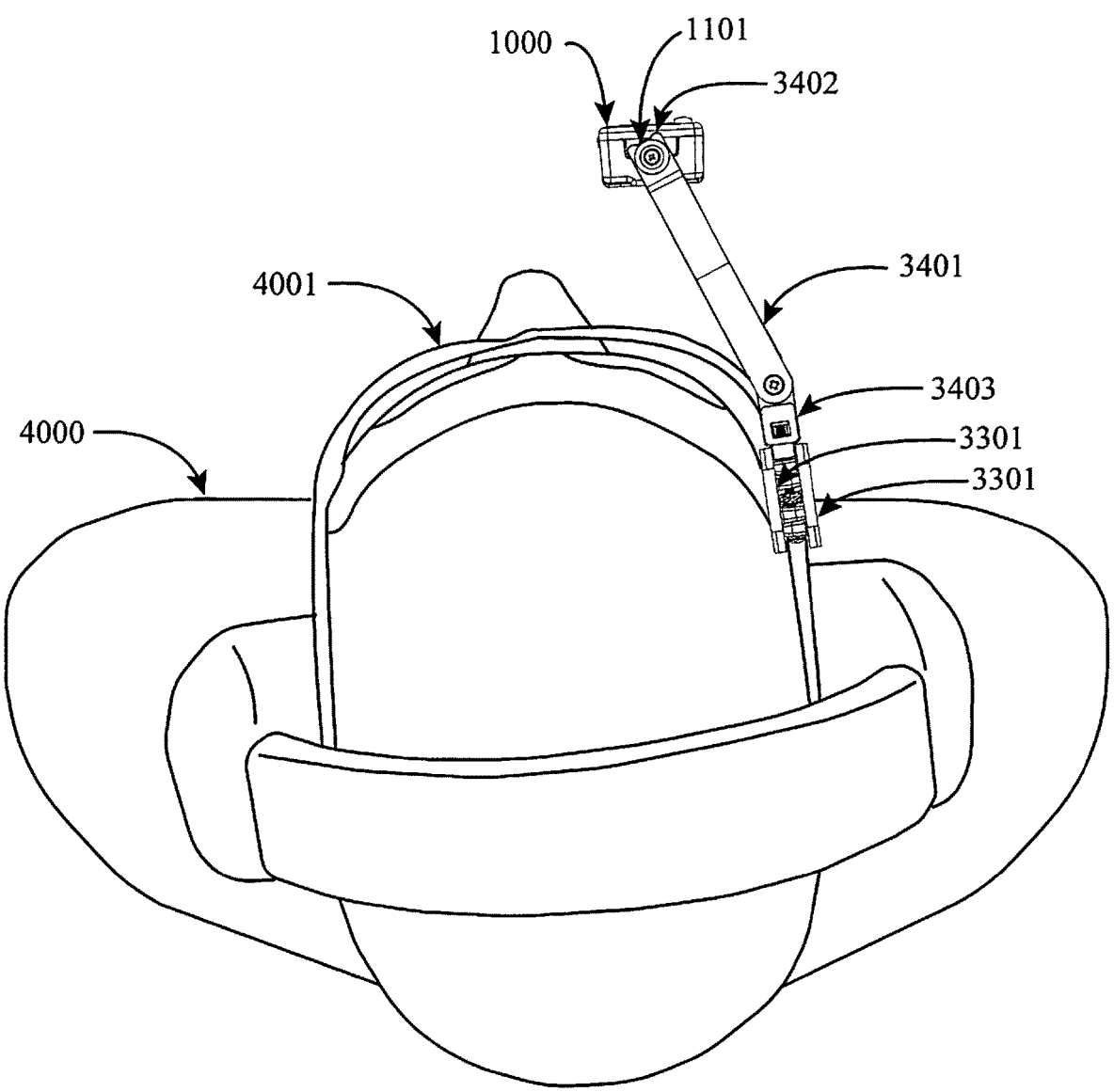
FIG. 8E is a top down view of the user/shooter utilizing the embodiment shown in FIG. 8C and FIG. 8D and presents one of many possible initial positions prior to refinement of the position by the user/shooter.
Figure 8F:
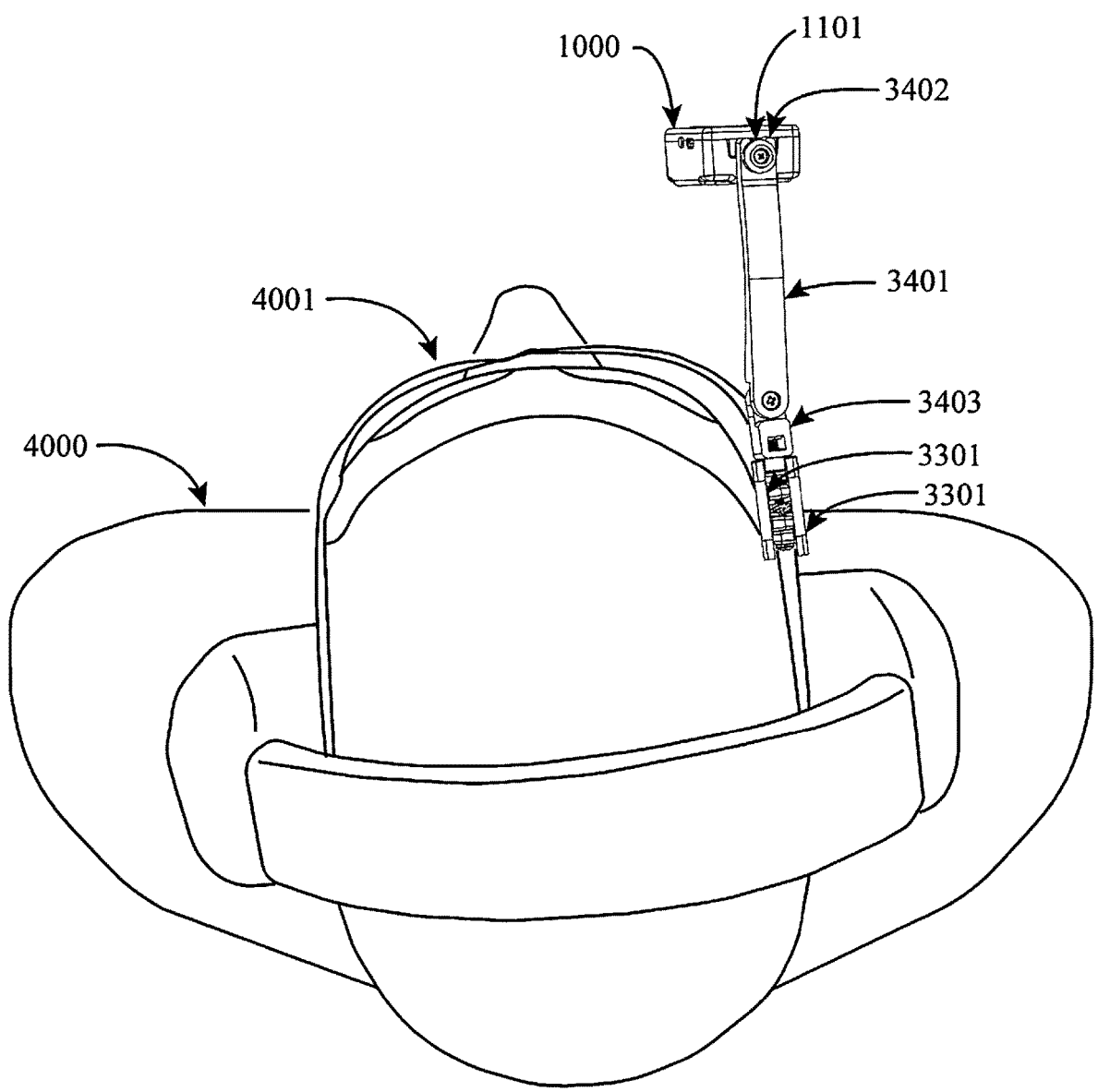
FIG. 8F is a top down view of the user/shooter utilizing the embodiment shown in FIG. 8C and FIG. 8D and presents one of many possible final positions after refinement of the position by the user/shooter.

Although many positions and angles can be accomplished, an example initial and final position and angle of the assembled embodiment of FIG. 8D attached to the glasses 4001 of the user/shooter 4000 are shown in top down views of FIG. 8E and FIG. 8F, respectively, with several of the degrees of freedom depicted as being changed between the two images.

Figure 9:
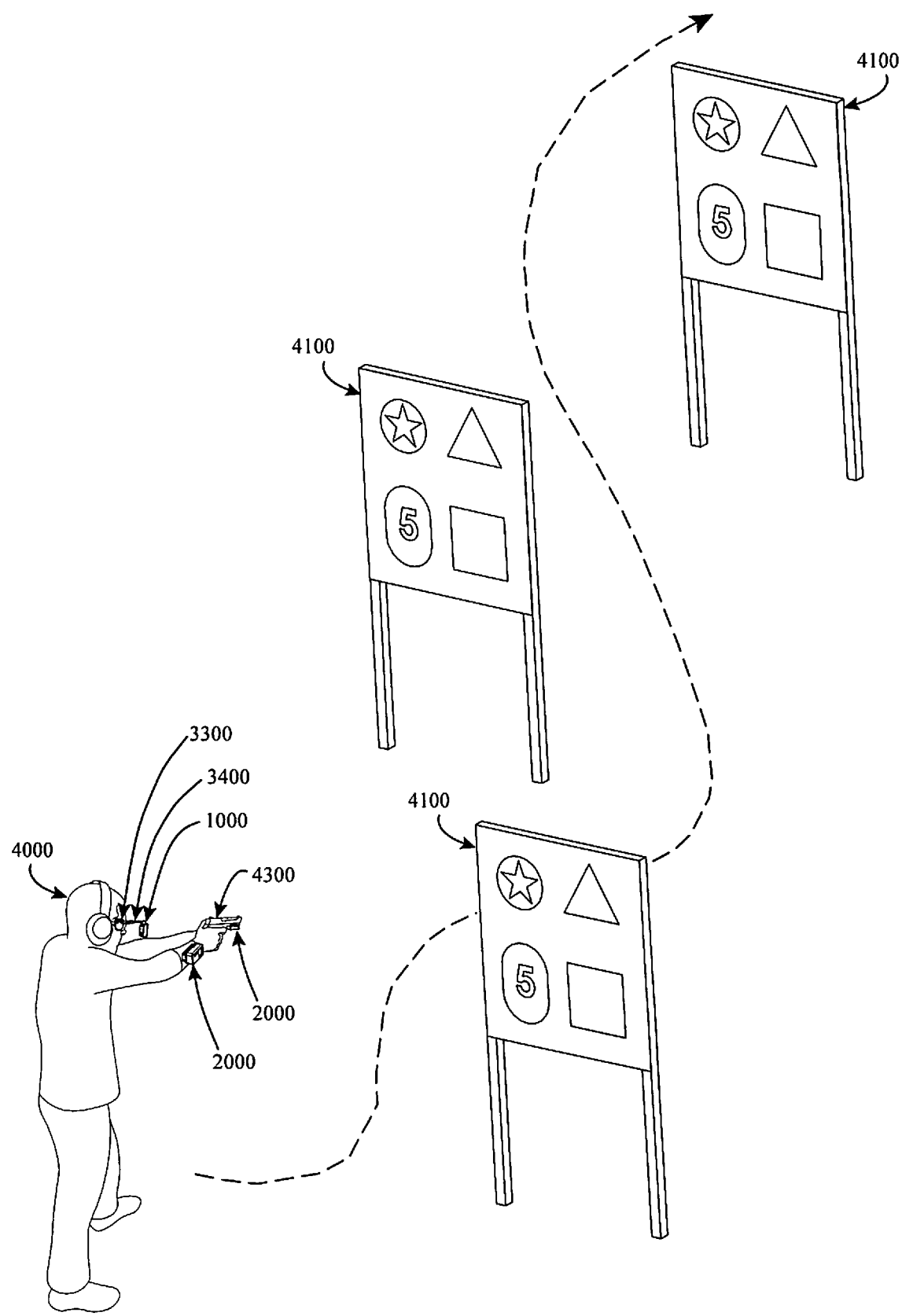
FIG. 9 is a perspective top view of a user/shooting utilizing an assembly of the multi-angle, multi-jointed viewing angle adjustment mechanism, the interchangeable mounting mechanism glasses mounting embodiment, and the embodiment of FIG. 1A attached to their glasses while simultaneously utilizing a secondary housing assembly of the embodiment shown in FIG. 4B and an additional secondary housing in the manner shown in FIG. 5B.

The following section describes an example of a user/shooter walking through a series of target stands while using the invention:

FIG. 9 is a perspective overhead view outline of an embodiment of a target dictation apparatus according to the invention attached to a user/shooter 4000 while the user/shooter is moving through a series of multiple target stands, each target stand with a target sheet 4100 that contain multiple target identifiers.

In this example image, the user/shooter has the assembled embodiment of FIG. 8A, 3300, 3400, 1000, attached to the glasses 4001 of the user/shooter 4000 as well as a secondary housing assembly 2000 attached to their wrist and a second secondary housing assembly 2000 attached to their pistol 4300 via its pistol accessory attachment rail 4301.

In this example image the user 4000 can move freely along the dotted line path while engaging the targets as needed, unrestrained by way of the benefit of the light weight, compactness, and portability of the invention. The combination of the use of a glasses mounted primary housing assembly 1000, a wrist mounted secondary housing assembly 2000, and a second weapon mounted secondary housing assembly 2000 allows for a large variety of sensor inputs to alter the training sequence and/or provide information and/or feedback to the user to alter their target engagement training abilities.

Figure 10A:
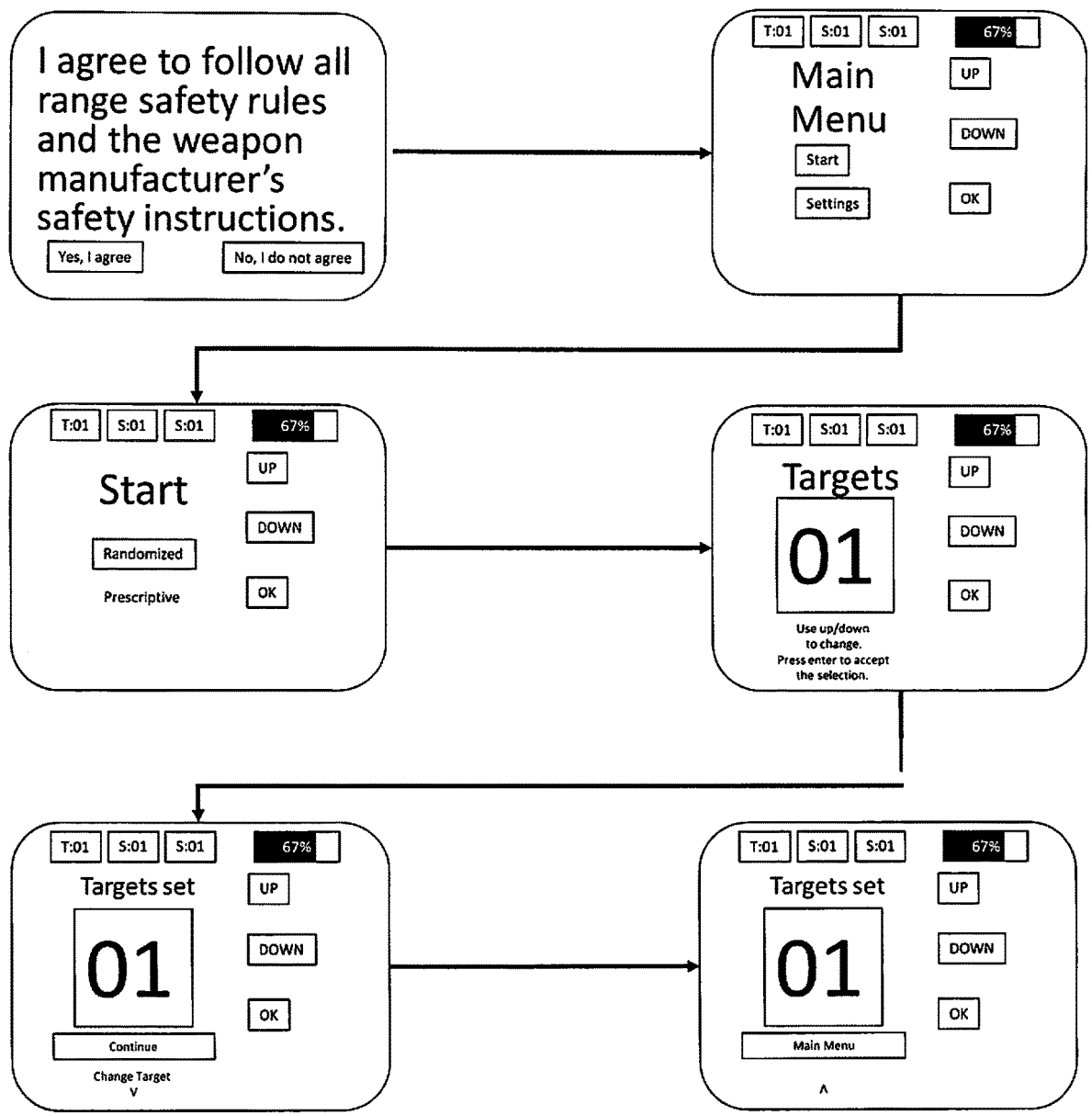
FIG. 10A is the apparatus menu as a user progresses through the decision tree by choosing either a randomized or prescribed training sequence and includes selection of the quantity of target identifiers that can be presented.

The following section describes some of the possible embodiments of the option menus:

FIG. 10A shows a progression of the menus that the user 4000 can engage with to adjust the various settings of the device. The first menu pane in the diagram shows the option to accept a cautionary message. The second menu pane shows the main menu screen which allows the user to choose between starting the training sequence options selection process or changing the settings of the device. If the user selects the start option, they will be presented with the next menu pane showing the option of choosing randomized or prescriptive options for the training sequence. In the next menu panes of FIG. the user 4000 can select and confirm the number of target identifiers to be presented (whether randomized or prescriptively presented) and then return to the main menu pane.

Figure 10B:
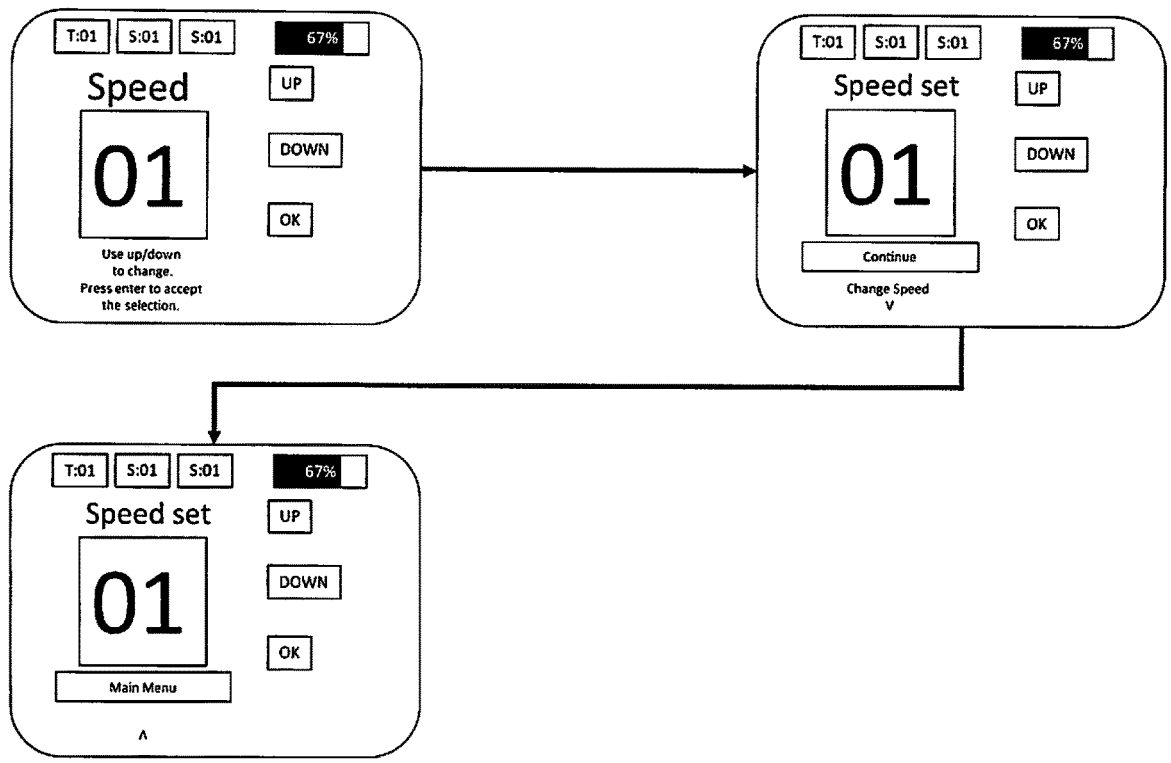
FIG. 10B is the apparatus menu as a user makes a decision on the speed setting to be utilized for the training sequence.

In FIG. 10B, after the user 4000 has selected the number of target identifiers to be presented, the user can choose the speed settings (whether utilized randomized or prescriptively) and then return to the main menu pane.

Figure 10C:
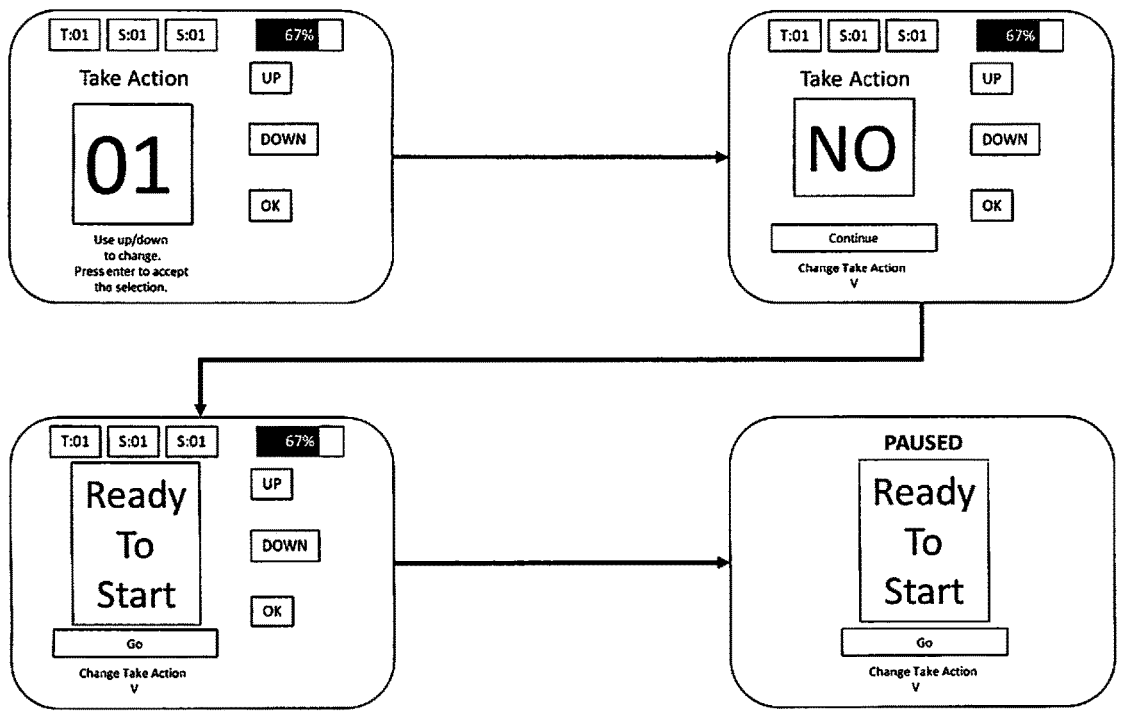
FIG. 10C is the apparatus menu as the user makes a decision on whether a take action identifier will be utilized for the training sequence.

In FIG. 10C, after the user 4000 has selected the speed settings to be utilized, the user 4000 can choose whether to include take action identifiers in their training sequence. Upon confirming their selection, the user 4000 is presented with the option to start the training sequence. If desired, the user 4000 can optionally pause the training sequence at any time during their training and the paused menu pane is display for example.

Figure 10D:
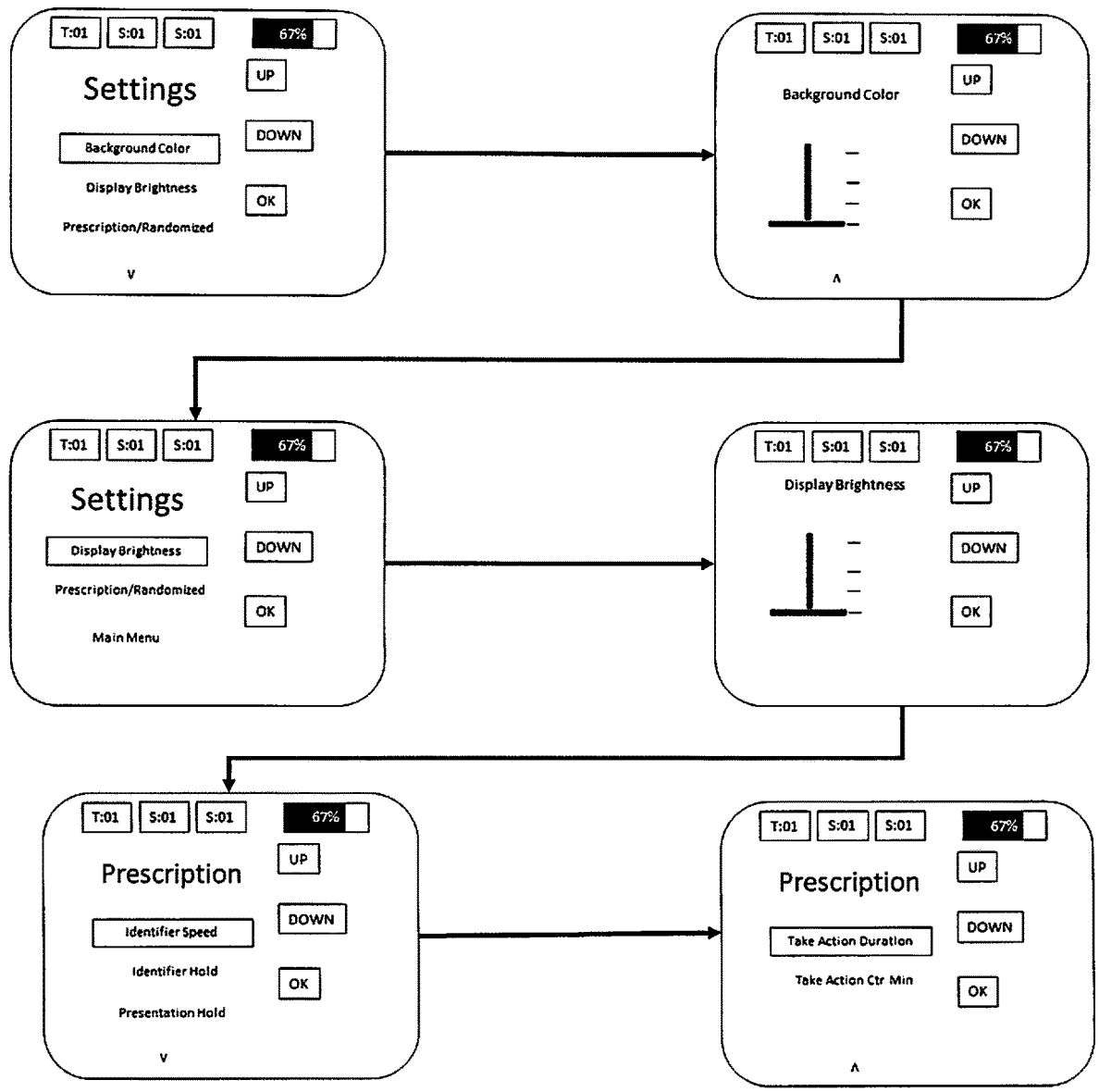
FIG. 10D is the apparatus menu where the user can prescribe settings that best align with and support the intended training scenario.

FIG. 10D shows several example menu panes that allow the user 4000 to customize various settings of the device to customize their training sequence for their particular training scenario. For example, a user 4000 can change the background color to all white for outdoor daylight training scenarios with the brightness turned all the way up while they might change the background color to all black with the brightness set to the lowest setting for night time or darkened room training scenarios.

The following section describes some of the possible embodiments of the take action identifiers:

FIG. 11 shows a table of some of the take action identifiers that can be inserted at random or in a prescribed manner into a training sequence in order to dictate to the user/shooter to take an action described by a take action identifier.

One example of the use of a take action identifier would be the presentation of a reload identifier. Upon the presentation of the reload identifier the user 4000 would be thereby directed to reload their weapon which is known as a tactical reload in target engagement training.

Another example of the use of a take action identifier would be the presentation of a change weapon identifier. Upon the presentation of the change weapon identifier the user would be thereby directed to switch weapons, for example from using their rifle to using their pistol, which is known as a weapon transition in target engagement training.

Figure 12A:
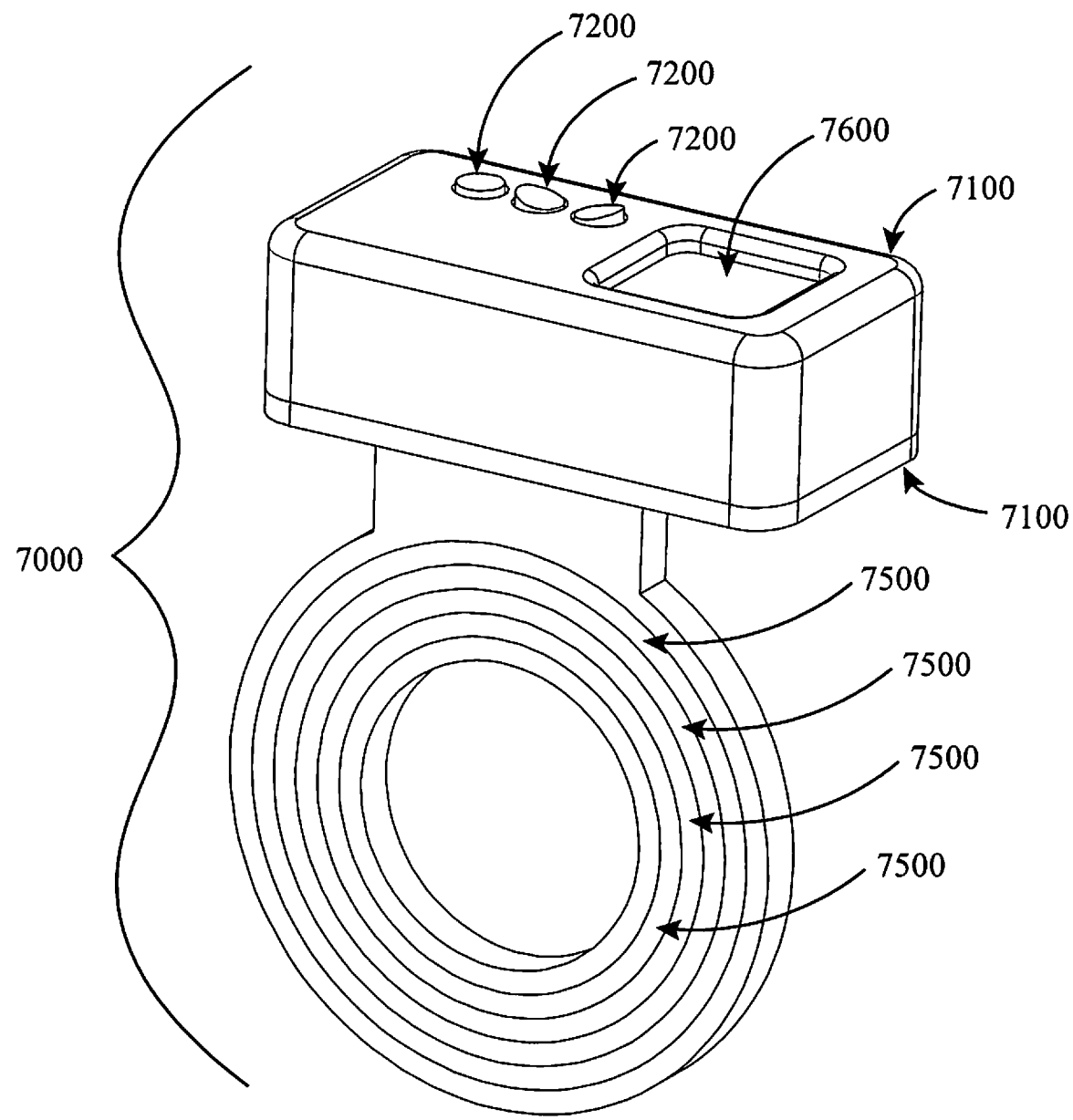
FIG. 12A is a perspective front view of another embodiment, the primary housing look-through ring embodiment, which shows a semi-transparent circular segmented LCD with a central void which in total serves as a target indication element presentation screen exemplifying 4 available concentric annular target indication elements. The primary housing assembly also shows user input and user feedback mechanisms.

The following section describes some of the possible embodiments of the primary housing look-through ring embodiment shown in FIG. 12A.

In another embodiment, the primary housing look-through ring embodiment 7000 can be configured such that the target indication elements are directly in the user's line of sight of at least one eye and thereby overlay the targets. In FIG. 12A this embodiment can be seen in a perspective front view. When this positioning method is used, the primary housing look-through ring embodiment target indication elements 7500 can be opaque if the user 4000 has both eyes open and the target indication elements are in-line with one of the user's eyes making the overlay effect possible by the user's brain merging each eye's individual visual image.

Alternatively, when this position method is used, the primary housing look-through ring embodiment target indication elements 7500 can be semi-transparent, translucent, and the like, if the user 4000 has one eye closed and the target indication elements are in-line with the user's open eye making it possible to see the targets through the semi-transparent, translucent, and the like, primary housing look-through ring embodiment target indication elements 7500 with the overlaying effect.

Additionally, when this position method is used with the target indication elements being semi-transparent, translucent, and the like, the primary housing look-through ring embodiment target indication elements 7500 can be positioned over both eyes, regardless of the user closing one eye or not, and it is possible to see the targets through the primary housing look-through ring embodiment target indication elements 7500 with the overlaying effect.

In another embodiment, the primary housing look-through ring embodiment 7000 can take the form of an enclosure that contains some or all of the primary housing look-through ring embodiment electronic components 7700 and is formatted to include a ring shape as shown in FIG. 12A, which therein can include LEDs or LCDs positioned in a concentric annular fashion which are presented to the user as target identifiers. Providing the target identifiers in a concentric annular fashion allows the user to position the device directly in-line with the eye and target so that their entire peripheral vision of at least one eye can be enveloped in one or more target identifiers.

Additionally, this embodiment can allow such a device to be place around a weapon mounted scope so that when a shooter is utilizing the scope, their entire peripheral vision of at least one eye can be enveloped in one or more target identifiers.

FIG. 12A is a perspective front view showing the primary housing look-through ring embodiment assembly 7000. The primary housing look-through ring embodiment 7000 is comprised of a set of primary housing look-through ring embodiment housing elements 7100, a primary housing look-through ring embodiment exterior push button user input mechanism 7200 such as button switches and the like, a primary housing look-through ring embodiment exterior on/off power switch 7300, primary housing look-through ring embodiment battery and male battery connector 7400, primary housing look-through ring embodiment LCD target indication element 7500, a primary housing look-through ring embodiment LCD user feedback mechanism 7600, and the primary housing look-through ring embodiment electronics 7700.

Figure 12B:
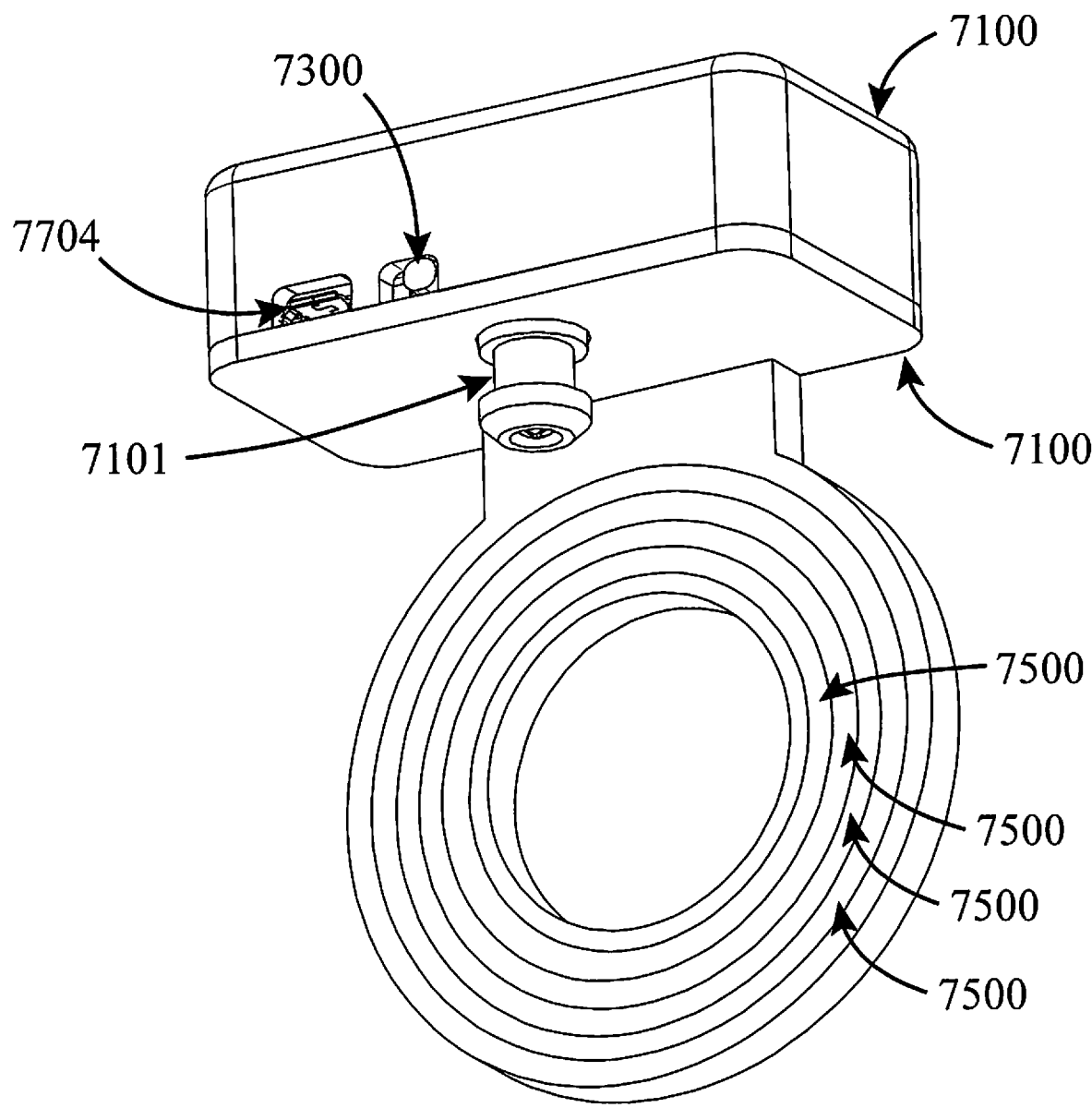
FIG. 12B is a perspective rear view of the embodiment shown in FIG. 12A and exemplifies the primary housing look-through ring embodiment interchangeable mounting mechanism male attachment feature along with elements used in the powering of the device.

FIG. 12B is a perspective rear view that additionally shows the possible locations of the primary housing look-through ring embodiment interchangeable mounting mechanism male attachment feature 7101, the primary housing look-through ring embodiment exterior on/off power switch 7300, and the primary housing look-through ring embodiment USB power and wired communication antennae 7704.

Figure 12C:
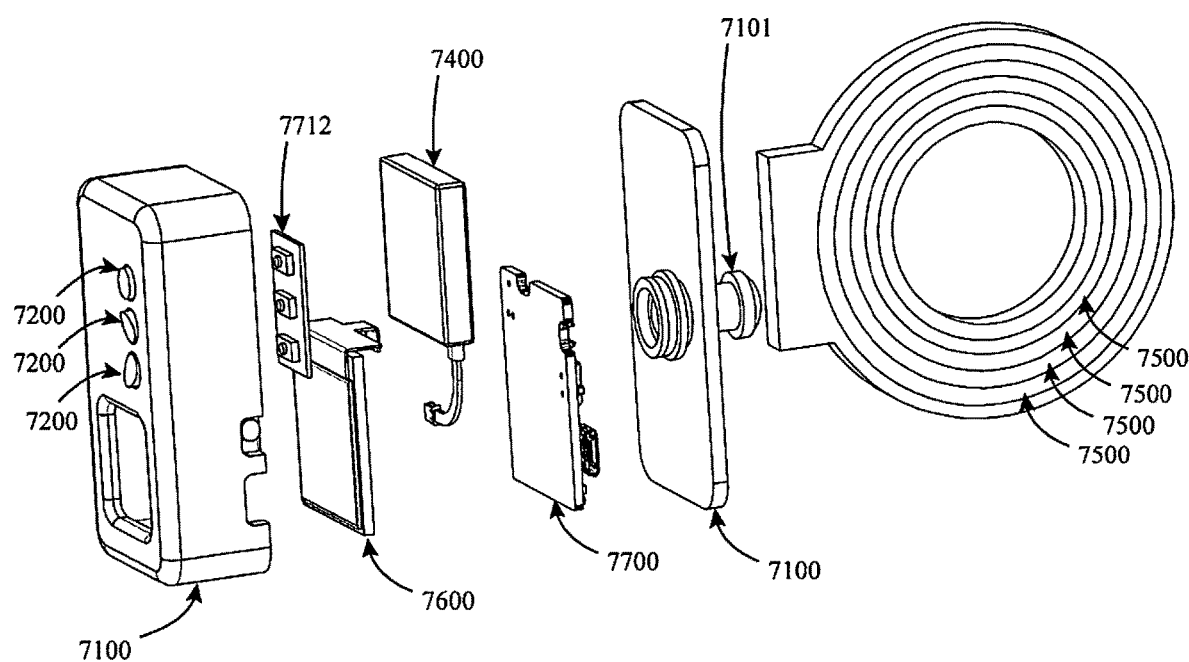
FIG. 12C shows an exploded view of the embodiment shown in FIG. 12A that includes the primary housing look-through ring embodiment battery & male battery connector, an LCD configuration of target indication elements, an LCD configuration of a primary housing look-through ring embodiment LCD user feedback mechanism and the primary housing look-through ring embodiment electronics.

FIG. 12C is an exploded view of the primary housing look-through ring embodiment 7000 of FIG. 12A and FIG. 12B showing the alignment of the internal components within the primary housing look-through ring embodiment. The internal components of the primary housing look-through ring embodiment can consist of a printed circuit board assembly (PCBA) 7700, a low profile compact battery 7400 that attaches to the PCBA, an LCD screen used to present the target identifiers 7500, an LCD screen 7600 used to present other information and feedback such as the option menus discussed in FIG. 10A through 10D, and an electronic push button user input mechanism and PCB 7712.

In another embodiment, the primary housing look-through ring embodiment 7000 can be powered by the use of one or more batteries mounted upon or contained within the device.

In another embodiment, the primary housing look-through ring embodiment 7000 can be powered by the use of one or more wired powered sources from an off-board power source(s) to the device.

Figure 12D:
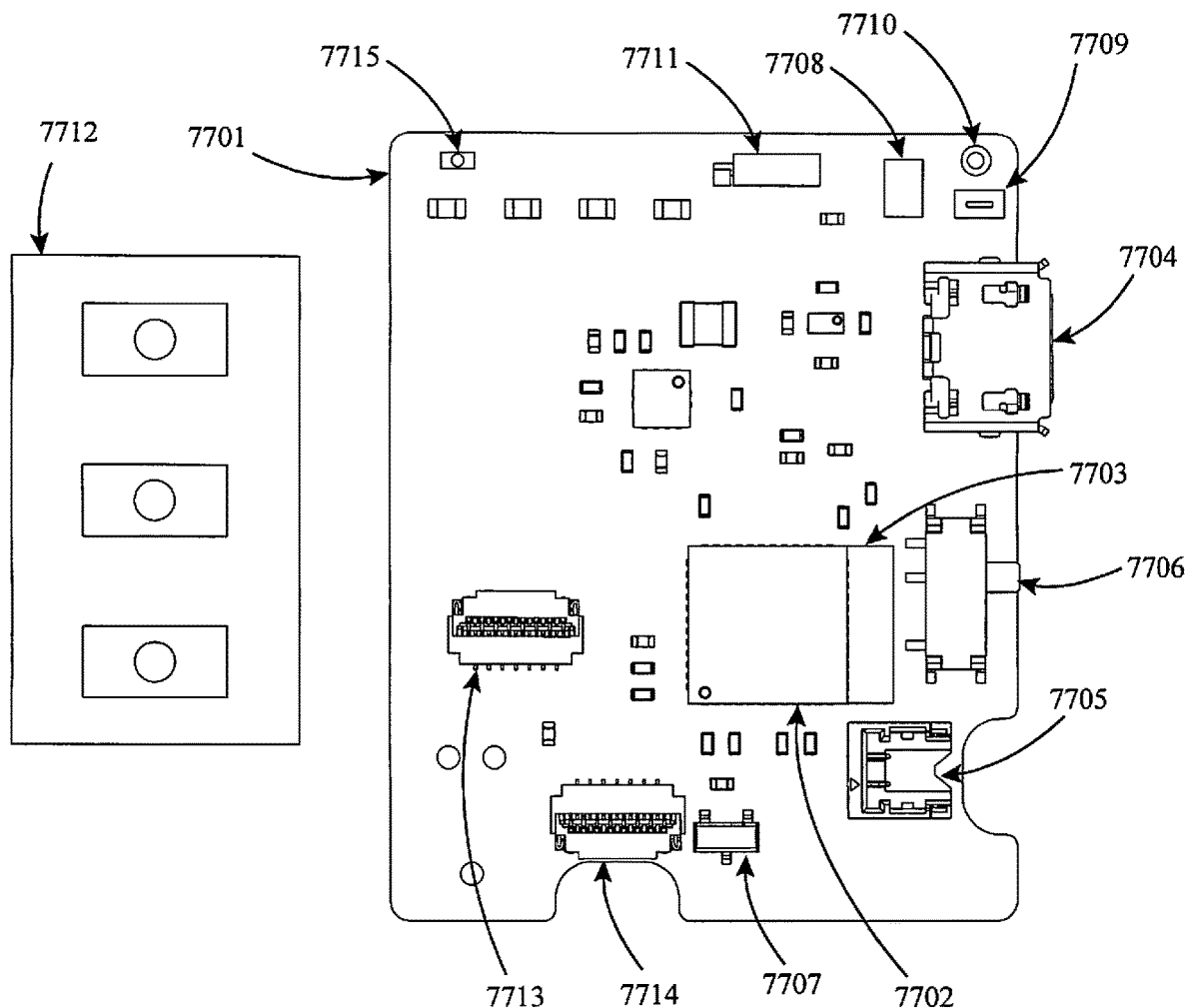
FIG. 12D shows a front view of the primary housing look-through ring embodiment electronics of the embodiment shown in FIG. 12A that include the primary housing look-through ring embodiment PCB (printed circuit board), primary housing look-through ring embodiment microprocessor, primary housing look-through ring embodiment wireless communication antennae, and the primary housing look-through ring embodiment electronic on/off power switch, as well as other key components discussed herein.

FIG. 12D shows the preferred embodiment of the primary housing look-through ring embodiment electronics 7700 of a target dictation apparatus according to the invention. FIG. 12D shows key components of the primary housing look-through ring embodiment electronics 7700 and includes component 7701 which is the primary housing look-through ring embodiment PCB, component 7702 which is the primary housing look-through ring embodiment microprocessor, component 7703 which is the primary housing look-through ring embodiment wireless communication antennae, component 7704 which is the primary housing look-through ring embodiment USB power and wired communication port, and component 7705 which is the primary housing look-through ring embodiment female battery connector, component 7706 which is the primary housing look-through ring embodiment electronic on/off power switch, component 7707 which is the primary housing look-through ring embodiment voltage regulator.

Component 7707 can be the primary housing look-through ring embodiment accelerometer sensor, component 7709 which is the primary housing look-through ring embodiment microphone, component 7710 which is the primary housing look-through ring embodiment speaker user feedback mechanism, component 7711 which is the primary housing look-through ring embodiment vibratory user feedback mechanism, component 7712 which is the primary housing look-through ring embodiment electronic push button user input mechanism, component 7713 which is the primary housing look-through ring embodiment target indication element connection port, 7714 which is the primary housing look-through ring embodiment LCD user feedback connection port, and component 7715 which is the primary housing look-through ring embodiment LED user feedback mechanism. Several of the above components and their advantages have been described in further detail above.

Figure 12E:
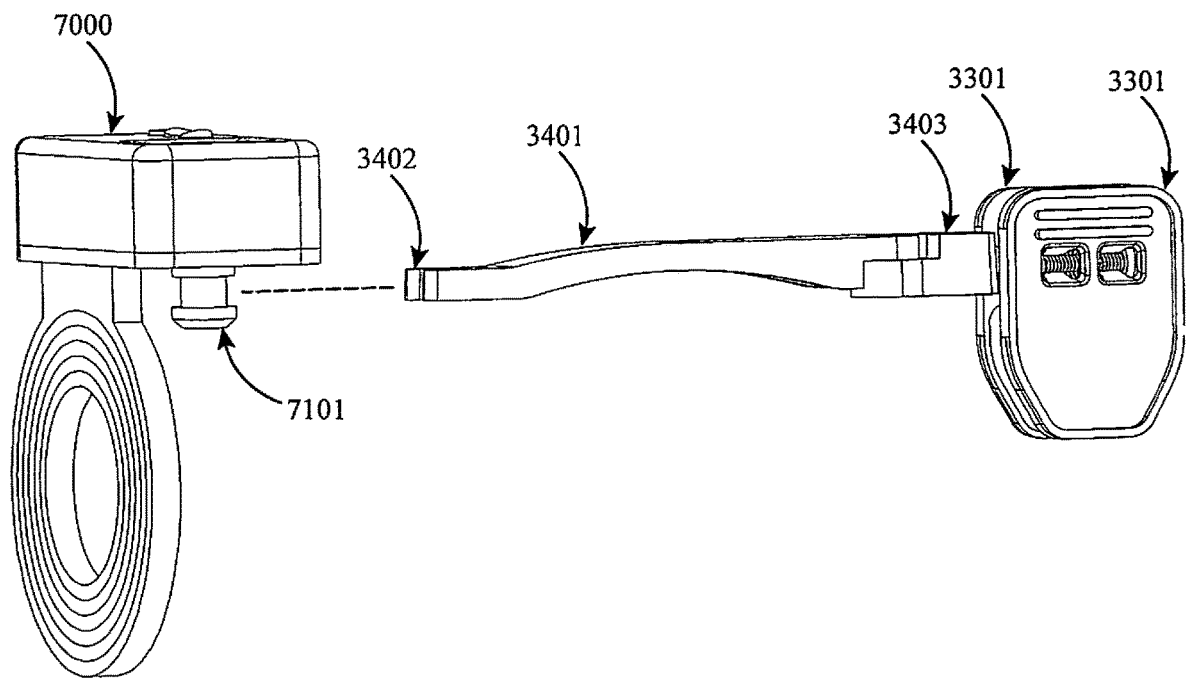
FIG. 12E shows a perspective elevation view of the embodiment shown in FIG. 12A attaching to the assembly of the multi-angle, multi-jointed viewing angle adjustment mechanism and the interchangeable mounting mechanism glasses mounting embodiment via a dotted line path.

FIG. 12E is a perspective view of the primary housing assembly look-through ring embodiment 7000 attaching via the primary housing look-through ring embodiment interchangeable mounting mechanism male attachment feature 7101 to the assembled multi-angled, multi-jointed viewing angle adjustment mechanism 3400 and interchangeable mounting mechanism glasses mounting embodiment 3300 via a dotted line path.

The angle adjustment arm's female mounting point snap-on features 3402 of the multi-angled, multi-jointed viewing angle adjustment mechanism 3400 can temporarily flex and wrap around the primary housing look-through ring embodiment interchangeable mounting mechanism male attachment feature 7101 and still allow for free rotational degrees of freedom between the two assemblies, 7000, 3400.

Figure 12F:
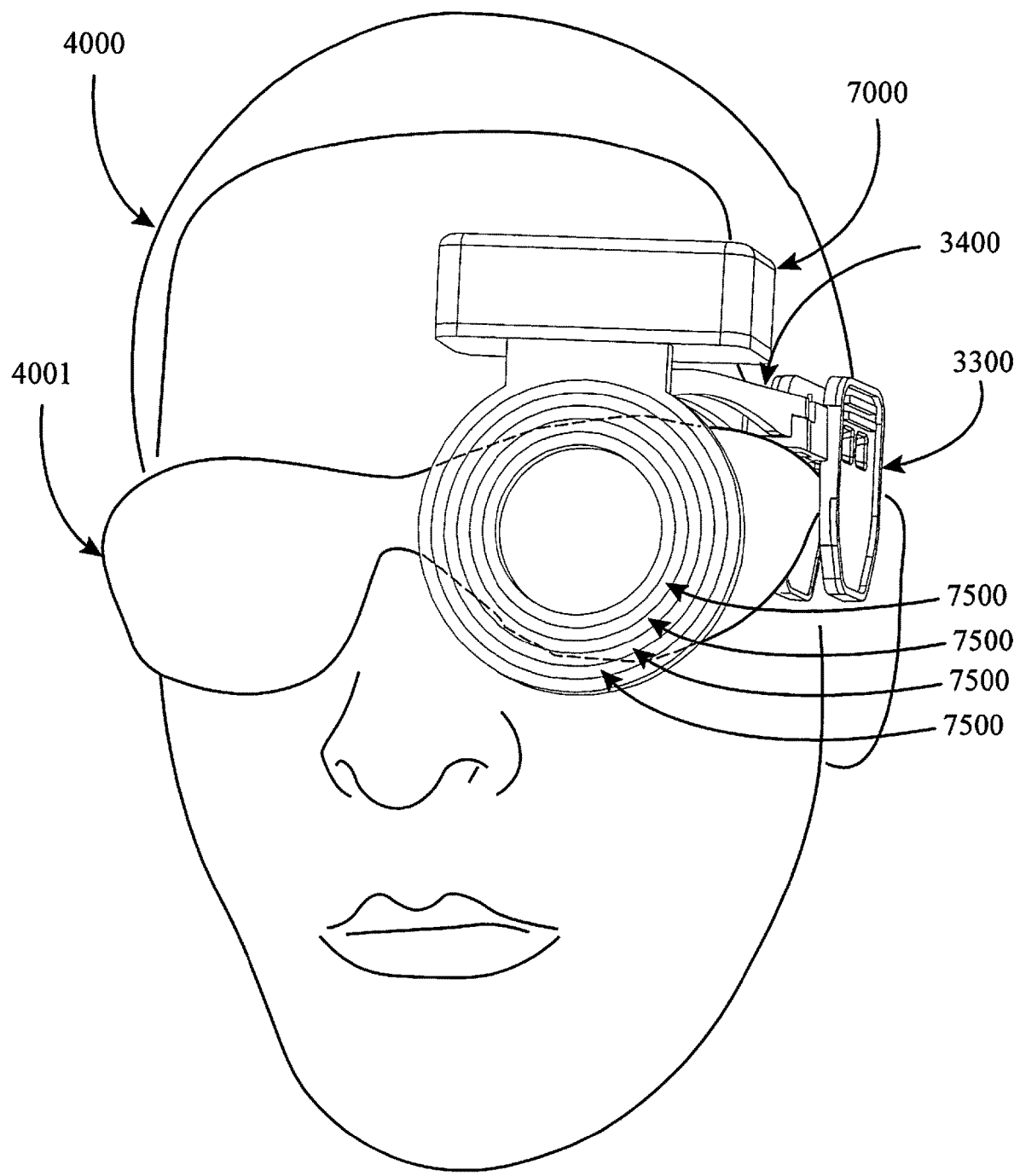
FIG. 12F shows a perspective front view of the embodiment shown in FIG. 12A attached to the user/shooter glasses via the assembly of multi-angle, multi-jointed viewing angle adjustment mechanism and the interchangeable mounting mechanism glasses mounting embodiment. The figure demonstrates the user/shooter ability to look directly through the central void of the LCD screen.

FIG. 12F is a perspective font view of a user wearing glasses 4001 with the primary housing look-through ring embodiment 7000 attached via the assembled multi-angled, multi-jointed viewing angle adjustment mechanism 3400 and interchangeable mounting mechanism glasses mounting embodiment 3300. In this image the alignment of the primary housing look-through ring embodiment LCD target indication elements 7500 can be seen overlaying one of the user/shooter's eyes in order to surround their peripheral vision with target identifiers.

Figure 12G:
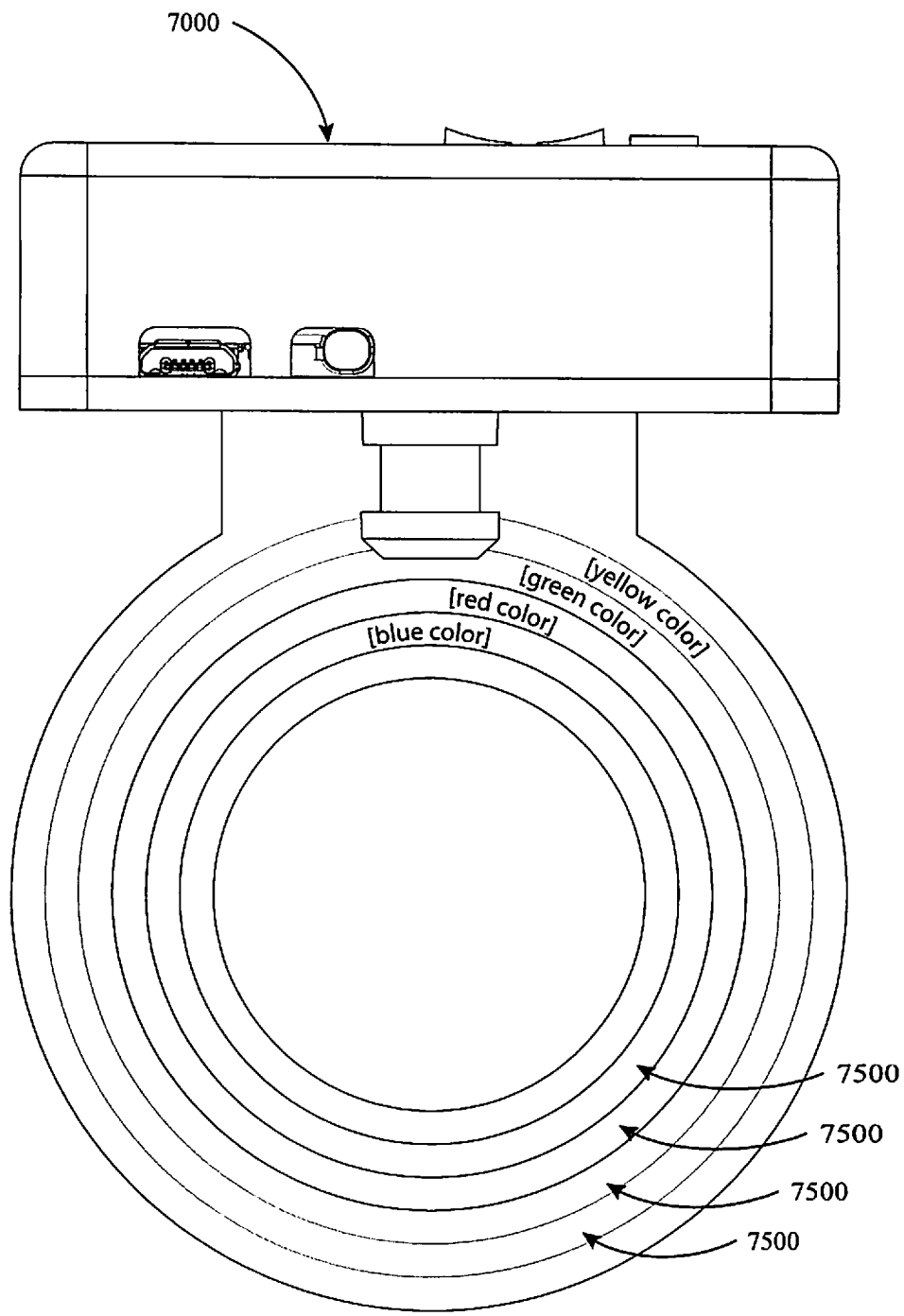
FIG. 12G shows a rear view of the embodiment show in FIG. 12A and exemplifies the use of the 4 available concentric annular target indication elements by depicting 4 different colors being presented on each of the individual target indication element LCD rings by the use of bracketed text representing the denoted colors.

FIG. 12G shows a rear elevation view of the primary housing look-through ring embodiment 7000 and shows various colors on the primary housing look-through ring embodiment LCD target indication elements 7500 where bracketed text is used to depict colors.

Figure 13:
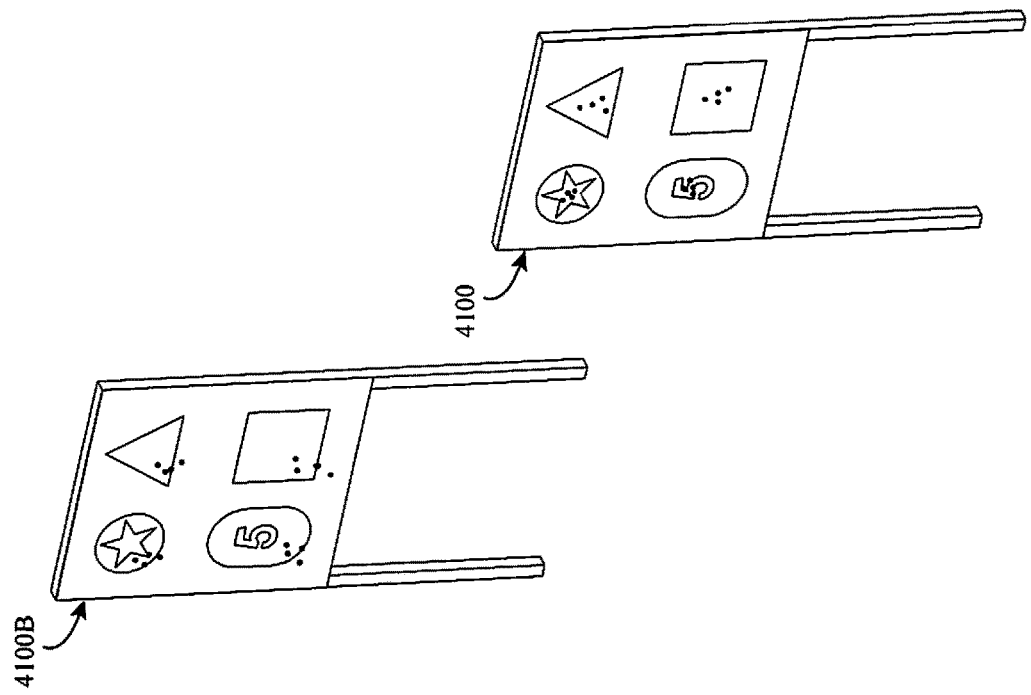
FIG. 13 is a perspective top view of a side-by-side competition between two users shooting each utilizing an assembly of the multi-angle, multi-jointed viewing angle adjustment mechanism, the interchangeable mounting mechanism glasses mounting embodiment, and the embodiment of FIG. 1A attached to their glasses and as shown in FIG. 9 for one user.
Figure 13:
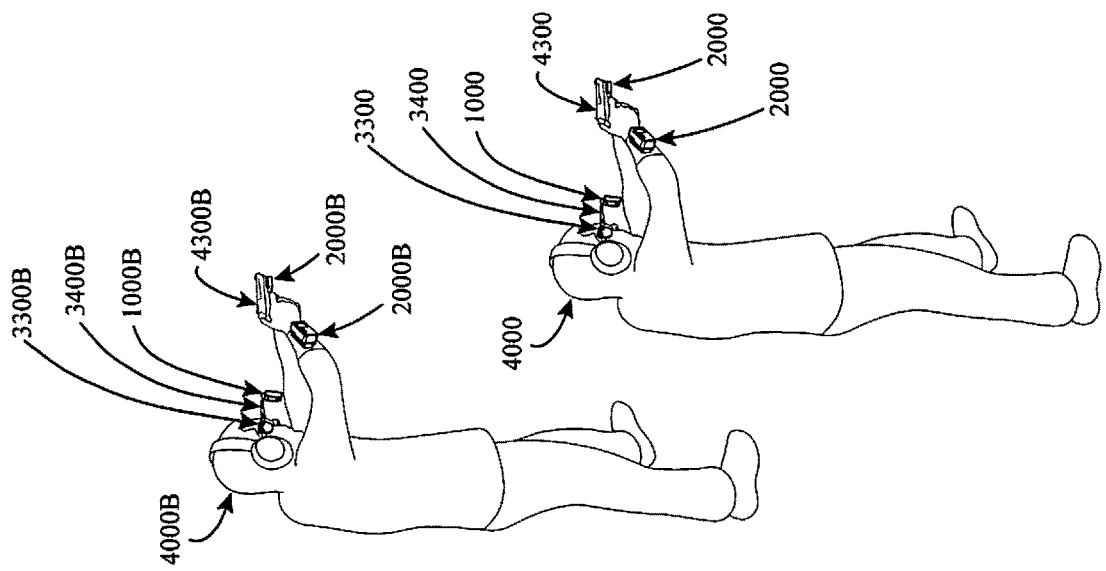

FIG. 13 is a perspective top view of a side-by-side competition between two users shooting each utilizing an assembly of the multi-angle, multi-jointed viewing angle adjustment mechanism 3400, 3400B, the interchangeable mounting mechanism glasses mounting embodiment 3300, 3300B, and the embodiment of FIG. 1A 1000, 1000B attached to their glasses 4001, 4001B and as shown in FIG. 9 for one user. A first user 4000, and second user 4000B can be side by side playing the same game with the same targets visible to each of the users. At the end of a game a winner can be declared. This embodiment can have a master device which would be synchronized with each of the users to show the same presentations of target identifiers to each of the users, such that each user has the same training sequence presented simultaneously. The users can be wireless connected together. And at the end of the game, the outcomes of each of the users can be compared with one another.

Although specific advantages have been enumerated above, various embodiments can include some, none, or all of the enumerated advantages.

Other technical advantages can become readily apparent to one of ordinary skill in the art after review of the following figures and description.

It should be understood at the outset that, although exemplary embodiments are illustrated in the figures and described below, the principles of the present disclosure can be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions can be made to the systems, devices, and methods described herein without departing from the scope of the disclosure. For example, the components of the systems and devices can be integrated or separated. Moreover, the operations of the systems and devices disclosed herein can be performed by more, fewer, or other components and methods described can include more, fewer, or other steps. Additionally, steps can be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as can be suggested by the teachings herein are particularly reserved especially as they fall within the breadth and scope of the claims here appended.

I claim:

1. A shooting target dictation training system comprising:
   a wearable and/or mountable, portable electronic display configured to display a plurality of target identifier colors that correspond to at least one or more colors displayed on one or more shooting targets, where the target identifier colors are displayed on the electronic display in at least one of: a linear pattern and a concentric arrangement;
   a set of interchangeable mounting mechanisms that attach to the electronic display in order to mount the electronic display to various mounting locations, where the interchangeable mounting mechanisms are adjustable in the positioning of the electronic display relative to a shooter's line of sight by adjusting at least one of: the pitch, roll, and yaw of the electronic display;
   a randomizing system control computer program configured to randomize the display of the plurality of the target identifier colors that are displayed on the electronic display by altering at least one of: the color selected for any target identifier color that is displayed, the number of the target identifier colors in a series of target identifier colors that are displayed, the delay between the commencement of the randomizing system control computer program and the display of a first target identifier color in a series of target identifier colors that are displayed, the duration of time between instances of target identifier colors being displayed in a series of target identifier colors that are displayed, the duration of time between the display of a final target identifier color in a series of target identifier colors that are displayed and the clearing of the series of target identifier colors from the electronic display, and the duration of time between the clearing of a series of target identifier colors from the electronic display and the display of the first target identifier color in a subsequent series of target identifier colors that are displayed;
   wherein, through the display of at least one or more target identifier colors on the electronic display, the randomizing system control computer program dictates to the shooter to shoot at least one or more of the corresponding colors displayed on the one or more shooting targets.

2. The system of claim 1, wherein the portable electronic display includes at least one of: a liquid crystal display (LCD) and LEDs (light emitting diodes).

3. The system of claim 1, wherein the set of interchangeable mounting mechanisms includes:
   a spring loaded clip.

4. The system of claim 1, wherein the set of interchangeable mounting mechanisms includes:
   a mounting member configured to mount the portable electronic display to a pair of eye glasses.

5. The system of claim 1, wherein the set of interchangeable mounting mechanisms includes:
   a mounting member configured to mount the portable electronic display to a weapon.

6. The system of claim 5, wherein the weapon is selected from a rifle and a pistol.

7. The system of claim 1, wherein the portable electronic display includes:
   a plurality of separate displays configured to display different target identifier colors on each display.

8. The system of claim 1, further comprising:
   a secondary housing having sensors configured to sense additional information, selected from at least one of: shots fired, movements of the weapon and movements of the shooter; and
   a transmitter in the secondary housing configured to wirelessly communicate the additional information with a receiver in the primary housing, wherein data from the additional information is analyzed in order to provide feedback and instruction to the user.

9. The system of claim 8, wherein the sensors are configured to sense the shots fired, the movements of the weapon, and the movements of the shooter.

10. The system of claim 1, further comprising:
    a second portable electronic display configured to display the plurality of target identifier colors; and
    a second set of interchangeable mounting mechanisms configured to mount the second portable electronic display to various mounting locations adapted to be engaged by a second shooter viewing the plurality of the shooting targets and target identifier colors, wherein the randomizing system control computer program is configured to control and synchronize both the first portable electronic display and the second portable electronic display so that identical target identifier colors are displayed on the first portable electronic display and the second portable electronic display to both the first shooter and the second shooter in order for one game to be played simultaneously on both the first portable electronic display and the second portable electronic display, wherein at a conclusion of the one game, target engagement training scores from both the first shooter and the second shooter are compared to one another.

11. The system of claim 1, further comprising:
    at least one sensor configured to detect at least one shot has been fired to provide feedback to the randomizing system control computer program configured to control the target identifier colors to be displayed on the portable electronic display.

12. The system of claim 11, wherein the at least one sensor detects shot times of the at least one shot that has been fired.

13. The system of claim 1, further comprising:
- at least one other sensor configured to detect movements and the timing of the movements of the shooter to provide feedback to the randomizing system control computer program configured to control the target identifier colors to be displayed on the portable electronic display.

14. The system of claim 1, wherein the system control further includes:
- a take action instruction to be displayed on the portable electronic display to the shooter, the take action instruction selected from at least one of: kneel, stand-up, lay prone, move to next position, move to previous position, move to left, move to right, move forward, move backward, move diagonal, reload the weapon, change the weapon, engage next target, engage previous target, switch the weapon to other hand, and signal teammate.

* * * * *